(12) United States Patent
Jahani

(10) Patent No.: US 10,956,858 B2
(45) Date of Patent: Mar. 23, 2021

(54) STATIC WAREHOUSE AREA SIZING AND SLOTTING OF A MULTI-MODE FORWARD AREA

(71) Applicant: Intelligrated Headquarters, LLC, Mason, OH (US)

(72) Inventor: Parvaneh Jahani, Loveland, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 430 days.

(21) Appl. No.: 15/875,121

(22) Filed: Jan. 19, 2018

(65) Prior Publication Data

US 2018/0253680 A1    Sep. 6, 2018

Related U.S. Application Data

(60) Provisional application No. 62/448,075, filed on Jan. 19, 2017, provisional application No. 62/486,555, filed on Apr. 18, 2017.

(51) Int. Cl.
*G06Q 30/06* (2012.01)
*G06Q 10/08* (2012.01)

(52) U.S. Cl.
CPC ....... *G06Q 10/087* (2013.01); *G06Q 30/0633* (2013.01)

(58) Field of Classification Search
CPC .............................................. G06G 30/06–08
USPC .............................................. 705/26.1–27.2
See application file for complete search history.

(56) References Cited

U.S. PATENT DOCUMENTS

| | | | | |
|---|---|---|---|---|
| 7,881,820 B2 * | 2/2011 | Antony | ................ | G06Q 10/087 700/214 |
| 8,407,108 B2 * | 3/2013 | Foltz | .................... | G06Q 10/087 705/22 |
| 2008/0162270 A1 * | 7/2008 | Kim | ...................... | G06Q 10/087 705/7.31 |

(Continued)

OTHER PUBLICATIONS

10 Great Warehouse Optimization Tips for Small Businesses, Emma Sturgis, Jun. 26, 2015; https://www.fishbowlinventory.com/blog/2015/06/26/10-great-warehouse-optimization-tips-for-small-businesses/; (Year: 2015).*

(Continued)

*Primary Examiner* — Ming Shui
(74) *Attorney, Agent, or Firm* — Alston & Bird LLP

(57) ABSTRACT

A method, apparatus and computer program product for static warehouse area sizing and slotting of a multi-mode forward area. Method includes: receiving article dimensional attributes and demand information of more than article identified by a stock keeping unit (SKU); receiving storage dimensional attributes of more than one storage configuration of pick media; for each of a forward area and a reserve area, receiving a picking cost and a restocking cost for each storage configuration; optimizing slotting of each of the SKUs based upon the article dimensional attributes and the storage dimensional attributes; defining possible designs of the more than one storage configuration up to a maximum size of a facility; calculating a first cost for each design in picking and restocking in the forward area and a second cost for each design in picking from reserve area; and optimizing forward area based upon a difference between first and second costs.

20 Claims, 40 Drawing Sheets

(56) References Cited

U.S. PATENT DOCUMENTS

| | | | |
|---|---|---|---|
| 2009/0043617 A1* | 2/2009 | Thomas | G06Q 10/00 |
| | | | 705/28 |
| 2009/0082902 A1* | 3/2009 | Foltz | G06Q 10/087 |
| | | | 700/214 |
| 2017/0091704 A1* | 3/2017 | Wolf | G06Q 10/087 |

OTHER PUBLICATIONS

Warehouse Racking Tips and Tactics: 50 Expert Warehouse Racking Ideas, Strategies and Systems to Maximize Productivity, Nicole Pontius, Aug. 11, 2016, http://web.archive.org/web/20160812021626/ https://www.camcode.com/asset-tags/warehouse-racking-tips/; (Year: 2016).*

* cited by examiner

ANALYSIS OF VARIANCE

| SOURCE | SUM SQ. | d.f. | MEAN SQ. | F | Prob>F |
|---|---|---|---|---|---|
| X1 | 9121873819536 | 1 | 9121873819536 | 1950.22 | 0 |
| X2 | 229132627684 | 1 | 229132627684 | 48.99 | 0 |
| X3 | 579121 | 1 | 579121 | 0 | 0.9912 |
| X4 | 786690304 | 1 | 786690304 | 0.17 | 0.6833 |
| X5 | 956479329 | 1 | 956479329 | 0.2 | 0.6528 |
| X6 | 2560967236 | 1 | 2560967236 | 0.55 | 0.4624 |
| ERROR | 266608842301 | 57 | 4677348110.5 | | |
| TOTAL | 9621920005511 | 63 | | | |

ANALYSIS OF VARIANCE

| SOURCE | SUM SQ. | d.f. | MEAN SQ. | F | Prob>F |
|---|---|---|---|---|---|
| A | 9.12187e+12 | 1 | 9.12187e+12 | 16959.09 | 2.68069e-75 |
| B | 2.29133e+11 | 1 | 2.29133e+11 | 426 | 6.08482e-29 |
| A+B | 2.38641e+11 | 1 | 2.38641e+11 | 443.67 | 2.07834e-29 |
| ERROR | 3.22725e+10 | 60 | 5.37875e+08 | | |
| TOTAL | 9.62192e+12 | 63 | | | |

ANALYSIS OF VARIANCE

| SOURCE | SUM SQ. | d.f. | MEAN SQ. | F | Prob>F |
|---|---|---|---|---|---|
| X1 | 5371985922270.3 | 1 | 5371985922270.3 | 25756.9 | 0 |
| X2 | 2993238810.2 | 1 | 2993238810.2 | 14.35 | 0.0004 |
| X3 | 2699166162.3 | 1 | 2699166162.3 | 12.94 | 0.0007 |
| X4 | 733592.2 | 1 | 733592.2 | 0 | 0.9529 |
| X5 | 108420156.2 | 1 | 108420156.2 | 0.52 | 0.4739 |
| X6 | 93190062.2 | 1 | 93190062.2 | 0.45 | 0.5065 |
| ERROR | 11888201636.2 | 57 | 208564941 | | |
| TOTAL | 5389768872689.8 | 63 | | | |

ANALYSIS OF VARIANCE

| SOURCE | SUM SQ. | d.f. | MEAN SQ. | F | Prob>F |
|---|---|---|---|---|---|
| A | 5.37199e+12 | 1 | 5.37199e+12 | 38226.97 | 0 |
| B | 2.99324e+09 | 1 | 2.99324e+09 | 21.3 | 0 |
| A*B | 2.69917e+09 | 1 | 2.69917e+09 | 19.21 | 0.0001 |
| A*C | 2.14503e+09 | 1 | 2.14503e+09 | 15.26 | 0.0003 |
| B*C | 1.88317e+09 | 1 | 1.88317e+09 | 13.4 | 0.0006 |
| ERROR | 5.22079e+07 | 1 | 5.22079e+07 | 0.37 | 0.5446 |
| TOTAL | 8.01014e+09 | 57 | 1.40529e+08 | | |
|  | 5.38977e+12 | 63 | | | |

ANALYSIS OF VARIANCE

| SOURCE | SUM SQ. | d.f. | MEAN SQ. | F | Prob>F |
|---|---|---|---|---|---|
| X1 | 5279050771542.2 | 1 | 5279050771542.2 | 28113.28 | 0 |
| X2 | 1048173000.2 | 1 | 1048173000.2 | 5.58 | 0.0216 |
| X3 | 1633574306.2 | 1 | 1633574306.2 | 8.7 | 0.0046 |
| X4 | 537103800.2 | 1 | 537103800.2 | 2.86 | 0.0963 |
| X5 | 42642.2 | 1 | 42642.2 | 0 | 0.988 |
| X6 | 106450806.2 | 1 | 106450806.2 | 0.57 | 0.4546 |
| ERROR | 10703335964.2 | 57 | 187777823.9 | | |
| TOTAL | 5293079452061.2 | 63 | | | |

ANALYSIS OF VARIANCE

| SOURCE | SUM SQ. | d.f. | MEAN SQ. | F | Prob>F |
|---|---|---|---|---|---|
| A | 5.27905e+12 | 1 | 5.27905e+12 | 33230.04 | 0 |
| B | 1.04817e+09 | 1 | 1.04817e+09 | 6.6 | 0.0129 |
| C | 1.63357e+09 | 1 | 1.63357e+09 | 10.28 | 0.0022 |
| A*B | 1.73884e+08 | 1 | 1.73884e+08 | 1.09 | 0.2999 |
| A*C | 1.70028e+09 | 1 | 1.70028e+09 | 10.7 | 0.0018 |
| B*C | 4.17528e+08 | 1 | 4.17528e+08 | 2.63 | 0.1105 |
| ERROR | 9.05524e+09 | 57 | 1.58864e+08 | | |
| TOTAL | 5.29308e+12 | 63 | | | |

ANALYSIS OF VARIANCE

| SOURCE | SUM SQ. | d.f. | MEAN SQ. | F | Prob>F |
|---|---|---|---|---|---|
| X1 | 5.17941e+12 | 1 | 5.17941e+12 | 31099.31 | 0 |
| X2 | 2.51989e+09 | 1 | 2.51989e+09 | 15.13 | 0.0003 |
| X3 | 1.63014e+09 | 1 | 1.63014e+09 | 9.79 | 0.0028 |
| X4 | 3.30331e+06 | 1 | 3.30331e+06 | 0.02 | 0.8885 |
| X5 | 1.14041e+08 | 1 | 1.14041e+08 | 0.68 | 0.4114 |
| X6 | 9.69043e+07 | 1 | 9.69043e+07 | 0.58 | 0.4487 |
| ERROR | 9.49302e+09 | 57 | 1.66544e+08 | | |
| TOTAL | 5.19327e+12 | 63 | | | |

ANALYSIS OF VARIANCE

| SOURCE | SUM SQ. | d.f. | MEAN SQ. | F | Prob>F |
|---|---|---|---|---|---|
| A | 5.17941e+12 | 1 | 5.17941e+12 | 42955.08 | 0 |
| B | 2.51989e+09 | 1 | 2.51989e+09 | 20.9 | 0 |
| C | 1.63014e+09 | 1 | 1.63014e+09 | 13.52 | 0.0005 |
| A*B | 1.92024e+09 | 1 | 1.92024e+09 | 15.93 | 0.0002 |
| A*C | 8.6201e+08 | 1 | 8.6201e+08 | 7.15 | 0.0098 |
| B*C | 5.2114e+07 | 1 | 5.2114e+07 | 0.43 | 0.5136 |
| ERROR | 6.87291e+09 | 57 | 1.20577e+08 | | |
| TOTAL | 5.19327e+12 | 63 | | | |

ANOVA TABLE

| SOURCE  | SS         | df  | MS         | F    | Prob>F     |
|---------|------------|-----|------------|------|------------|
| COLUMNS | 4.40567e+12 | 3   | 1.46856e+12 | 26.6 | 5.43037e-16 |
| ERROR   | 2.80509e+13 | 508 | 5.52184e+13 |      |            |
| TOTAL   | 3.24566e+13 | 511 |             |      |            |

ANOVA TABLE

| SOURCE  | SS         | df  | MS         | F      | Prob>F     |
|---------|------------|-----|------------|--------|------------|
| COLUMNS | 9.52882e+12 | 3   | 3.17627e+12 | 337.03 | 2.02602e-59 |
| ERROR   | 1.1686e+12  | 124 | 9.42423e+09 |        |            |
| TOTAL   | 1.06974e+13 | 127 |             |        |            |

| | | | ANOVA TABLE | | |
|---|---|---|---|---|---|
| SOURCE | SS | df | MS | F | Prob>F |
| COLUMNS | 5.80768e+12 | 3 | 1.93589e+12 | 3071.74 | 3.81288e-116 |
| ERROR | 7.8148e+10 | 124 | 6.30226e+08 | | |
| TOTAL | 5.88583e+12 | 127 | | | |

ANOVA TABLE

| SOURCE | SS | df | MS | F | Prob>F |
|---|---|---|---|---|---|
| COLUMNS | 5.65343e+12 | 3 | 1.88448e+12 | 3156.89 | 7.15736e-117 |
| ERROR | 7.40206e+10 | 124 | 5.9694e+08 | | |
| TOTAL | 5.72745e+12 | 127 | | | |

| ANOVA TABLE | | | | | |
|---|---|---|---|---|---|
| SOURCE | SS | df | MS | F | Prob>F |
| COLUMNS | 5.65343e+12 | 3 | 1.88448e+12 | 3156.89 | 7.15736e-117 |
| ERROR | 7.40206e+10 | 124 | 5.9694e+08 | | |
| TOTAL | 5.72745e+12 | 127 | | | |

FIG. 58

STATIC WAREHOUSE AREA SIZING AND SLOTTING OF A MULTI-MODE FORWARD AREA

CROSS REFERENCE TO RELATED APPLICATIONS

This application claims the benefit of U.S. Provisional Application No. 62/448,075 filed Jan. 19, 2017, which is hereby incorporated by reference in its entirety. This application also claims the benefit of U.S. Provisional Application No. 62/486,555 filed Apr. 18, 2017, which is hereby incorporated by reference in its entirety.

FIELD

The present disclosure relates generally to material handling of containers, packages, and discrete articles, and more specifically to techniques for discreetly slotting products in a storage facility.

BACKGROUND

A warehouse is a building used for the storage of goods, such as manufactured parts, raw materials, spare parts and more. This building has both receiving and shipping areas, in which goods are unloaded from the trucks in the receiving docks and are loaded to the trucks on a smaller scale in the shipping docks. The level of automation differs in different warehouses. While the products are completely picked, packed, and transported automatically in some warehouses, others utilize labor for those activities.

Material flow within the warehouse varies in terms of both type of Stock Keeping Units (SKUs) and the volume. SKUs and demand growth are two subjects that jeopardize any warehouse space management system. These growths will also affect warehouse functions. In some cases, managers must accommodate by adding new products to the already strained capacity of the distribution center. They may also need to apportion available space to those SKUs that have experienced growth in demand.

Every warehouse requires labor, capital, land, and an information system, but providing these resources is costly. One important reason to have a warehouse is to address a highly volatile and changing demand environment. Warehouses provide a buffer for these unpredictable changes. They can also reduce transportation costs by product consolidation before shipping the aggregate volume. Several value added services, such as packaging, returned product services, repairs, testing, inspection, and assembly, are provided by warehouses.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with an apparatus, computer program product, and method for efficiently configuring a forward area of a warehouse configured for fast picking, wherein the forward area comprises one or more pick modes, each pick mode comprising a rack type selected from a pallet flow rack, a carton flow rack, a decked rack, a unit of steel shelving, and a unit of bin shelving, and wherein each pick mode may have different storage configurations and different picking and replenishment policies.

In one embodiment, a method is provided, the method comprising importing a set of stock keeping unit (SKU) data, a set of order data, a set of rack data, and a set of facility data; based at least in part on the set of SKU data and the set of rack data, identifying one or more slots in which a case associated with an SKU may be fitted; determining, for each of the one or more pick modes, an orientation for the case associated with the SKU; and determining, for a plurality of configurations of the forward area and a reserve area of the warehouse, a savings associated with a location of the case associated with the SKU within the warehouse.

In some example implementations of such a method, the set of SKU data comprises a length measurement, a width measurement, and a height measurement associated with a numerical SKU identifier. In some such example implementations, and in other example implementations, the set of order data comprises a time, numerical SKU identifier, and quantity identifier associated with an order. In some such example implementations, and in other example implementations, the set of rack data comprises a width measurement, a depth measurement, and a height measurement associated with a shelf of a rack. In some such example implementations, and in other example implementations, the set of facility data comprises a horizontal length measurement of the forward area and a vertical length of the forward area.

In some example implementations, the method further involves defining all possible storage configurations up to the maximum size of the forward area. In some such example implementations, and in other example implementations, the method further comprises determining, based at least in part on the savings associated with the location of the case associated with the SKU within the warehouse, an optimized configuration of the forward area, the optimized configuration comprising an identification of a rack type, an effective rack size, a size of the forward area, and a slot type for an item associated with each SKU, wherein a slot is a physical storage location in the warehouse. In some such example implementations, and in other example implementations, determining the optimized configuration of the forward are further comprises applying an SKU grown factor and a volume growth factor. In some such example implementations, and in other example implementations, the method further comprises detecting a depletion condition under a reorder point associated with a slot in the forward area of the warehouse; and automatically triggering a replenishment process for each slot associated with the depletion condition.

In another example embodiment, an apparatus for efficiently configuring a forward area of a warehouse configured for fast picking, wherein the forward area comprises one or more pick modes, each pick mode comprising a rack type selected from a pallet flow rack, a carton flow rack, a decked rack, a unit of steel shelving, and a unit of bin shelving, and wherein each pick mode may have different storage configurations and different picking and replenishment policies, is provided, the apparatus comprising at least one processor and at least one memory having program code instructions embodied therein, the at least one memory and program code instructions being configured to, with the at least one processor, direct the apparatus to at least: import a set of stock keeping unit (SKU) data, a set of order data, a set of rack data, and a set of facility data; based at least in part on the set of SKU data and the set of rack data, identify one or more slots in which a case associated with an SKU may be fitted; determine, for each of the one or more pick modes, an orientation for the case associated with the SKU; and determine, for a plurality of configurations of the forward area and a reserve area of the warehouse, a savings associated with a location of the case associated with the SKU within the warehouse.

In some example implementations of such an apparatus, the set of SKU data comprises a length measurement, a width measurement, and a height measurement associated with a numerical SKU identifier. In some such example implementations, and in other example implementations, the set of order data comprises a time, numerical SKU identifier, and quantity identifier associated with an order. In some such example implementations, and in other example implementations, the set of rack data comprises a width measurement, a depth measurement, and a height measurement associated with a shelf of a rack. In some such example implementations, and in other example implementations, the set of facility data comprises a horizontal length measurement of the forward area and a vertical length of the forward area.

In some such example implementations, and in other example implementations, the apparatus further comprises code portions configured to cause the apparatus to at least define all possible storage configurations up to the maximum size of the forward area. In some such example implementations, and in other example implementations, the apparatus further comprises code portions configured to cause the processor to at least: determine, based at least in part on the savings associated with the location of the case associated with the SKU within the warehouse, an optimized configuration of the forward area, the optimized configuration comprising an identification of a rack type, an effective rack size, a size of the forward area, and a slot type for an item associated with each SKU, wherein a slot is a physical storage location in the warehouse.

In some such example implementations, and in other example implementations, determining the optimized configuration of the forward are further comprises applying an SKU grown factor and a volume growth factor. In some such example implementations, and in other example implementations, the apparatus further comprises code portions configured to cause the processor to at least: detect a depletion condition under a reorder point associated with a slot in the forward area of the warehouse; and automatically triggering a replenishment process for each slot associated with the depletion condition.

In another example embodiment a computer program product comprising a non-transitory computer-readable storage medium having program code portions stored therein is provided, the program code portions being configured to, upon execution, direct an apparatus to at least: import a set of stock keeping unit (SKU) data, a set of order data, a set of rack data, and a set of facility data; based at least in part on the set of SKU data and the set of rack data, identify one or more slots in which a case associated with an SKU may be fitted; determine, for each of the one or more pick modes, an orientation for the case associated with the SKU; and determine, for a plurality of configurations of the forward area and a reserve area of the warehouse, a savings associated with a location of the case associated with the SKU within the warehouse. In some example implementations of such a computer program product, and in other example implementations, the computer program product of claim 19, further comprises program code portions being configured to, upon execution, direct an apparatus to at least define all possible storage configurations up to the maximum size of the forward area.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE FIGURES

The features, nature, and advantages of the present disclosure will become more apparent from the detailed description set forth below when taken in conjunction with the drawings in which like reference characters identify correspondingly throughout and wherein:

FIG. 58 illustrates example confusion matricies;

DETAILED DESCRIPTION

Figure 1:
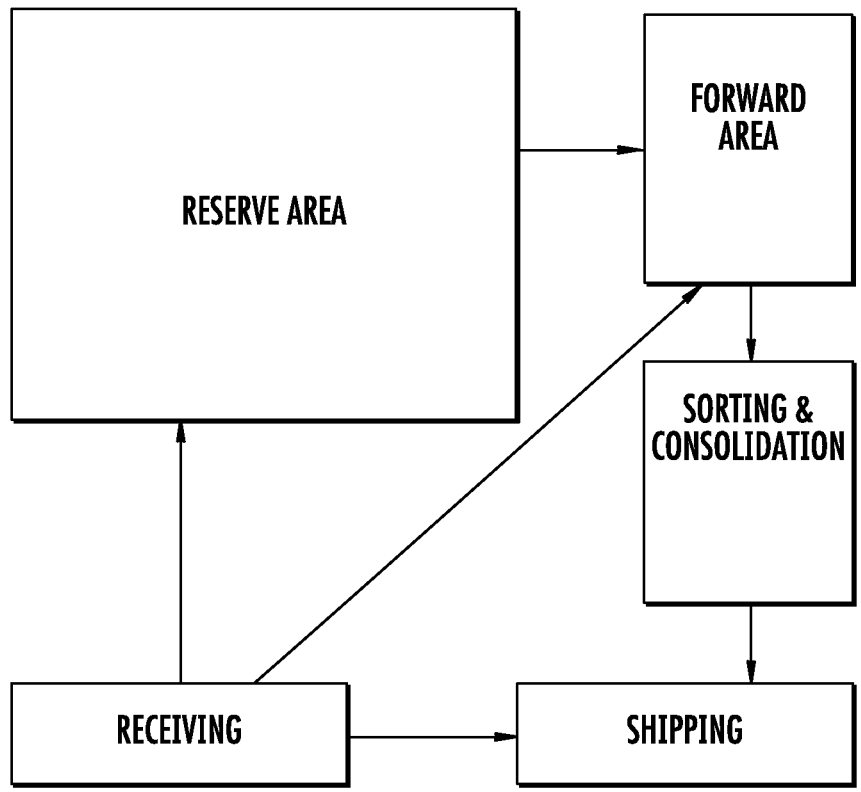
FIG. 1 illustrates a block diagram of basic flows in a warehouse.

A warehouse is a key component of a logistics system that provides a central location for receiving, storing, and distributing raw materials or manufactured goods. While the objective of a logistics system is reducing the overall inventories and cycle times (the average time between successive deliveries), warehouses are concerned with having the right items, available at the right place, at the right time.

As e-commerce continues to expand and order shipments become smaller, more diverse, and frequent, warehouses must adjust proactive approaches for order fulfillment. Efficient replenishment of the right products into the forward picking areas becomes a more challenging problem in this dynamic environment. The set of items ordered in one month might be completely different from next month's orders. Historical time-based demand data provides valuable information for the models, which have demand as an input. Disregarding the knowledge about the order data behavior over time is costly. One warehousing problem that is highly dependent on product demand and picks is the Forward-Reserve Problem (FRP).

The forward area is a small area of a warehouse with a low picking cost. Therefore, the items of a warehouse compete to be located in this area rather than the reserve area, which has a higher picking cost. Two approaches that are investigated for selecting the SKUs of the fast picking area and the allocated space are the static and the dynamic approaches.

In the case that decisions about the forward area are made periodically (e.g. yearly) and the products' demand patterns are completely ignored, the FRP is static. Due to the non-deterministic polynomial-time hard (NP-hard) nature of the product assignment to the forward area, two heuristics are developed that solve the large discrete assignment, allocation, and sizing problem simultaneously. A heuristic is also developed that determines the best sizes of the different pick modes within the forward area.

Using a fixed number for the "demand per year" in the static approach does not accurately capture the characteristics of the demand pattern. Replenishing the same product in the same place of the forward area brings about a "Locked" layout of the fast picking area during the planning horizon. By using a dynamic slotting approach, the product pick locations within the warehouse are allowed to change and pick operations can accommodate the variability in the product demand pattern. A dynamic approach can introduce the latest fast movers to the forward area, as an opportunity arises, and stop the replenishment of the products with decreasing turnover rates in this area at the right time. The allocated space to the items in the forward area can also vary over time. The present innovation recognizes that on average 39% of the candidate SKUs for the forward area experience the flexibility that the dynamic slotting approach provides. However, updating the forward area periodically in the static approach has an effect on only 6% of the SKUs.

One objective of the present disclosure is to formally define the dynamic FRP. Although real-time order picking and replenishment systems are becoming a pivotal component of today's order fulfillment systems, no consensus in the literature has been made regarding a definition for dynamic slotting optimization. One main mission of this research is to define a generic dynamic slotting problem while also demonstrating the strengths of this approach over the static model.

Dynamic slotting continuously adjusts the current state of the forward area with real-time decisions in conjunction with demand predictive analytics. Therefore, the layout of the fast picking area is updated over time with replenishment of the appropriate SKUs, as opposed to traditional methods that periodically reslot the forward area to reach a predefined target map. A powerful slotting methodology not only considers seasonality, but also other types of demand shifts, trends, and frequencies. The methods are explored for demand pattern detection and demand forecasting as well as proposed MIP mathematical model for the dynamic forward-reserve problem for the first time. This model relaxes the major implicit assumptions of the static model and quantifies the effects of the static strategy versus the dynamic strategy.

Extensive numerical experiments are conducted to compare the static FRP solutions, optimal solutions of the dynamic slotting model, and the developed threshold policy, a faster method that performs almost as well as the dynamic MIP model. The results show that the threshold policy solution is always very close to the optimal solution in terms of both the total cost of picking and replenishment and the forward area assignment and allocation. Applying different order data with different demand volatility, the dynamic model is shown to always outperform the static model. The benefits attained from the dynamic model over the static model are greater for more volatile warehouses.

Warehouse operations: To accomplish the broad scope of warehousing functions (e.g. receiving, storing, picking, sorting, packing, shipping), a warehouse is commonly divided into several functional areas. FIG. 1 illustrates the basic flows in a warehouse, starting from the receiving area and ending in the shipping area. After products are received, they are sent to other functional area(s) or directly to the shipping area. The process of unloading the receiving trucks and directly loading the shipping trucks is called cross-docking.

Warehouse operations are labor intensive. Bartholdi and Hackman (2010) report that 55% of warehouse operating costs belong to order-picking. This shows the high potential of order picking and replenishment for warehouse improvements. Not all of the areas of a warehouse have the same picking cost, however, the larger areas and also the farther areas from the Input/Output (I/O) point have a larger picking cost because pickers have to travel longer distances to pick items.

Figure 2:
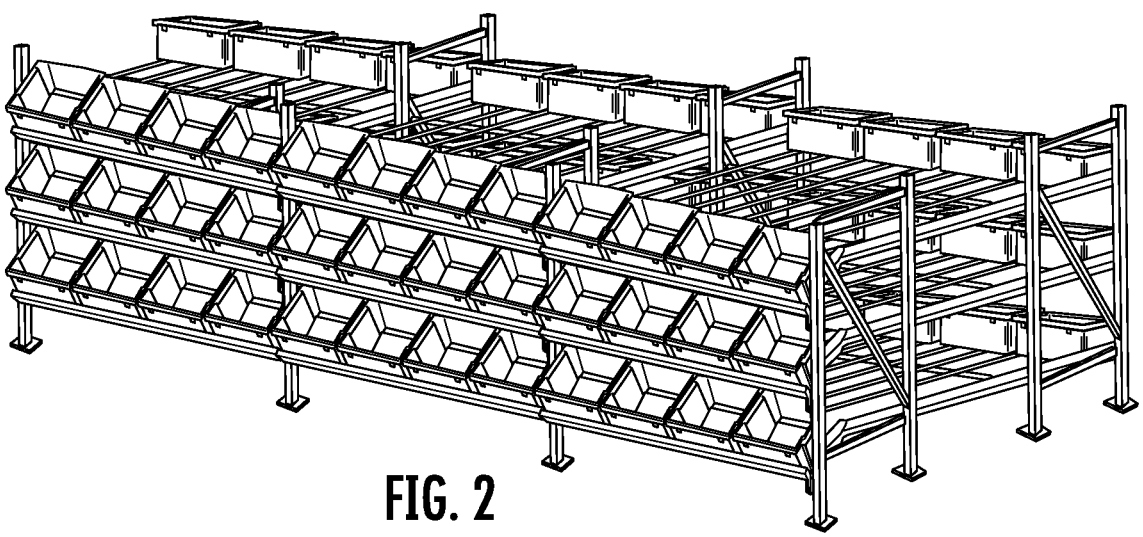
FIG. 2 illustrates a perspective view of a bay configuration.

Slot and slotting are two common terms in warehouse studies. A slot is the place allotted to the products on the shelf (see FIG. 2). The front side view of FIG. 2 shows three bays, each having three shelves with four slots per shelf. Slotting is the process of determining the item location in a warehouse.

Figure 3:
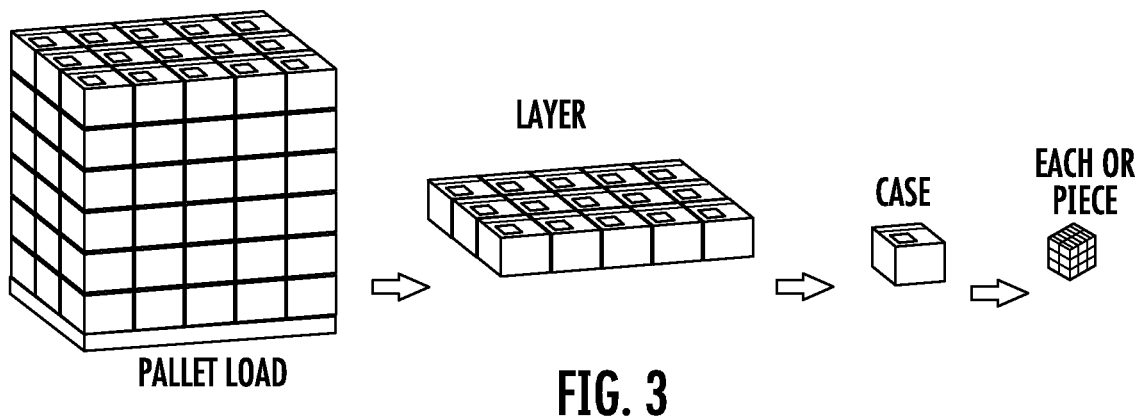
FIG. 3 illustrates structure of typical packaging units of a stock keeping unit (SKU)
Figure 4A:
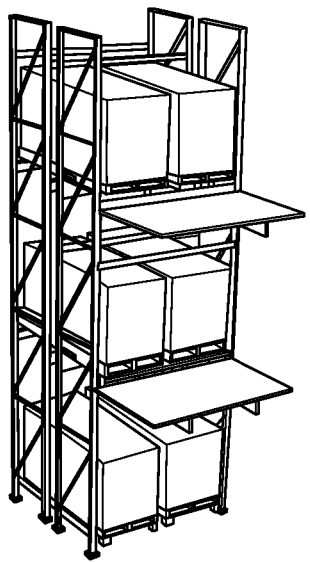
FIG. 4A illustrates a perspective view of a pallet flow rack.
Figure 4B:
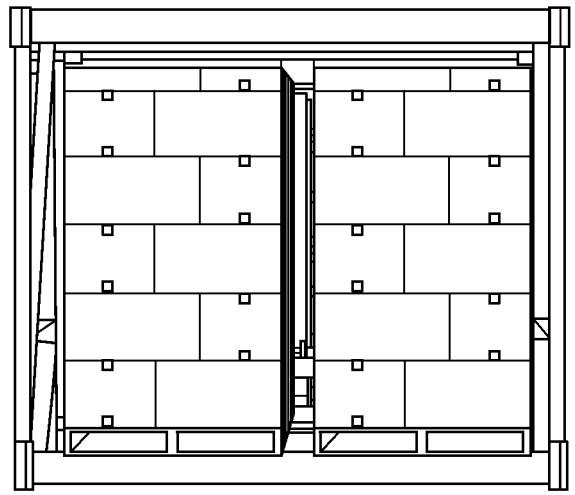
FIG. 4B illustrates a front view of a pallet flow rack.
Figure 5A:
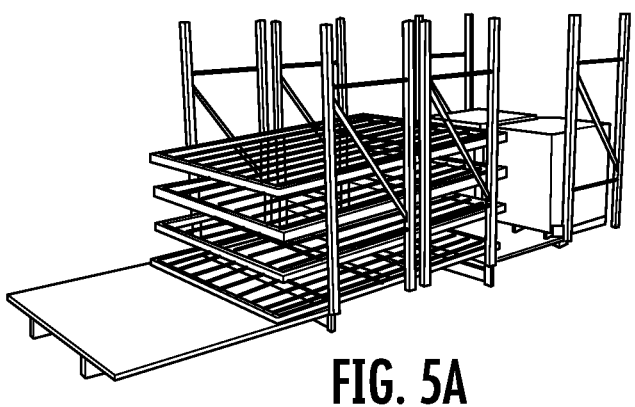
FIG. 5A illustrates a perspective view of an empty carton flow rack.
Figure 5B:
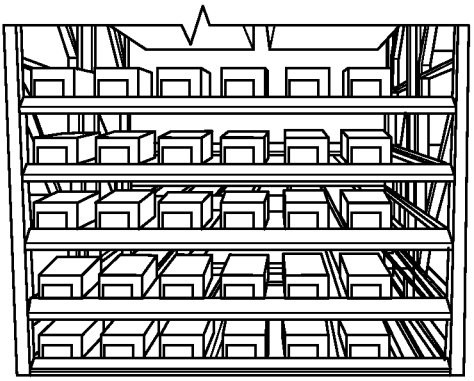
FIG. 5B illustrates a front view of a populated carton flow rack.
Figure 6:
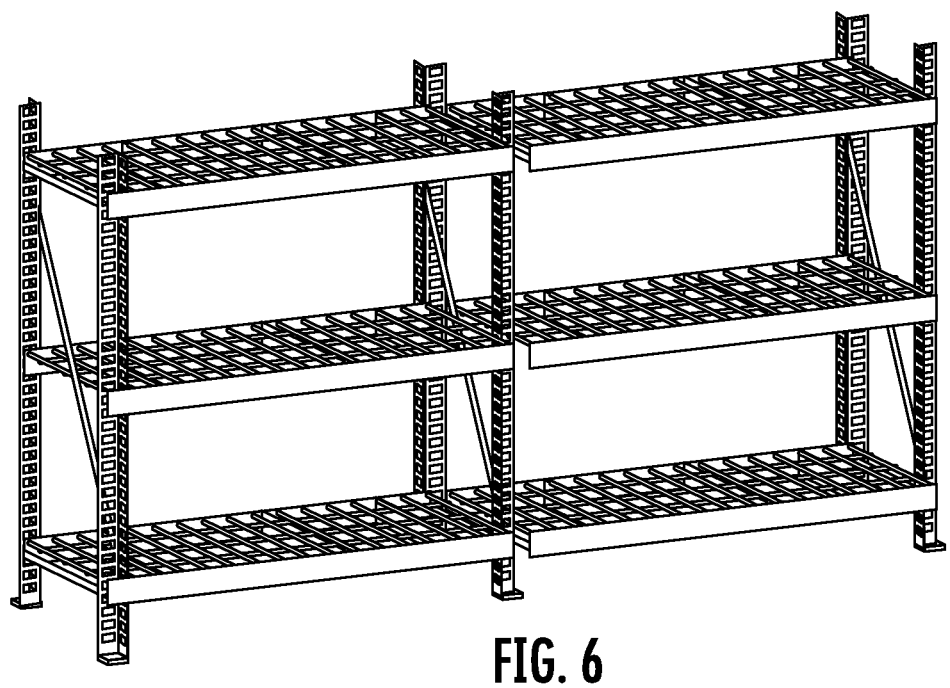
FIG. 6 illustrates decked rack.
Figure 7A:
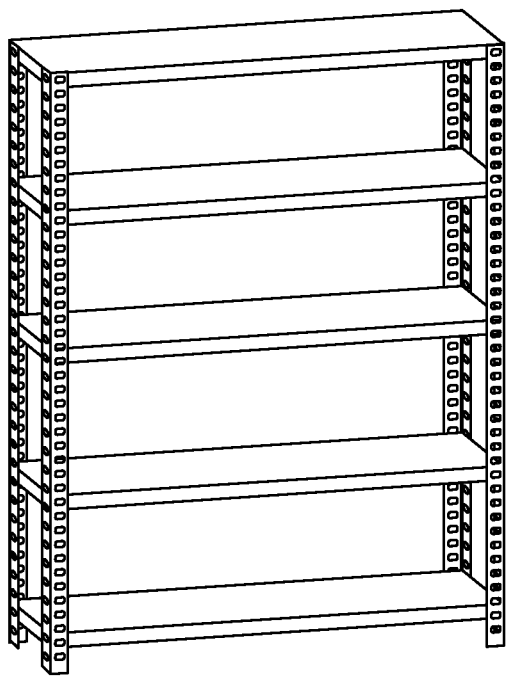
FIG. 7A illustrates a perspective view of steel shelving.
Figure 7B:
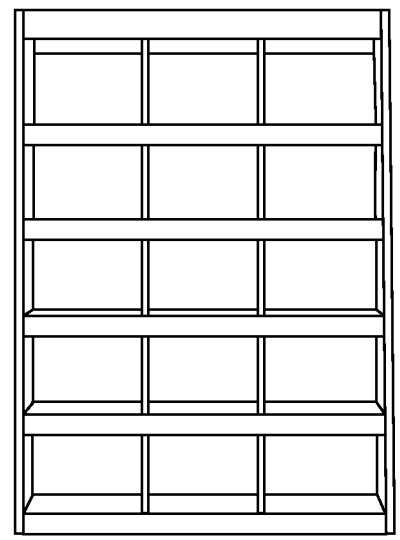
FIG. 7B illustrates a front view of steel shelving.
Figure 8:
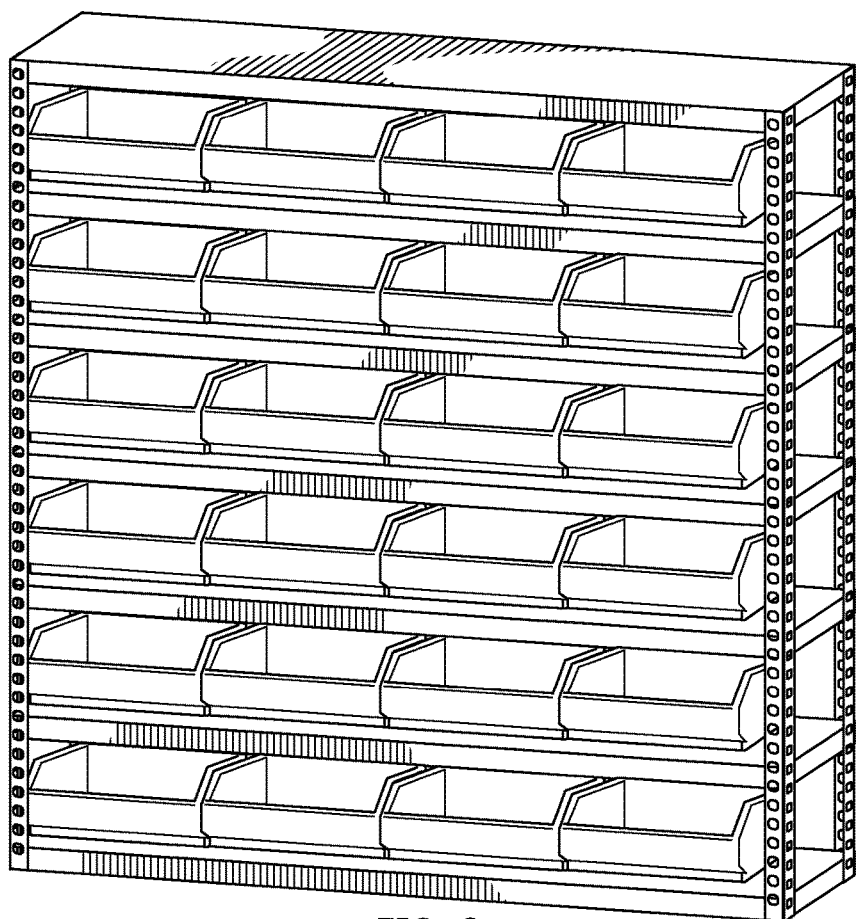
FIG. 8 illustrates a perspective view of bin shelving.

Regarding SKU units, the same terms applied in Walden (2005) are used. FIG. 3 illustrates the unit levels that describe an SKU in a warehouse. The levels are pallet, tier (level), case (carton), inner, and each (piece), respectively. As FIG. 3 demonstrates, a pallet includes layers of cartons. In logistics industry, the number of cartons on a layer is called TI. The number of layers that are stacked on the pallet is called HI. The TI and HI values in FIG. 3 are 15 and 6, respectively. Case refers to the carton or box. A quantity per pick is usually less than a full case. The smallest unit of the SKU, which is picked from inside of the case, is called an each or piece.

While some zones of the warehouse are replenished by the SKU cases, others can be replenished by the pallets. Likewise, the SKUs can be picked by units or cases. The information about the SKUs and cases such as the length, the width, the height, the weight, the case pack (the number units per case), and the order data affect the warehouse operation decisions. An item in the warehouse can have a single or multiple pick location(s). The products are scanned in the different functional areas for tracking and visibility purposes. Determining the best pick location(s) of the products in the warehouse is challenging. Searching and extracting the SKUs located in the smaller areas need less travel distance. However, the picker should travel more distance to find and pick an item from the larger areas.

Forward-Reserve Operations: The forward area, or the fast picking area, is a small valuable section of the warehouse with low picking cost. It is expected that the distance the picker traverses in the forward area to pick an order is less than the distance traversed in the reserve area because the forward area is smaller than the reserve area. In addition, the physical nature of rack types in the forward area discussed earlier make the pick operation more convenient in the forward area.

The items that go into the forward area are replenished (restocked) from the reserve or bulk area, which is a large area with a high picking cost, to be picked more efficiently. The SKUs are scheduled to be replenished from the reserve area to the forward area. The Warehouse Management System (WMS) keeps track of real-time inventory and schedules the replenishments. The best utilization of the areas with low picking costs plays a significant role in having a more productive warehouse.

The total picking and replenishment costs will increase considerably if a wrong set of SKUs are chosen for the forward area. The reason is that inappropriate SKU assignment results in less saving opportunities that the forward area can provide. In addition, the number of replenishments will rise if the allocated slot(s) to the SKUs in the forward area is less than optimal. Allocating more slots than optimal reduces the chance of having a larger set of SKUs in the fast picking area. A clever approach to detect the best SKU for the fast picking area and also the optimal slot allocation enhances warehouse productivity and reduces operational costs.

Since the cost of picking from the forward area is low, one may be inclined to have more products in the forward area due to the low picking cost. Two strategies lead to having more items in the forward area: enlarging the forward area, and allocating less space to each item. The first approach often increases the picking cost, since the picker has to travel a longer distance to pick. The second approach not only involves more items in the restocking process, but also increases the number of replenishments from the reserve area to satisfy the demand. The optimal size of the forward area reduces the total cost of picking and replenishments.

Pick mode equipment: To present more details about the pick modules in the forward area, different types of pick modes are compared in this section. The term pick mode refers to a region of the forward area with similar rack characteristics. Typical examples of pick modes in the forward area include five categories: pallet flow racks, carton flow racks, decked racks, steel shelving, and bin shelving. TABLE 1 compares these different types of racks shown in FIGS. 4A, 4B, 5A, 5B, 6, 7A, 7B and 8.

TABLE 1

Comparisons of the different types of pick mode racks

| | | |
|---|---|---|
| Pallet flow rack | Application | Used for the fastest movers |
| | Advantage | Can hold a substantial amount of inventory for a single SKU. Fast replenishment. Replenishment does not interfere with picking. |
| | Disadvantage | Low SKU density. Can pass few SKU's in a long distance. Low space utilization. |
| Carton flow rack | Application | Used for fast to medium movers. |
| | Advantage | Can be replenished by the behind reserve racks. Can hold a substantial amount of inventory and minimize the linear travel. Replenishment does not interfere with picking. |
| | Disadvantage | Low cube utilization. Density is lower than steel shelving and more expensive than it. Smaller product falls through the skate wheels or rollers. |
| Decked rack | Application | Used for medium to slow movers. |
| | Advantage | Can be utilized on the floor level with reserve pallets above. Medium SKU density. |
| | Disadvantage | Higher cost. Decked rack has a thick support beam compared to shelving. |
| Steel shelving | Application | Used for slow movers. |
| | Advantage | High SKU density. Can pass many SKUs in a short distance. High space utilization |
| | Disadvantage | Not ideal for larger SKUs. Replenishment is cumbersome. |
| Bin shelving | Application | Used for small slow movers. |
| | Advantage | Low cost. High space utilization. |
| | Disadvantage | Can result in excessive travel for a picker. Difficult to pick from the top shelf. Replenishment can interfere with picking. |

Forward-Reserve Problem: The literature on the forward-reserve problem so far assumes that a warehouse has one small and one large section, named fast and slow picking areas, respectively. In practice, the fast picking area may refer to a shelving area, a section of the carton flow rack, or even an automated system, such as carousels or a miniload system. This disclosure is not concerned with the specific type of system as long as the picking cost within the area is lower than in the reserve area.

To clarify the configuration of the forward-reserve area in the present disclosure, the system is described as:

(i) The warehouse has a forward and reserve area, where the picking cost from the forward area is less in the reserve area, and the restocking cost from the reserve area to the forward area is more than the cost of picking from the reserve area.

(ii) Assuming that the item is available in the reserve area, concurrent replenishment is performed, in which the replenishments can happen during the order picking process.

(iii) As opposed to a storage/retrieval machine that travels along the aisle to bring part(s) to the picker, the picking policy in both the forward and reserve areas is picker-to-parts, where the order picker walks or drives along the aisles to pick order lines.

(iv) Only one SKU can be stored in a particular slot.

Optimizing the decisions about the forward area is addressed in a well-known warehousing problem called the Forward-Reserve Problem (FRP). Two important decisions of this problem are the selection and the quantities of SKUs in the forward area. The size of the forward area is another critical decision. All previous studies assume that the set of SKUs assigned to the forward area should be known to determine the appropriate size of the forward area. The research in the present disclosure solves these three problems simultaneously.

The decisions about the forward and reserve areas are critical. Selecting the wrong products for the forward area is costly. If the slow movers are stored in the forward area, the chance of having more fast movers in the fast picking area is reduced. If the fast movers with high volume movement per year are selected for this area, the slots of the fast picking area will be depleted frequently and having enough inventory for pick operations will require more restocks.

In addition, if the allocated slots to the SKUs in the forward area are higher than the optimal, less products can be stored there and so less savings by picks will be achieved. If the allocated slots are less than optimal, it will result in more replenishments. The picking and replenishment costs in the forward-reserve problem can significantly increase with improper SKU assignment and slot allocation.

One aspect of the present disclosure: To have the best set of SKUs in the forward area continuously, warehouses apply the static FRP periodically. This approach prompts inevitable assumptions. The forward area will have a fixed set of SKUs during a certain period. The products have only one pick location in the warehouse if they are assigned to the forward area. In other words, they should be picked only from the forward area, not the reserve area. However, when the order quantity is occasionally high, it is more efficient to pick the item from the reserve area rather than the forward area. This assumption originates from choosing a fixed number as an annual demand of SKU. Furthermore, refilling the same SKU in the same location with the same replenishment quantity is not the best way to address the SKUs' order fluctuations over time. To combat this, a dynamic model is developed to update the layout of the forward area over time.

The present innovation contemplates hearing from warehouse managers who want to avoid the long list of moves generated after running the FRP. The moves are designated for transferring the slow movers to the reserve area. They may only need to update specific areas within their picking area more frequently to keep up with changing demand like seasonality. The dynamic slotting proposed in this research addresses that need. Dynamic approach performs the reslotting of the forward area—updating the forward area layout—on a frequent basis by using the replenishment of empty slots with the correct SKUs without any moves.

Besides, there are critical questions that warehouse managers are challenged with:

1. Which SKUs go into forward area?
2. How many days of inventory should a restocker store in the forward area?
3. How often should a facility reconsider the set of items that go into the forward area and allocated slots?
4. If an SKU is stored in the forward area, are there any cases that it can more efficiently be picked from the reserve area rather than the forward area?

The first two questions have been extensively studied with an assumption of continuous space of the forward area. The last two questions have not been answered in literature. The problem addressing the integral solution of assignment, allocation, and sizing simultaneously, which consider the slot and SKU geometries, have not been answered yet.

There are two major weaknesses in previous studies on the FRP. First, they assume that the space of the forward area is continuous, when most often it is discrete. Assuming cubic product movement per year and disregarding slot and SKU dimensions, they allocate cubic space of the forward area to the selected items for this area. In addition, current approaches assume decisions about the forward area are one-time decisions during the planning horizon. As a result the fast picking area is replenished with the same products for a long time. These approaches miss the opportunity of updating the layout of the forward area based on the SKUs' demand patterns over time. SKU assignment and allocation in the fast picking area are not long term decisions because of the ever-changing demand environment.

The first shortcoming of previous studies creates a gap between the "state of art" and the "state of practice" in the forward-reserve problem. The state of practice does not allow allocation of the continuous space of the forward area to SKUs, while the state of art is based on this assumption. The space wasted while allocating the SKUs to the slots is unavoidable. Geometry considerations for both slots and SKUs are necessary. A discrete FRP model is developed that relaxes these continuous model assumptions.

Aspects of the present disclosure include: (i) proposing an algorithm for both profiling and slotting optimization simultaneously. This algorithm determines the best size of each pick mode within the forward area, as well as respecting the different rack configurations, pick technology specifications and replenishment policies of the pick modes. The SKU and demand growths, the active period of the fast movers based on their order date, and the optimal case orientation in each slot are the subjects that have also been taken into consideration.

Aspects of the present disclosure also include (ii) addressing the dynamic forward-reserve problem. The first MIP formulation is developed for the dynamic assignment and allocation of the forward area. The main contribution of this research is quantifying the effects of the traditional wisdom of running the static model in certain intervals assuming constant demand. Demand trend analysis is elaborated on prior to the development of the dynamic forward-reserve model. First an Artificial Neural Network (ANN) is proposed based model for pattern recognition of the different types of demand trends. Further, an algorithm is developed for forecasting the demand quantity as described in APPENDIX. The method of forecasting is dependent of the class of demand trend recognized in the previous stage. The algorithm is the combination of the Auto Regressive Integrated Moving Average (ARIMA) model for predicting smooth demand trends and the Markov-based bootstrapping method for predicting intermittent demand pattern.

THE AREA SIZING AND SLOTTING OF A MULTI-MODE FORWARD AREA: The picking and replenishment costs of the SKUs selected for the forward area can be reduced in multi-mode forward areas. While the number of cases stored in some pick modes can be more flexible, others have a fixed storage capacity. For example, the number of slots given to the SKUs in the carton flow rack are optimized by the allocation problem. The allocated slots can be one or multiple slots. However, the SKUs selected to be picked from the pallet flow rack are stored by a definite number of cases in the pallet. Different pick modes result in different number of replenishments for the SKUs selected for the forward area.

Selecting the best types of racks (e.g. pallet flow rack, carton flow rack, bin shelving, etc.) and their effective size along with the best assignment of the SKUs to the pick mode within the forward area, considerably affects the total picking and replenishment cost. For instance, although pallet flow racks can hold many cases of an SKU on one pallet, a small quantity of that SKU can fit in one bin of bin shelving. As a result, the former has lower replenishment costs, but higher picking costs because of the lower pick density of items. On the other hand, the latter has lower picking cost inside the bay, but higher number of replenishments because of the smaller allocated space. After finding the best SKU assignment and slot allocation for each pick mode, the best size of the mode and so the overall size of the forward area are found.

The classic Forward-Reserve Problem selects the best set of SKUs for the fast picking area of the warehouse and allocates the best number of slots to them having the size of the forward area. However, the problem is addressed of determining the best number of bays/slots for each pick mode (e.g. pallet flow rack, carton flow rack, bin shelving, etc.) within the forward area. This problem is addressed while determining the best SKU assignment and slot allocation. Considering an available space, an algorithm is developed, namely Profiling and Slotting Optimization (PSO) algorithm, which can increment number of bays of each pick mode, until adding more bays in the forward area increases the travel distance and costs as determined by the following method.

Heuristic $G_2$ for finding the total cost of the static strategy:

1. Rank all SKUs in order of non-increasing $le_i$ (different definitions for $le_i$ will be discussed)
   for i=1: No. of SKUs(N) do 2. Define $n_{1i} = \lceil \frac{w_i}{w} \rceil$, $n_{2i} = \lceil \frac{ey_i}{o} \rceil$, $n_i = \max(n_{1i}, n_{2i})$ 3. Get the assignment and allocation solutions and number of restocks ($r_i$)
   end for
4. Rank all elements of SKUs assignment solution given by step (4) in order of non-increasing $r_i$.
5. Apply bottom-up deletion approach:
   for j=1: No. of selected SKUs for forward area do
7. Remove the SKU with minimum $r_i$ and add its slot to the SKU with maximum $r_i$
   end for
8. Repeat steps (1) to (7) for different 0<e≤1 with interval 0.1 to choose the one gives the minimum cost.

Algorithm for Profiling and Slotting Optimization (PSO) of multi-mode Forward Area:

Input: The SKU, order, rack, and facility data.
Output: Profiling and slotting optimization of the multi-mode forward Area.
* Import Data
Read the SKU, order, rack, and facility data.
* Fit test -continued

```
For all pick modes j > 0
    For all SKUs
        Check if the SKU (eaches) fits the slot (=1) or not (=0).
        Check if the case fits the slot (=1) or not (=0).
    EndFor
EndFor
* Find the best case orientation, which results in space utilization
For all SKUs
    Find the optimal orientation in one Pallet and one lane of the Carton Flow Rack.
EndFor
* Find the parameters required for cost analysis
For all SKUs
    Find the SKU flow, the accumulated ordered quantity (demand) and order lines (picks)
    during the planning horizon.
    The No. of eaches/cases in Min No. of slots given to the SKU in the Carton Flow Rack.
    The No. of eaches/cases in one pallet of the Pallet Flow Rack mode.
EndFor
For all pick modes j > 0
    For all SKUs
        Find the No. of restocks during the planning horizon period, if Min No. of slot(s)
        is given.
    EndFor
    Find the volume of the shelf.
EndFor
* Cost analysis
For all i in Pallet Flow Rack Bays Range
    For all j in Carton Flow Rack Bays Range
        For all k in Bin Shelving Bays Range
            Find the Ave. picking cost from the reserve area.
            For all pick modes
                Find the Ave. picking and replenishment costs of the mode by
                travel distance calculation.
            EndFor
            If the total bays fit in the picking area
                For all SKUs
                    Find the optimal number of slots given to the SKU in a
                    Carton Flow Rack.
                    comment: (Refer to the algorithm for finding $m_{ij}$ that
                    follows)
                    Find the picking cost from the reserve area.
                EndFor
                For all pick modes
                    Find the picking cost for the SKU if it is picked from the
                    mode j.
                    Find the replenishment cost for the SKU if it is picked from
                    the mode j.
                    Find the total cost for the SKU if it is picked from the mode
                    j.
                    Find the savings by picking the SKU from the pick mode
                    rather than the reserve area.
                EndFor
                While saving > 0
                    Find SKU x with the max savings by picking from mode y
                    If any slot(s) is available in the mode y
                        Assign the SKU x to the mode y
                        Exclude the allocated slot(s) to SKU x from the
                        available slot of mode y
                        Get the associated costs of SKU x
                        Exclude SKU x
                    EndIf
                EndWhile
                Find the total cost of mode (i,j,k)
            EndIf
        EndFor
    EndFor
EndFor
Find the optimal design (i*,j*,k*), which provides the Min total cost among all modes
* Export Data
```

Algorithm for finding $m_{ij}$ (units of SKU i in mode j):

```
For all SKUs
  For all pick modes
    If j = 1
```
$$m_{ij} = \left\lfloor \frac{W_1}{w_i} \right\rfloor \varphi_{ij} \theta_{ij} b_i$$

```
    ElseIf j = 2
```
$$y_i = \frac{\sqrt{q_{ij}}}{\Sigma_{k \in A} \sqrt{q_{kj}}}$$

comment: (A is the set of SKUs)

$$n_{1i} = \left\lceil \frac{w_i}{W} \right\rceil \, \& \, n_{2i} = \left\lceil \frac{y_i}{o_j} \right\rceil$$

$n_i = \max(n_{1i}, n_{2i})$
  comment: ($n_i$ is the number of slots allocated to SKU i)
  comment: (Find the number of lanes in carton flow rack given to SKU i)

$$L_i = \left\lfloor \frac{W_j N_j^{SL}}{w_i} \right\rfloor$$

$m_{ij} = L_i \varphi_{ij} \theta_{ij} b_i$
  comment: (Find the number of cases of SKU i that is replenished in mode j)
```
    ElseIf j = 3
      m_ij = b_i
    EndIf
  EndFor
EndFor
```

Although expanding the forward area decreases the total number of replenishments, the large forward area has larger fixed picking and replenishment costs because of larger travel distance. Determining the best size of each pick mode, the cost is calculated of every possible combination of bays quantities corresponding to each pick mode, while not exceeding the available space. In each iteration, the best SKU assignment and slot allocation are found as well.

Figure 9:
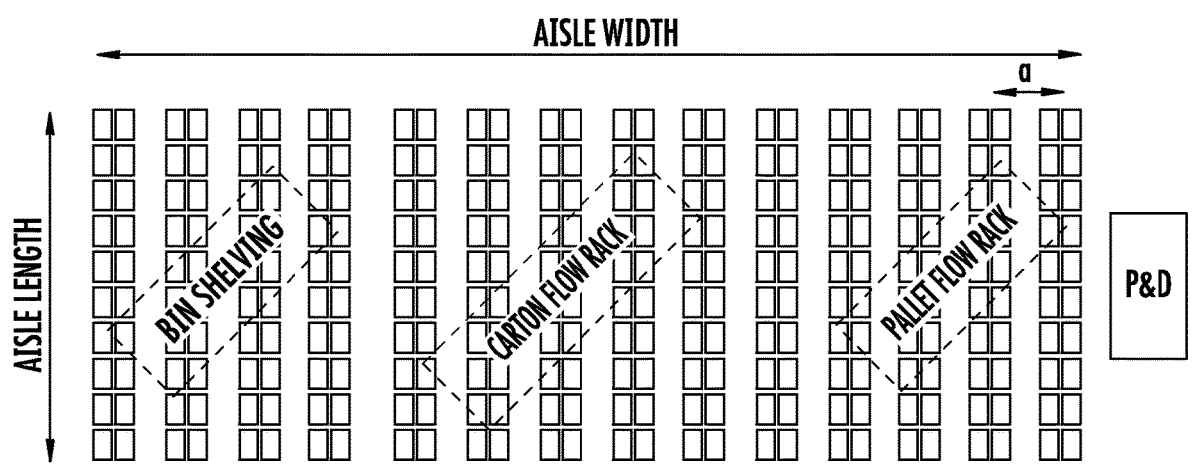
FIG. 9 illustrates a top view of a multi-mode forward area.

With regard to addressing the static problem, one iteration of the PSO algorithm refers to generating one alternative for the forward area. The alternatives differ in their number of bays of each pick mode. The average travel distance for picking or replenishing of the items depends on the size of the pick mode. The average travel distance of a pick mode refers to the average horizontal distance that the labor traverses to pick or replenish an item (average aisle width) plus the average vertical distance (average aisle length). Therefore, the model disclosed herein accounts for the different picking and replenishment costs between the pick modes with different sizes within an alternative and also between the same pick mode of different alternatives. The sequence of the pick modes within the forward area is assumed known and is taken into consideration while calculating the average travel distance. Therefore, the farther pick modes to the Input/Output point have higher average pick/replenishment travel distance (See FIG. 9.)

Besides the travel distance analysis, SKU (each), case and slot dimensions are taken into consideration in the proposed model to conduct the fitting test for the replenishment unit and the slot. Furthermore, the model suggests the best orientation of replenishment unit (case), which enhances space utilization. The space allocation to the SKUs is discrete, as opposed to the traditional method of allocating continuous space to the SKUs.

Jernigan (2004) develops a multi-tier inventory system. A multi-tier inventory system is an extension of the forward-reserve system with multiple forward modes. As opposed to one of the problems addressed herein, which assumes all pick modes are replenished from the bulk storage, Jernigan (2004) establishes intermediate modes between the forward modes and the reserve area to reduce the restocking cost. The slotting of the inventory system in her study refers to finding the SKU assignment of the forward modes and the space allotted to the SKUs there, aiming to reduce the total picking and replenishment costs. While the volumes of the storage modes are known in Jernigan (2004)'s study, the size of the pick modes coupled with the slotting of the modes is optimized according to the present innovation. Jernigan's study is also based on continuous space allocation, while the present innovation allocates discrete cases to the discrete number of slots, considering SKU and slot dimensions.

The profiling and slotting optimization (PSO) algorithm, provided above, accounts for:

1. Discrete case quantity movement: The small size fast movers have a low cubic feet movements. The continuous space allocation has the risk of assigning the small size fast movers to the high cost areas within the forward area and large size slow movers to the low cost areas within the forward area. Algorithm PSO is based on discrete quantity of moves for each SKU.

2. Discrete space allocation: PSO is a discrete space allocation model, which considers the lost spaces resulted from differences in slots and SKUs dimensions. Solving the allocation problem in a continuous space model causes many SKUs to have allocated space of less than the volume of one slot, which is impractical. Rounding up the solution and allocating one slot to these category leads to exceed the size of the forward area, which is infeasible. The PSO algorithm considers discrete space allocation, as opposed to the continuous space allocation of the picking areas. So, discrete units of the SKUs (case quantities) are stored in discrete units of slots. This concept prevents allocating a portion of a slot to the SKUs.

3. Replenishment unit fit test: If the dimensional fitness of the SKU to the slots of the pick modes is not checked, there is the risk of assigning the large size items in small size rack types. The PSO algorithm will consider both SKU and slot dimensions.

4. Optimizing case orientation: Finding the best case orientation in the rack and maximum feasible stack level leads to better space allocation and so more cases can be replenished in the slot. So, the number of replenishments will be reduced. SKU rotation allows the SKUs to have more options for being assigned to the different pick modes. The PSO suggests the best case orientation.

Notation:

1. Rack information:
   j: Pick modes, $j \in \{0, 1, 2, 3\}$
   $W_j$: Slot width in pick mode j
   $L_j$: Slot Depth in pick mode j
   $H_j$: Slot height in pick mode j
   $O_j$: Volume of slot in pick mode $j = (W_j L_j H_j)$
   $N_j^{SH}$: Number of shelves per bay in pick mode j
   $N_j^{SL}$: Number of slots per shelf in pick mode j
   $N_j^{B}$: Number of bays in pick mode j
   $W_j^{SH}$: Shelf width in pick mode j
   $V_j$: The volume of the pick mode $j = (N_j^B N_j^{SH} W_j^{SH} L_j H_j)$ 2. SKU information:
   $w_i^{sku}$: Width of SKU i $l_i^{sku}$: Length of SKU i
$h_i^{sku}$: Height of SKU i
$w_i$: Case width for SKU i
$l_i$: Case length for SKU i
$h_i$: Case height for SKU i
$o_i$: Volume of case containing SKU i ($=w_i l_i h_i$)
$b_i$: Eaches per case for SKU i
$L_i$: Find the number of lanes for SKU i in carton flow rack
$\theta_{ij}$: Maximum No. of cases of SKU i in depth of slot in mode $$j\left(=\left\lceil\frac{L_j}{l_i}\right\rceil\right).$$

$\varphi_{ij}$: Maximum calculated stack level for SKU i in slot of mode $$j\left(=\min\left(p_i\left\lceil\frac{H_j}{h_i}\right\rceil\right)\right).$$

$p_i$: Max given stack level of SKU i
3. Costs notation:
$c_j^p$: Average picking cost from pick mode j.
$c_j^r$: Average replenishment cost of pick mode j>0 ($c_{i0}^r=0$.)
$r_{ij}$: Number of replenishments if SKU i is assigned to mode j>0 ($r_{i0}=0$.)
$C_{ij}^p$: Picking cost if SKU i is assigned to mode j.
$C_{ij}^r$: Replenishment cost if SKU i is assigned to mode j>0 ($c_{i0}^r=0$.)
$C_{ij}^T$: Total picking and replenishment costs, if SKU i is picked from the mode j.
$s_{ij}$: Saving of SKU i, if it is picked from mode j>0 rather than mode 0.

The steps of the proposed algorithm for Profiling and Slotting Optimization of the forward area are as follow. The algorithm has been coded with the Python programming language.

1. Import data: Four types of data are imported: SKU data, order data, rack data and facility data. The SKU data provides the information about the case and SKU (each) dimension. The order file contains the historical demand data. The rack information delivers the setting of the racks in different types of pick modes (see TABLE 6). The available space for designing the forward area and number of bays in the reserve area are provided by the facility data to estimate the fixed picking and replenishment costs. TABLE 3 summarizes the inputs parameters.

TABLE 3

| Inputs | | | |
|---|---|---|---|
| SKU Data | Order Data | Rack Data | Facility Data |
| SKU Number | Time | Width of a shelf | Horizontal length of the forward area |
| SKU Length | SKU Number | Depth of a shelf | Vertical length of the forward area |
| SKU Width | Order quantity | Height of a shelf | No. of bays in one aisle of the reserve area |
| SKU Height | | No. of level | |
| Case Length | | No. of Slots per Shelf | No. of aisles in reserve area |
| Case Width | | | |
| Case Height | | | |
| Case Pack | | | |
| Max Stack Level | | | |

The pallet flow rack, which is generally the best option for the fast movers, is assumed to be closest zone to the Pick up and Deposit (P&D) point. Next, the carton flow rack and the bin shelving zones are designed (see FIG. 9). Three types of pick mode are considered in the example warehouse.

2. Fit test: Based on SKU and slots dimensions, the SKUs that are not fitted to a particular type of slot will not be assigned to that rack type.

3. Case orientation: For all SKUs, the best case orientation in each pick mode that gives the maximum space utilization is determined in this section of the PSO algorithm.

4. Finding other parameters: The SKU demand $d_i$ and picks $p_i$, which is the sum of order quantity and the order lines per SKU during the planning horizon, respectively, and the SKU flow $f_i$ or the number of cases of SKU i during the planning horizon, are found in this step. $f_i$ can be found as:

$$f_i = \frac{d_i}{b_i} \qquad \text{Eqn. 1}$$

$a_{ij}$ is defined as the number of cases of SKU i that can be stored in one pallet of a pallet flow rack (j=1), the number of cases can be stored in minimum number of feasible slots in a carton flow rack (j=2), or one for bin shelving (j=3). Assuming that the case pack quantity can fit in one bin of bin shelving, $a_{ij}$ is obtained from:

$$a_{ij} = \begin{cases} \theta_{ij}\varphi_{ij}\left\lfloor\frac{W_j}{w_i}\right\rfloor, & \text{if } w_i \le W_j \\ \theta_{ij}\varphi_{ij}, & \text{otherwise} \end{cases}$$

For the pallet flow rack, $a_{ij}$ is calculated from the first equation of $a_{ij}$, because the case width is always less than the pallet width. For bin shelving, $a_{ij}$ is one case.

TABLE 4

6 possible case orientations in a slot

| Orientation | $W_j$ | $L_j$ | $H_j$ |
|---|---|---|---|
| 1 | $w_{ij}$ | $l_{ij}$ | $h_{ij}$ |
| 2 | $w_{ij}$ | $h_{ij}$ | $l_{ij}$ |
| 3 | $l_{ij}$ | $h_{ij}$ | $w_{ij}$ |
| 4 | $l_{ij}$ | $w_{ij}$ | $h_{ij}$ |
| 5 | $h_{ij}$ | $l_{ij}$ | $w_{ij}$ |
| 6 | $h_{ij}$ | $w_{ij}$ | $l_{ij}$ |

For each SKU, six (6) possible case orientations are rechecked to find the best orientation of the case in pick mode j that gives the maximum $a_{ij}$ (see TABLE 4.) $q'_{ij}$ is defined as the number of replenishments if the minimum number of slot(s) of mode j is allocated to the SKU and is calculated as below:

$$q'_{ij} = \frac{f_i}{a_{ij}} \qquad \text{Eqn. 2}$$

5. Cost analysis: In this section, for every possible combination of the number of bays in each pallet flow rack, carton flow rack and bin shelving, the savings of picking from these areas versus picking from the reserve area are calculated for all SKUs. The slow movers with negative savings, however, are picked from the reserve area. The reserve area, pallet flow rack, carton flow rack, and bin shelving have the modes 0, 1, 2, and 3, respectively, in the example. To calculate the average picking and replenishment costs, it can be assumed that the maximum horizontal length and vertical length of the available space for the forward area are given. The total costs and savings of an SKU by picking from the mode j are calculated as:

$$r_{ij} = \left\lceil \frac{H_j}{h_i} \right\rceil \qquad \text{Eqn. 3}$$

$$C_{ij}^T = C_{ij}^p + C_{ij}^r \qquad \text{Eqn. 4}$$

$$= c_j^p p_i + c_j^r r_{ij} \qquad \text{Eqn. 5}$$

$$s_{ij} = C_{i0}^T + C_{i,j>0}^T \qquad \text{Eqn. 6}$$

where $r_{ij}$ is the number of replenishment of SKU i in mode j. $m_{ij}$ is the units (eaches) of SKU i in mode j. The algorithm for finding $m_{ij}$ can be found above.

TABLE 5

Outputs

| Slotting and Cost Data | | Size of each pick mode |
|---|---|---|
| SKU No. | Slots in CF | No. bays of carton flow rack |
| Pick mode | Cases in CF | No. bays of pallet flow rack |
| Adjusted Width | Lanes in CF | No. of bays of bin shelving |
| Adjusted Length | Stacks in CF | |
| Adjusted Height | Depth in CF | |
| Each fit CF? | Ordered QTY | |
| Case fit CF? | Order Lines | |
| Each fit PF? | SKU Flow | |
| Case fit PF? | Saving | |
| Each fit SH? | Picking Cost | |
| Case fit SH? | Replenishment Cost | |
| Total Cost | | |

PF = Pallet flow rack
CF = Carton flow rack
SH = Bin shelving

6. Export file: The algorithm will be terminated by exporting the outputs. An example implementation of the PSO algorithm for an example warehouse with 28 SKUs is described herein. The rack information data can be found in TABLE 6. Using PSO algorithm, the optimal number of bays of pallet flow racks, carton flow racks and bin shelving, are 3,3,1, respectively ([$N_1^B$, $N_2^B$, $N_3^B$]=[3,3,1]). If the forward area is expanded more, the picking and replenishment costs will increase. The algorithm then suggests the best number of bays of each pick mode, along with the maximum total savings.

TABLE 6

Rack Information.

| | Carton Flow Rack (CF) | Pallet Flow Rack (PF) | Bin Shelving (SH) |
|---|---|---|---|
| Width of a shelf | 96 | 96 | 48 |
| Depth of a shelf | 96 | 48 | 21 |
| Height of a shelf | 20 | 60 | 12 |
| Number of levels | 4 | 1 | 5 |
| Number of slots per shelf | 6 | 2 | 4 |

Extensions: The PSO algorithm provided above is a general model for sizing and slotting of the zones of the forward area. Considering the broad spectrum of requirements in real world warehouses, the opportunities to empower the PSO algorithm can be evaluated in many ways. The goal is to explore and validate multiple pick mode design options that meet the distribution center's requirements. The main features that have been added to the model are as follows:

Volume growth and SKU growth: Two types of growth affect the decisions made about the forward area: SKU growth and units growth. They should be considered while planning for the size of the pick modes. The units growth is the total growth in shipping units during the planning horizon, which includes the SKU growth as well. If no new SKU is introduced to the warehouse during the planning horizon (e.g. next 2 years), meaning that the SKU growth is equal to zero, it is possible to account for the units growth by multiplying the historical SKUs demand and pick data by the units growth in the forward area sizing problem. The effect of the SKU growth is zero in this case. Thus, the SKUs demand will grow by the units grow factor itself. However, when the SKU growth is not zero, the SKU growth should be extracted from the units growth to provide a net growth factor. This prevents an over-expansion of the forward area. Applying the units growth and the SKU growth separately on the demand data executes the SKU growth twice because the units growth already includes the SKU growth. The net growth factor can be applied to the demand data, which will address both growths simultaneously. The goal is to change the historical demand data to account for both units and SKU growths.

Factor γ (%) is defined as the net growth factor, which can address both types of growth. Thus, planning for the size of the pick modes will be based on the demand data, which has grown by γ. α=γ+1 is presented in the following equations for simplification. Assume:

$a_1$: Units growth during the planning horizon (%)×0.01.
$a_2$: SKU growth during the planning horizon (%)×0.01.
$n_1$: Number of SKUs before the SKU growth.
$n_2$: Number of added SKUs after the SKU growth ($n_2=a_2n_1$.)
$p_i$: Historical picks (lines) for SKU i before any growth, $i \in \{1, \ldots, n_1\}$.
$\bar{p}$: Average picks (lines) of new SKUs based on the historical pick data.

$$\alpha = (\Sigma_{i=1}^{n_1} p_i + n_2 \bar{p}) = (1+a_1)\Sigma_{i=1}^{n_1} p_i \qquad \text{Eqn. 7}$$

The term $n_2 \bar{p}_i$ in Eqn. 7 represents the expected additional picks in the future, which considers the SKU growth. It is assumed that the prospective SKUs have the mean picks of the historical pick data. Then, α is applied to the expanded data set, containing both prospective and current SKUs. This would be equivalent to applying the (1+$a_1$), which inherently includes both units and SKU growths, to the picks of the current SKUs in the warehouse. Then, by setting $$\bar{p} = \frac{\sum_{i=1}^{n_1} p_i}{n_1},$$

the following is obtained:

$$\alpha \left( \sum_{i=1}^{n_1} p_i + n_2 \frac{\sum_{i=1}^{n_1} p_i}{n_1} \right) = (1 + a_1) \sum_{i=1}^{n_1} p_i \qquad \text{Eqn. 8}$$

For simplicity, it can be assumed: $\beta=\sum_{i=1}^{n_1} p_i$ $$\alpha\left(\beta + n_2 \frac{\beta}{n_1}\right) = (1+a_1)\beta \qquad \text{Eqn. 9}$$

$$\alpha\beta\left(1 + \frac{n_2}{n_1}\right) = (1+a_1)\beta \qquad \text{Eqn. 10}$$

$$\alpha\left(1 + \frac{n_2}{n_1}\right) = (1+a_1) \qquad \text{Eqn. 11}$$

$$\alpha\left(1 + \frac{a_2 n_1}{n_1}\right) = (1+a_1) \qquad \text{Eqn. 12}$$

$$\alpha = \frac{1+a_1}{1+a_2} \qquad \text{Eqn. 13}$$

$$\gamma = \frac{1+a_1}{1+a_2} - 1 \qquad \text{Eqn. 14}$$

$$\gamma = \frac{a_1 - a_2}{1+a_2} \qquad \text{Eqn. 15}$$

Eqn. 15 illustrates that the actual growth factor $\gamma$ is not affected by the order data. It can also be determined if the SKU growth, $a_2$, is larger than the volume growth, $a_1$; the decreasing factor should be applied to the historical order data.

From a practical viewpoint, if a high number of new SKUs are introduced to the warehouse (high SKU growth) but the total shipping units do not considerably grow (low units growth), the historical order data is experiencing a downward trend with a decreasing $\gamma$ factor. Likewise, if a low number of new SKUs are introduced to the warehouse (low SKU growth) but the total shipping units are growing considerably (high units growth), the historical order data is experiencing an upward trend with an increasing $\gamma$ factor. If the SKU and units growth are the same, $a_1=a_2$, it means that the new SKUs' orders are following the order history. No change in order data is required, however, when the $\gamma$ factor is zero. After applying the $\gamma$ factor to the historical order data, the size of the forward area is expanded based on SKU growth, $a_2$, accordingly, to stay up-to-date with the projected growths.

Time window analysis: Among those SKUs that have been selected to be picked from the forward area, many items are active only during a specific period of the year and are occasionally ordered (Halloween products, Christmas products, etc.). These seasonal products are fast movers in their active period and inactive during the rest of the planning horizon. Those seasonal products that their active periods have no overlap during the planning horizon can share their slots in the forward area. Considering an individual space for the seasonal items in the forward area expand the forward area unnecessarily. Storage sharing of the seasonal items prevents over expansion of the forward area. Considering that seasonal fast movers are not always active during the planning horizon, the storage share idea provides the opportunity of having active fast movers in the forward area.

The "start and end order dates" of each SKU are extracted from the order file. Therefore, the active periods of all SKUs, which is the period between these two dates, are achieved. Those active SKUs, which are picked from the similar pick mode zone and whose active periods do not have any overlap, will share one location in that zone. For example, the Christmas products will replace the Halloween products, when their active periods are over. This method shrinks the forward area as required and shortens the travel distance for the rest of the fast movers, which are active all year. Numerical example will quantify the decrease in number of slots by storage share in each pick mode.

Although it can be assumed that the SKUs have multiple active periods during the planning horizon, a single active period per SKU is considered, beginning with the first order date and ending with the last order date. The reason is the opportunity of replacing the SKU, whenever it gets inactive, is delivered by the dynamic slotting of the forward area.

Other extensions of the PSO algorithm: Other features that have been applied to the model are stated below:

(i) Reorder point. This percentage triggers the replenishment process, whenever the inventory on hand for the SKUs in the forward area is diminished up to a certain threshold. Different pick modes present different replenishment trigger thresholds, but larger values for this factor leads to more frequent replenishments.

(ii) Space utilization factor. This factor determines the space efficiency of the pick modes. Higher space utilization refers to the higher density of products in the bay. Since the model considers the discrete replenishment units, there is always some lost space due to the difference between the dimensions of the slots and the cases. The space utilization factor of the bay in pick mode j is:

$$\frac{\text{Total volume of all cases in one bay of pick mode } j}{\text{Bay width} \times \text{Bay depth} \times \text{Bay height}} \qquad \text{Eqn. 16}$$

(iii) Lock the dimension. Although the PSO algorithm can deliver the optimal orientation of the cases in the slots, which results in the highest spaces utilization, some SKUs need to be locked by certain dimension(s). The lock dimension for each SKU is a binary input. For example, setting the "height case locked" to one SKU indicates that the slotted case orientation height must match the Case Height. Even an SKU is locked in one dimension, the orientation of other two dimensions is fixed.

Numerical example with a large data set: To test the pick mode model, real warehouse data with 6,000 SKUs was used. The historical order data contains 3,501,347 order lines over 391 days. The projected SKU and volume growth are 10% each. The replenishment trigger percentage is set to 10% based on their replenishment policies. The SKU and case dimensions are available and the dimensions are not locked. The rack types considered for the fast picking area are standard size pallet flow rack, carton flow rack and bin shelving (see TABLE 6).

Figure 10:
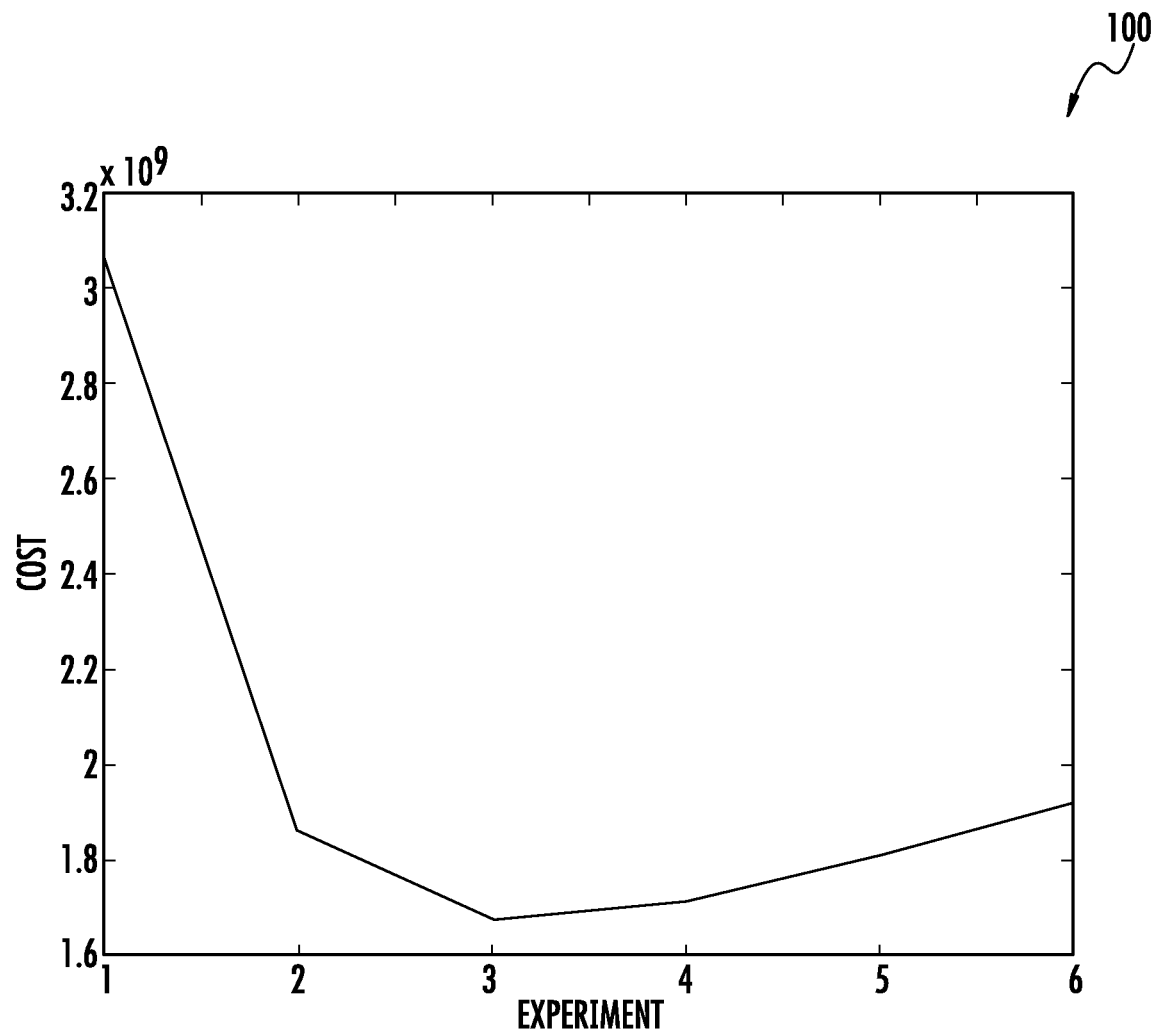
FIG. 10 illustrates a graphical plot of pick mode cost for experiments 1 through 6.

Changing two parameters of aisle length and width, six experiments are designed with different sizes of the forward area's available space to study the pick mode model performance. The aisle width and length are increased in steps of 1000" and 500", respectively. TABLE 7 presents the relevant numerical results. $[N_1^B, N_2^B, N_3^B]$ and $[N_1^B, N_2^B, N_3^B]^*$ are the relevant solutions without and with the time window analysis. The time window analysis reduces the zones' size, where there is the opportunity of sharing the locations among the fast movers with no overlap in their active periods. FIG. 10 shows that the picking and replenishment costs will no longer be reduced after experiment 3 and the optimal size of the forward area is 4000"×2000". The reason is that the travel cost of larger forward areas are greater. The solution time rises in extending the area.

TABLE 7

Experiments for pick mode analysis

| No. | Aisle Width | Aisle Length | [$N_1^B, N_2^B, N_3^B$] | [$N_1^B, N_2^B, N_3^B$]* | Cost | Solution Time |
|---|---|---|---|---|---|---|
| 1 | 2000 | 1000 | [10, 50, 160] | [10, 50, 159] | 3064664986 | 587.16 |
| 2 | 3000 | 1500 | [15, 165, 155] | [15, 165, 129] | 1863577592 | 888.26 |
| 3 | 4000 | 2000 | [20, 280, 82] | [20, 278,44] | 1676469592 | 1890.83 |
| 4 | 5000 | 2500 | [26, 286, 52] | [25, 284, 40] | 1719429196 | 3485.69 |
| 5 | 6000 | 3000 | [31, 310, 62] | [30, 306, 21] | 1811408626 | 7045.21 |
| 6 | 7000 | 3500 | [36, 324, 72] | [29,319, 12] | 1923196148 | 15686.47 |

Figure 11:
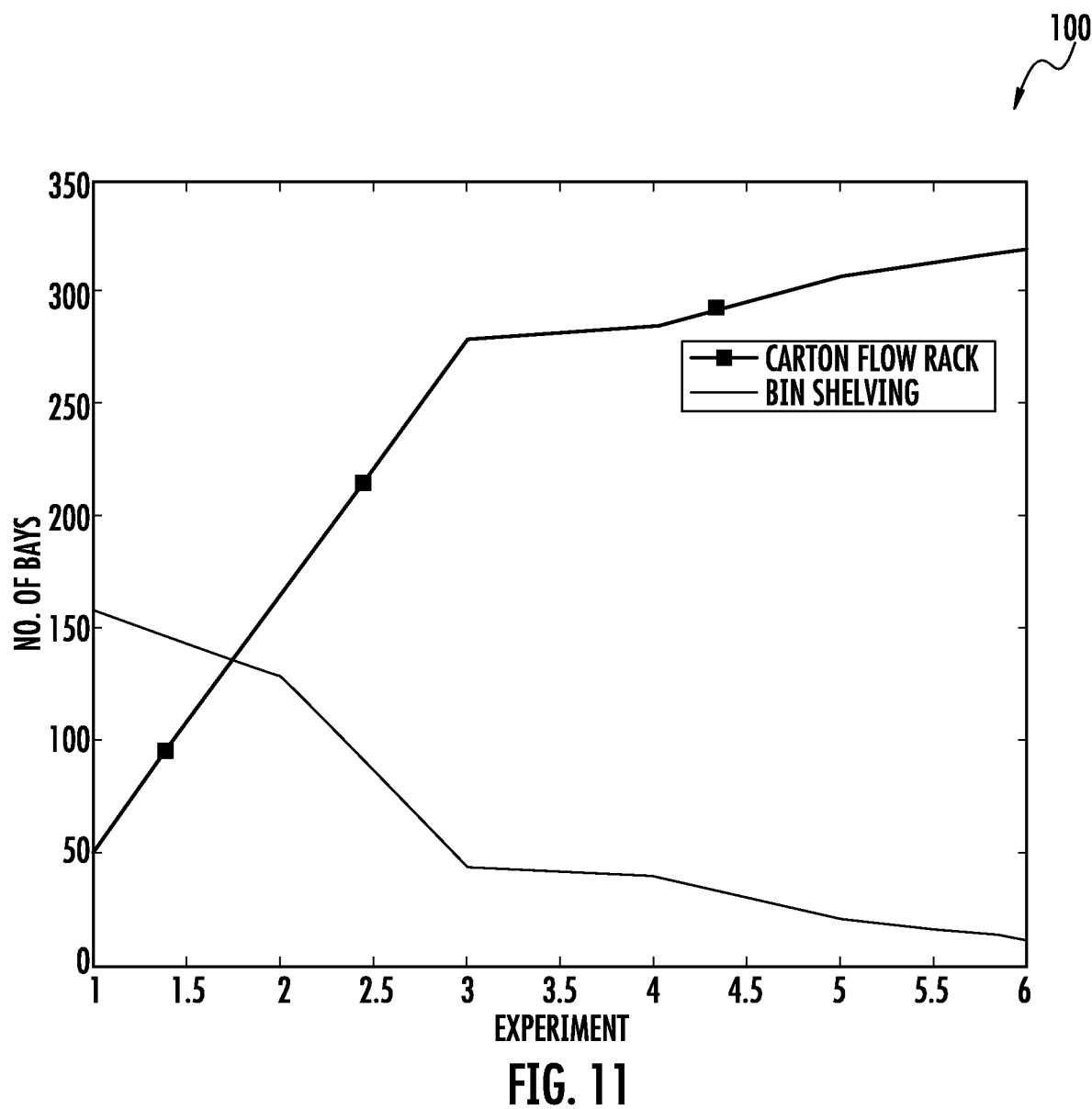
FIG. 11 illustrates a graphical plot of carton flow rack and bin shelving comparison.

FIG. 11 compares the optimal number of bays of the carton flow rack and bin shelving in the six experiments. One insightful outcome of this figure is that larger forward areas to have more carton flow racks and smaller forward areas tend have larger bin shelving area. The allocated space to the SKUs in the bin shelving area is less than the carton flow rack area. In the example, one bin is given to each SKU in the bin shelving area, and each bin can contain one case, if the case and the bin dimensions fit. However, carton flow rack slots can provide more than one case per SKU because the carton flow rack's slots are larger than the bins in the bin shelving area. The bin shelving mode provides the opportunity of having the fast movers in small forward areas. As a result, the best storage mode of the SKUs selected for the forward area depends on the size of the available space for designing the forward area.

Conclusion: The PSO algorithm is proposed for both profiling and slotting optimization. It determines the best size of a different pick mode in the forward area, along with the SKU assignment and slot allocation. PSO includes a replenishment unit fit test and implements the case orientation test for maximizing space utilization within a slot type. It was shown how the time window analysis, which is based on sharing the storage in the forward area among the seasonal fast movers with different active periods, makes the size of each pick mode smaller, causing the overall size of the forward area to decrease. Using this idea, it is possible to make the picking and replenishment travel distances shorter without giving the seasonal SKUs a smaller allocated space in the forward area. Finally, the results of the six experiments on a real warehouse data set showed that the larger available space for the forward area leads to having more carton flow racks than bin shelving settings.

THE DYNAMIC FORWARD-RESERVE PROBLEM: In the static forward-reserve problem, the SKUs' positions are fixed and a particular SKU designated for a slot in the forward area will be replenished in the same slot during the planning horizon. Because the warehouse environment is dynamic, why not consider storing those SKUs with certain demand trends in the forward area? Dynamic Forward-Reserve Problem (DFRP) changes the layout of the forward area by real-time replenishments of the correct SKUs in the naturally emptied slots by picks. This approach should not be confused with similar concepts. DFRP is different from "warehouse reshuffling", which refers to the process of converting the current slotting to a designated target map. Relocating SKUs to convert from the current slotting to the target map (optimal layout of the forward area) obtained from static slotting optimization are typically called "moves" or "slotting moves." The interval between the first and last move for getting from current state to target map is called the "reshuffling period."

Warehouse managers often want to avoid the large number of moves suggested by the static slotting software. The DFRP approach improves the layout of the forward area on a frequent basis by using the replenishment of empty slots with proper SKUs.

The question of "Should we reslot our warehouse?" is popular in practice. One strategy is running the static model periodically, e.g. monthly, but warehouse managers should know how often they need to re-layout the warehouse to update the current slotting to the target map. The best interval for the forward area re-layout is uncertain. If the selected period is shorter than the best time for re-layout, it will be disruptive. Some SKUs are moved to the reserve area without attaining their expected savings from being stored in the forward area. On the other hand, if the selected period is long, one cannot be sure if one has the optimal layout of the forward area over time. As a result, improper SKUs, which are no longer eligible to be in the forward area due to their demand trend, will stay there. A good reslotting methodology not only reslots seasonal items, but also corrects the mis-slotted items of other demand pattern classes.

Therefore, having a strategy that guarantees the best layout of the forward area is critical. The goal is to make sure that the assignment and allocation of SKUs to the forward area are always updated during the planning horizon. Three concepts of updating the layout of the forward area are:

1. Dynamic warehouse reshuffling: This method is based on repositioning and (or) the adding/dropping of SKUs in the forward area by moving them. The number of empty slots and their positions vary in each state depending on the demand profile. Given the varying current slotting and the target map at each unit of time, this model suggests the best moves to convert the current slotting to the target map during the planning horizon. The goal is to have both the minimum number of moves and the shortest moves from the origin slot to the destination slot. This methodology takes advantage of the empty slots in a real-time process to replenish the correct items in the correct locations. In this strategy, the slots in the forward area are not identical, and moving the SKUs located close to each other costs less than moving the farther ones.

2. DFRP with no moves: Given an empty slot in a forward area and full information about the historical demand, this concept decides whether the restocking is with the same SKU or a different one. This approach explicitly schedules real-time replenishment activities and considers the sequence of replenishments.

3. DFRP with moves: This method, which is the complement of the second method, gives the opportunity of extracting slow movers in the forward area and moving them to the reserve area. Therefore, some implementations involve not only making decisions about picking locations and replenishments, but also about those SKUs that require to be moved to the reserve area. The slots of the forward area are identical in the second and third approaches. These approaches do not require the slotting map as an input. Since the warehouse environment is dynamic, it is necessary to continuously update the forward area layout. This disclosure will addresses at least the last two concepts—DFRP with no target map or designated moves. Factors that account for this dynamic environment include the seasonal item demand fluctuations, promotional policies, and the general economic conditions that affect the demand trends. These factors are called "destabilizing events". When these events occur, it is likely that temporarily excluding and including some SKUs in the forward area can reduce costs. Instead of using accumulated annual demand data, raw order data is used, which preserves the knowledge that can be obtained from real-time demand trends.

In this section, the studies with a dynamic approach in a warehousing context are reviewed, such as the dynamic order picking system, the dynamic order replenishment system, the dynamic inventory strategy, the dynamic slotting of the correlated SKUs, and the dynamic lot-sizing. Next, the necessity for developing the dynamic assignment and allocation of SKUs in the forward area is addressed.

For a less than unit load warehouse, Landers et al. (1994) develop a framework for a dynamic order picking system. Their study considers the correlated and commonality of demand within families. These considerations lead to resizing the slots. A clustering algorithm determines the group of SKUs that are stored together based on the long-run average correlation. As a result, a long run average flow may cause ineffective slotting.

Yingdea and Smith (2012) address the SKU correlations based on the picks to re-slot the correlated SKUs. Where aspects of this disclosure improve the picking and replenishment costs by dynamic SKU assignment and allocation in the forward area, Yingdea and Smith (2012) improve the picking efficiency by assigning correlated SKUs to their adjacent slots in a warehouse. The authors propose an ant colony optimization with a slot exchange policy to assign the correlated SKUs. The limitation of this paper is the assumption that the cartonization information is known. They use the same Mixed Integer Programming (MIP) formulation proposed by Kim and Smith (2012), whose objective is to minimize the pick wave span and maximize the total completion time among all pickers. Kim and Smith (2012) study SKU assignment to zone-based carton picking DC, where the WMS makes the routing decisions dynamically. They propose four two-phase heuristics for the slotting problem. One of these heuristics applies simulated annealing based on correlated interchanges. Their picking area becomes completely emptied each day and is replenished after every pick wave.

A limited number of studies evaluate the dynamic perspective by analyzing the warehouse activities like the dynamic order picking system and the dynamic order replenishment. Bukchin et al. (2012) develop a Markov-based model that determines whether to go on a tour and pick the accumulated orders or to wait for more orders to arrive at every period. Therefore, the solution decides the batching orders in a dynamic, finite-horizon environment. Order tardiness and overtime costs of the pickers are minimized in their model.

Gong and De Koster (2008) develop a dynamic order picking system, in which orders arrive in real-time and the picking information is dynamically changed during the picking operation. Therefore, the pick locations are not fixed in a picking cycle and the response time is reduced. They show that the polling-based picking systems outperform the traditional batch picking systems using optimal batch sizes in terms of order waiting and throughput time.

Further, Berman and Kim (2001) studied a dynamic order replenishment system, which follows an Erlang distribution. They show that Erlang lead times are more stable than exponential lead times in terms of the cost. Finally, they recommend dynamic policies with an adjusted reorder point based on customer orders and the inventory status. This method is more efficient than traditional inventory policies. According to the present disclosure, the dynamic model makes decisions about the forward area assignment, the allocation, and the replenishment regarding the SKUs' inventory in this area. Berman and Kim (2004) study the dynamic inventory strategy and the replenishment policy. They propose a Markov based model to reach an optimal dynamic inventory strategy and maximize the facility's profit.

According to the present disclosure, a mathematical model of a dynamic discrete forward-reserve problem (method 1) is provided. The comparison of the dynamic model with the static forward-reserve model is then discussed.

Mathematical Model: The static FRP has several assumptions:

1. A fixed set of SKUs selected for the forward area. The set of SKUs assigned to the forward area is fixed during the planning horizon. So, if a slot becomes empty, the same SKU as before will be replenished in that slot. The dynamic model decides based on the SKUs' demand patterns whether or not the same SKU should be replenished in the empty slot(s).

2. A fixed number of slots allocated to the SKUs selected for the forward area. Due to the demand fluctuation, the number of slots given to the SKUs in the forward area should change over time. The dynamic allocation allows varying number of slots to the assigned SKUs to the forward area, when required.

3. Restricting the model to always pick from the forward area if the SKU exists there. If an SKU is assigned to the forward area, no matter the order quantity, it is picked from the forward area and not from the reserve area. Nonetheless, the dynamic model intends to command the picking of SKUs with a high order quantity from the reserve area, not the forward area, to reduce the replenishments.

4. Stocking the fixed steps of multiple units in the forward area. The quantity stocked in the forward area is defined as the steps of multiple units. In other words, the replenishment units is the factor based on the number of allocated slots (e.g. if the maximum storage unit for SKU x is 100 cases, and the allocated slots is two slots, 200 cases is stocked in each restocking event). However, there is the chance of replenishing of the non-empty slots with less than the maximum storage units.

5. Pick quantity is always less than the full allocation. The pick quantity of the SKUs in the forward area is always less than the full allocation of the SKU in the forward pick area. However, the large order quantities may be referred from the reserve area to save the replenishment costs.

6. The unlimited restock quantity by the restocker. Likewise, the number of cases that a restocker can restock is unlimited in a static model. However, the material handling device has a limited capacity in the dynamic model.

7. A non-integral number of replenishments. The number of restocks is not integral in a static forward-reserve problem. This assumption and also the free first restock affect the optimal solution. A dynamic model delivers an integer number as the number of replenishments for each SKU.

8. The frequency of running the static model is assumed as known. The static model does not address the question of "how often to run the optimization model to update the assignment and allocation of the forward area". Rather, the dynamic model optimizes the layout of the forward area continuously.

In this section, a generic Mixed Integer Programming (MIP) formulation is proposed for dynamic and discrete assignment and allocation of SKUs into the forward area. The aforementioned assumptions are relaxed in the proposed MIP model. The real world warehouse requirements inspired us to avoid the static model assumptions. Some constraints are embedded in the model to address these critical requirements. The inputs of this model include: the item file containing the SKUs' dimension, the slot file containing the information of the slots in the forward area, and the order file.

Parameters:
N: Number of SKUs (i=1, 2, . . . , N)
T: Number of periods (t=1, 2, . . . , T)
c: Restock cost
$c_1$: Cost of picking from the forward area
$c_2$: Cost of picking from the reserve area
$e_i$: Number of units of SKU i that can be stored in one slot
$d_{it}$: Demand of SKU i at time t
$p_{it}$: Number of picks of SKU i at time t
η: Total number of slots in the forward area Decision Variables:
$x_{it}$: 1 if SKU i is picked from the forward area at time t; 0 otherwise
$y_{it}$: 1 if SKU i is restocked at time t; 0 otherwise
$l_{it}$: Inventory of SKU i in the forward area at the end of time t
$R_{it}$: Number of units of SKU i that are restocked at time t
$n_{it}$: Number of slots occupied by SKU i at time t, $n_{it} \in \{0, 1, 2, 3, \ldots\}$ The generic MIP model of DFRP: The MIP mathematical model is proposed for the dynamic-discrete forward-reserve problem for the first time as follows:

$$\text{Min} C_1 = c_1 \sum_{i=1}^{N} \sum_{t=1}^{T} p_{it} x_{it} + c_2 \sum_{i=1}^{N} \sum_{t=1}^{T} p_{it}(1-x_{it}) + c \sum_{i=1}^{N} \sum_{t=1}^{T} y_{it} \qquad \text{Eqn. 17}$$

subject to:

$$-I_{it} + I_{i,t-1} + R_{it} - d_{it}x_{it} = 0 \quad \forall i, t \geq 2 \qquad \text{Eqn. 18}$$

$$\sum_{i=1}^{N} n_{it} \leq \eta \quad \forall t \qquad \text{Eqn. 19}$$

$$R_{it} \leq \eta e_i y_{it} \quad \forall i, t \qquad \text{Eqn. 20}$$

$$n_{it} \geq \frac{I_{i,t-1} + R_{it}}{e_i} \quad \forall i, t \qquad \text{Eqn. 21}$$

$$R_{it}, I_{it} \geq 0 \quad \forall i, t \qquad \text{Eqn. 22}$$

$$x_{it}, y_{it} \in \{0, 1\} \quad \forall i, t \qquad \text{Eqn. 23}$$

$$n_{it} \in \{0, 1, 2, 3 \ldots\} \quad \forall i, t \qquad \text{Eqn. 24}$$

This model decides the replenishment of empty slots, which appears during the order picking, with the same SKU or a different one. Unlike the static forward-reserve problem, which is non-linear, the dynamic model is linear. The objective function in equation 17 is the total cost of picking and replenishments of SKUs assigned to the forward or reserve area.

In this dynamic model, SKUs may occupy more than one slot in the forward area. This model takes advantage of a "shared storage" policy in which the residual empty space generated by order picking might be aggregated, such that more SKUs could be put in the forward area. In each time period, some slots that become empty provide the opportunity of storing the appropriate SKUs in the forward area. However, each SKU reserves its own restocking slots as it nears the time for replenishment, as in "dedicated storage."

The concept of time period t in the dynamic model may vary in different warehouses with different picking/replenishment methods and SKU activities. For example, the warehouses, which apply the "wave" picking method, may choose the length of the wave as t. A wave is constructed with groups of orders. t may also be corresponded to the daily items' flow. It is expected that t expresses a shorter intervals in more active warehouses with higher product flows. Comparing to the inactive warehouses, the inventory level of the slots in active warehouses are depleted faster due to more frequent picks. t should be small enough to capture the changes in inventory status of slots and trigger the replenishments. Choosing a short t interval (e.g. hour) in inactive warehouses will not add value to the dynamic model because of no change in inventory levels of slots over a sequence of t.

The unit of inventory in this problem is selling units. Constraint 18 guarantees that the demand is satisfied by picking either from an on-hand inventory in the forward area or from the reserve area. The existence of an SKU in the forward area can be tracked by its inventory level, $I_{it}$.

If the demand of SKU i is satisfied from the forward area at time t, then $x_{it}=1$. However, this model does not mandate picking from the forward area, if $I_{it}>0$, since product i stocked in the forward area can more efficiently be picked from the reserve area in the case of high order quantity per pick. The model makes such decisions implicitly.

Constraint 19 does not allow the total allocated slots to the SKUs in the forward area to exceed the total number of slots. Further, constraint 20 makes the binary variable of replenishment, $y_{it}$, equal to 1 if SKU i is restocked at time t. Constraint 21 establishes the number of slots given to each SKU i at time t. The present solution shows that relaxing the integrality constraint for variables $R_{it}$ and $I_{it}$ leads to the integer solution. However, nit should be selected from the integer numbers. $n_{it}$ is the ceiling function of $R_{it}$ and $I_{i,t-1}$ as below:

$$n_{it} = \left\lceil \frac{I_{i,t-1} + R_{it}}{e_i} \right\rceil$$

Figure 12:
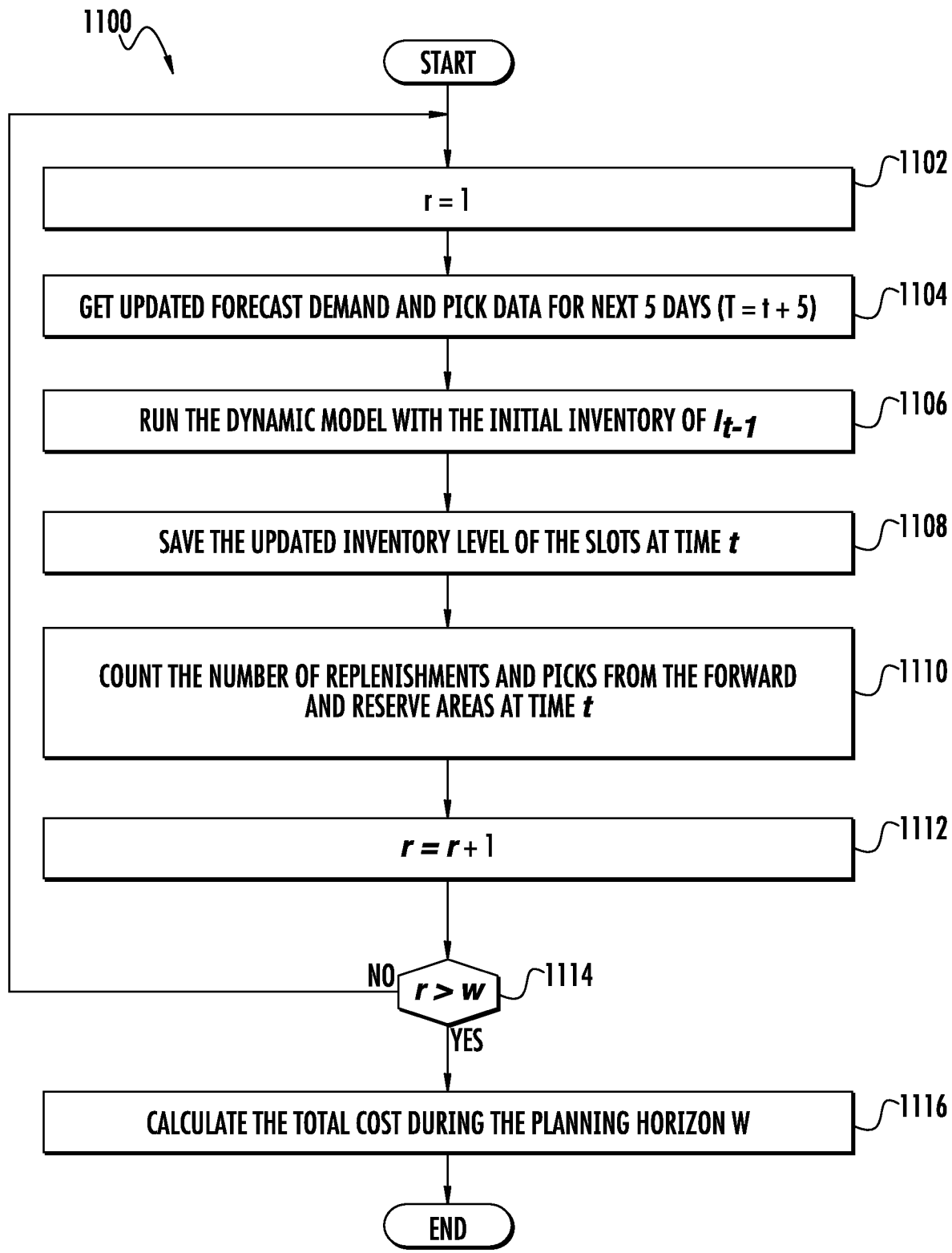
FIG. 12 illustrates a flow diagram of a method of a run procedure for a dynamic slotting model.

Numerical example: Before discussing a numerical example, the procedure is described for running the dynamic model in FIG. 12. As shown in FIG. 12, procedure 1100 commences at operation 1102, where r=1. Procedure 1100 then transitions to operation 1104, which involves acquiring updated forecast demand and pick data. In the example presented at operation 1104, the updated forecast data includes forecast data for the next five (5) days, which is expressed in operation 1104 as (T=t+5). Procedure 1100 then transitions to operation 1106, which involves running the dynamic model with the initial inventory of $I_{t-1}$. As shown at operation 1108, procedure 1100 also includes saving the updated inventor level of the slots at time t. After operation 1108 is performed, procedure 1100 transitions to operation 1110, which involves counting the number of replenishments and picks from the forward and reserve areas at time t. As shown at operation 1112, r is then incremented, which is expressed as r=r+1. After incrementing r, procedure 1100 advances to operation 1114, where the incremented r value is compared against a threshold w, which represents a relevant time window. In instances where r is not greater than w, procedure 1100 returns to operation 1102. In instances where r is greater than w, procedure 1100 proceeds to operation 1116 which involved calculating the total cost during the relevant time window (such as the planning horizon) w. Procedure 1100 then ends. Additional aspects of procedure 1100 and similar example implementations are discussed below.

When the perfect information about the future demand data is not available, the dynamic model is not a one-time run model because the forecasted demand data is updated at each run r. The dynamic model is run w (time window) times with the updated data based on the last H periods. The picks and replenishments' solutions of each run are saved for computing the final total cost during the planning horizon.

The dynamic model plans for the next T periods at each run r. Since the picks and the demand data of the initial period are assumed known, the inventory level reductions that corresponded to the first period are actual at each run r. The initial period replenishments are commanded and the inventory level of the slots are updated. The runs continue to cover the whole planning horizon.

Selecting a sufficient time window ω makes the comparison between the dynamic and static models s more reliable. It is worth noting that the dynamic model can plan for the next 6-8 periods in a reasonable time, depending on the number of SKUs. On the other hand, when T is not sufficiently large, the model generates short-sighted decisions. Therefore, selecting a proper T is challenging in different industries. In addition, the duration between two consecutive runs of the dynamic model, period t, is important. The large time segments can result in a delay of the replenishment or moves decisions. However, choosing small periods is not computationally efficient. In the numerical examples, the daily decisions made about the forward area are found to be sensible.

Comparing the dynamic model with the static model, the algorithm $G_2$ is generated for the static strategy.

Heuristic $G_2$: Before explaining the heuristic $G_2$, the parameters used in the remainder of this section are represented as following.

Notation:
1. Rack information:
   W: Slot width
   L: Slot Depth
   H: Slot height
   O: Volume of slot (=W L H)
   $N^{SL}$: Number of slots per shelf
   $W^{SH}$: Shelf width
   $N^{SH}$: Number of shelves per bay
   $N^B$: Number of bays
   S: Total number of slots
   V: The volume of forward area (=$N^B N^{SH} W^{SH} LH$)
2. SKU information:
   $w_i$: Case width for SKU i
   $l_i$: Case length for SKU i
   $h_i$: Case height for SKU i
   $o_i$: Volume of carton of SKU i (=$w_i l_i h_i$)
   $b_i$: Eaches per case for SKU i $d_i$: Demand for SKU i per year
$p_i$: No. of picks for SKU i per year
$f_i$: Flow of SKU i in $ft^3$ per year
$\varphi_i$: Maximum possible stack for SKU i in slot $$\left(=\left\lceil \frac{H}{h_i} \right\rceil\right)$$

$\theta_i$: Maximum possible No. of cartons of SKU i in depth of slot $$\left(=\left\lceil \frac{L}{l_i} \right\rceil\right)$$

Input data: Rack information, SKU information, as above.

Result: Optimally slotted SKUs into the carton flow rack (determines which SKUs should be stored in the forward area and number of slots given to SKU i, $n_i$, in the forward area).

Two important questions come up in discrete assignment-allocation problem with greedy algorithm perspective:

1. How to rank the SKUs in the discrete problem?
2. How many slots are given to the set of A⊆P SKUs selected for the forward area?

The answer of these two questions in the continuous fluid model were addressed before. However, a different approach can be applied for the discrete problem because of SKU and slot dimensions considerations and the resulted lost space.

As previously defined, the flow rate of SKU i ($f_i$) is the demand of SKU i per year translated to the volume per year. The concept of flow in the discrete version of forward reserve problem can be revised to account for unavoidable wasted empty space due to the case(s) not completely occupying the slot(s) (see FIG. 13). The practical flow $f_i^p$ is:

$f_i^p$=Number of slots required for SKU i per year×slot volume

Therefore:

$$f_i^p = \left\lceil \frac{f_i}{(\varphi_i h_i)(\theta_i l_i)W} \right\rceil O \qquad \text{Eqn. 25}$$

$$= \left\lceil \frac{\frac{d_i}{b_i} o_i}{(\varphi_i h_i)(\theta_i l_i)W} \right\rceil O \qquad \text{Eqn. 26}$$

$$= \left\lceil \frac{\frac{d_i}{b_i} w_i l_i h_i}{(\varphi_i h_i)(\theta_i l_i)W} \right\rceil O \qquad \text{Eqn. 27}$$

$$= \left\lceil \frac{\frac{d_i}{b_i} w_i}{\varphi_i \theta_i W} \right\rceil O \qquad \text{Eqn. 28}$$

Example. Assume that the demand of SKU i per year is 320 units (eaches) and each case (carton) of SKU i has the capacity of 80 eaches (di=320 and bi=80).

The dimension of the case for SKU i is:

$w_i$=5 ft, li=4 ft, hi=4 ft.

$o_i$=$w_i l_i h_i$)=80 $ft^3$

In the continuous model, where the slot dimensions are ignored, the flow of SKU i is equal to:

$$f_i = \frac{d_i}{b_i} o_i = \frac{320}{80} 80 = 320 \, \text{ft}^3/\text{year}$$

However, the slots' dimensions are considered in discrete model. Assume:
W=6 ft, L=6 ft, H=10 ft
O=W L H=360
Practical flow $f_i^p$ in discrete model is:

$$f_i^p = \left\lfloor \frac{\frac{d_i}{b_i} w_i}{\varphi_i \theta_i W} \right\rfloor O \qquad \text{Eqn. 29}$$

$$= \left\lfloor \frac{\frac{320}{80} 5}{(2)(1)(6)} \right\rfloor 360 \qquad \text{Eqn. 30}$$

$$= 720 \, \text{ft}^3/\text{year} \qquad \text{Eqn. 31}$$

Figure 13:
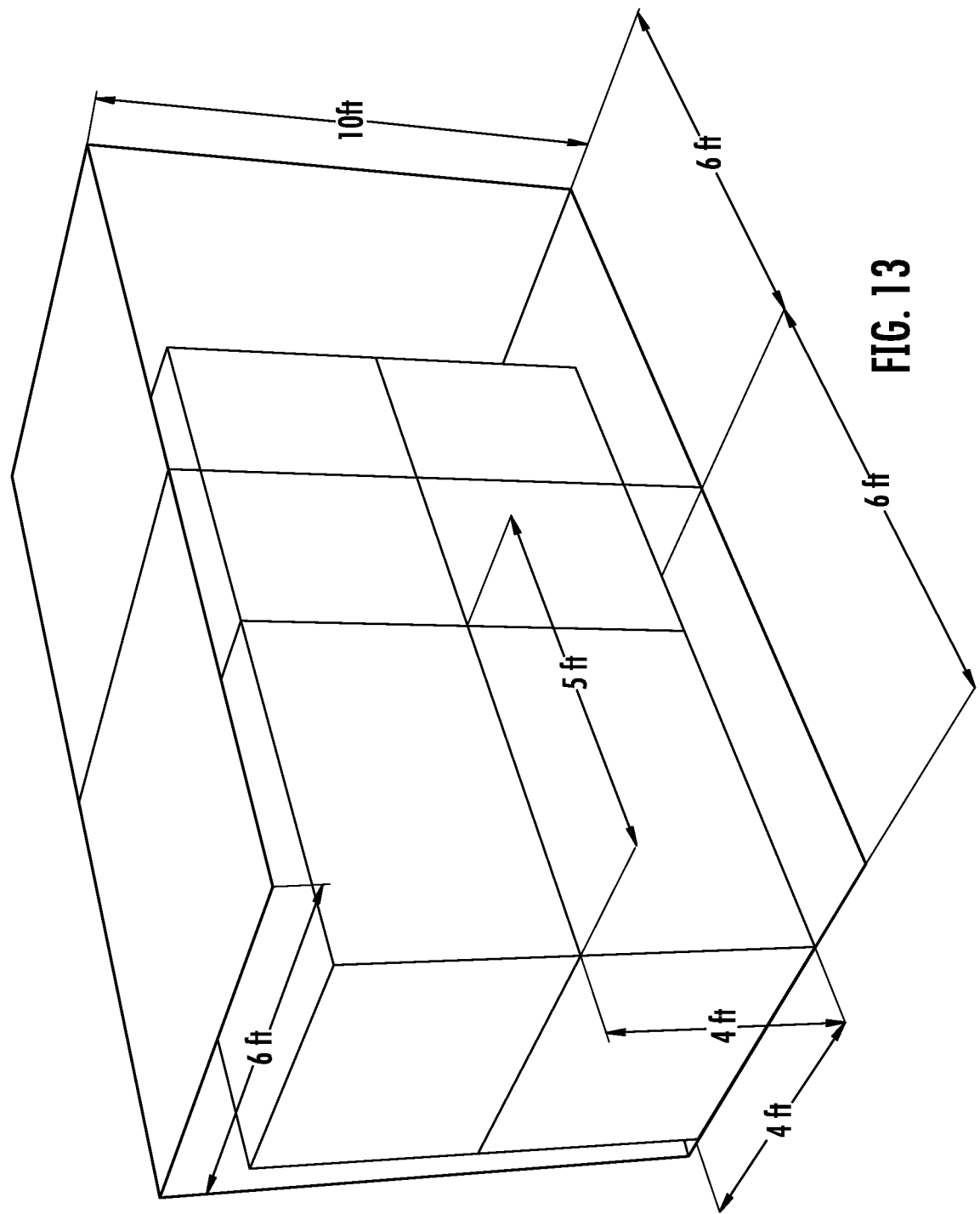
FIG. 13 illustrates a diagrammatic perspective view of unavoidable wasted empty space due to the difference between cases and allocated slots dimensions.

The difference between $f_i$ and $f_i^p$ (400 ft³), is the volume of empty space around the cases stored in two slots of the forward area as shown in FIG. 13. If this wasted space is generalized to all slots in forward area, the amount of lost space by discretizing the problem is non-trivial. The heuristic will inherently tend to reduce the lost space as much as possible. Consequently, parameter e is introduced in the heuristics in order not to exceed the capacity of the forward area and generate feasible solutions. As mentioned, only a fraction of the forward area space can be practically allocated to SKUs and the rest is wasted. This fraction depends on the selected set of SKUs for the forward area. Consequently, the best solution is searched by examining different amounts of e in the range 0<e≤1. Finally, the best coefficient of space is found.

Four procedures are developed for ranking and fraction searching. $y_i$ in heuristic $G_2$ is used for calculating the number of slots allocated to SKU i in $n_i$ and is corresponded to the optimal space allocation in fluid model. For the first two procedures, where the SKU flows $f_i^s$ are cubic feet per year, $y_i^s$ are equal to the optimal cubic space given to SKU i in fluid model. However, the $y_i^s$ in the last two procedures are based on case movements per year. $q_i'$ is the aggregate number of restocks of SKU i for the planning horizon period, if only a single slot (or minimum number of feasible slots for $w_i > W$) is allocated to SKU i $$\left( q_i' = \frac{d_i}{b_i a_i} \right)$$

$a_i$ is the units of SKU i that can be stored in minimum number of feasible slots allocated to the SKU and is defined as:

$$a_i = \begin{cases} \theta_\varphi \left\lfloor \frac{W}{w_i} \right\rfloor, & \text{if } w_i \le W_j \\ \theta_\varphi, & \text{otherwise} \end{cases}$$

The procedures are:

$$A_1: f_i^1 = \frac{d_i}{b_i} o_i \quad le_{1i} = \frac{p_i}{\sqrt{f_{1i}}} \quad y_i^1 = \frac{\sqrt{f_{2i}}}{\sum_{j \in A} \sqrt{f_{2i}}} S$$

$$A_2: f_i^2 = \frac{d_i}{b_i} o_i \quad le_{2i} = \frac{p_i}{\sqrt{f_i^p}} \quad y_i^2 = \frac{\sqrt{f_{1i}}}{\sum_{j \in A} \sqrt{f_{1i}}} S$$

$$A_3: f_i^3 = \frac{d_i}{b_i} le_i = \frac{p_i}{\sqrt{f_{3i}}} \quad y_i^3 = \frac{\sqrt{f_{3i}}}{\sum_{j \in A} \sqrt{f_{3i}}} S$$

$$A_4: f_i^4 = \frac{d_i}{b_i} le_i = \frac{p_i}{\sqrt{f_{4i}}} \quad y_i^4 = \frac{\sqrt{q_i'}}{\sum_{j \in A} \sqrt{q_i'}} S$$

While $A_1$ and $A_2$ rank the SKUs based on cubic feet movement of SKU, $A_3$ and $A_4$ use the number of cases needed during the planning horizon, instead of volume, for ranking SKUs. Note that the fraction given to SKU i in $A_4$ corresponds to parameter $q_i'$, not $f_i$. Of the four procedures, only $A_2$ uses the practical flow $f_i^p$ for labor efficiency computation.

Heuristic $G_2$ is a greedy algorithm based on rounding up the continuous model solution. After discretizing the non-integral solution, it applies a post processing step, called bottom-up deletion, for removing undesirable SKUs from the forward area. After assignment of SKUs and allocation of slots, it sorts the SKUs in order of non-increasing total number of restocks. Then, it deletes the SKU with minimum number of restocks (say 1 restock), and allocates its space to the SKU in the forward area with maximum number of restocks. This method is called bottom-up deletion since the bottom SKU in number of restocks ranking will be deleted and its slot is added to the upper SKU in the ranking. This procedure is iterated until achieving no cost improvements. Heuristic $G_2$ can be found above.

Figure 14:
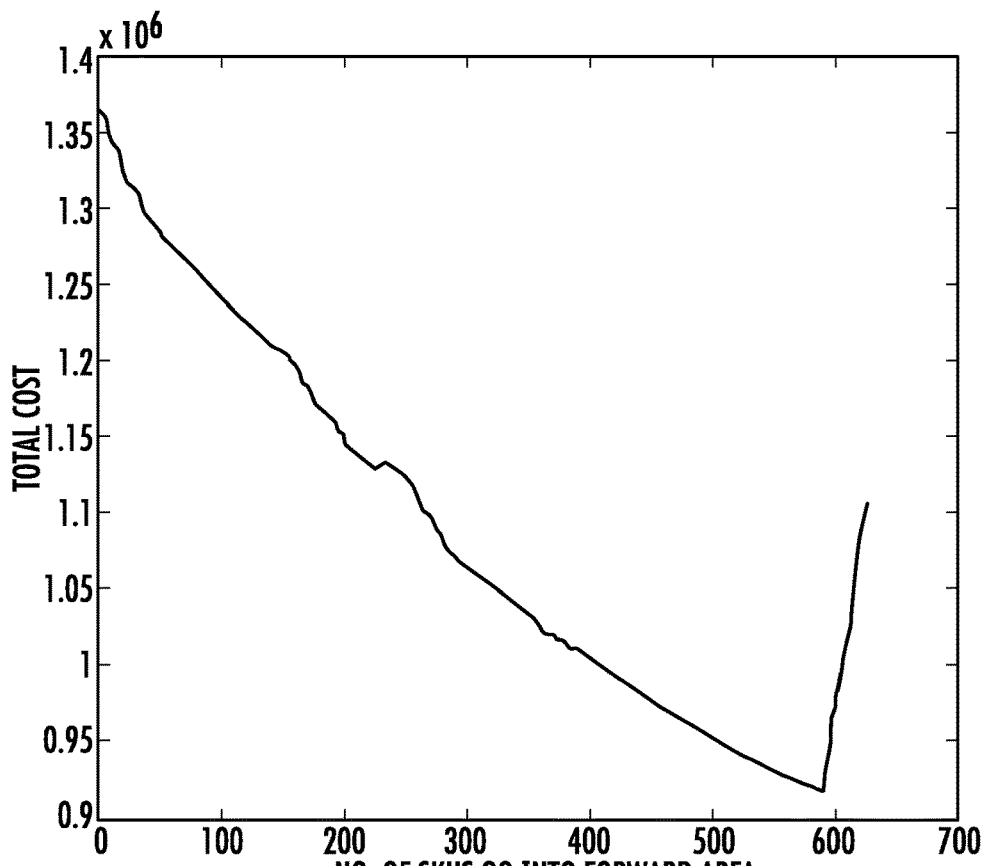
FIG. 14 illustrates a graphical plot of cost reduction representation with increasing the number of SKUs in forward area.

A warehouse with 700 SKUs is considered to determine the assignment, allocation, and size of the forward area. The SKUs' dimension data belongs to a real world warehouse. The best size of the forward area as suggested by G2 is 626 slots with 590 SKUs (see FIG. 14). The minimum cost in FIG. 14 occurs when to start adding those SKUs to the forward area that could be picked more efficiently from the reserve area. However, an example implementation may have only 400 slots available in the forward area.

Figure 15:
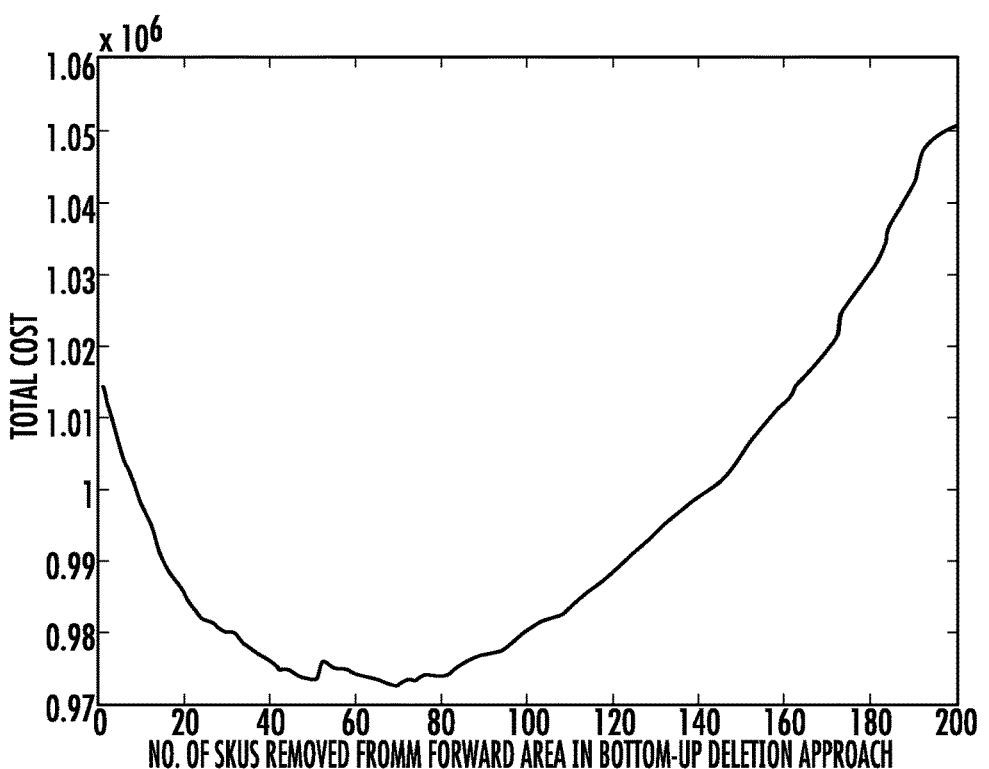
FIG. 15 illustrates a graphical plot of bottom-up deletion approach.

Before applying the bottom-up deletion approach, the set of 374 SKUs leads to minimum cost of picking and replenishment. As FIG. 15 shows, the bottom-up deletion approach in heuristic $G_2$ recommends deleting 69 out of 374 SKUs from the forward area to devote their slots to those SKUs of the forward area with a higher number of restocks. The bottom-up deletion approach motivates having the uniform number of restocks among SKUs because the SKUs, which have had high number of restocks, no longer be replenished very frequently. Using this approach, they have more slots and more cases in the forward area because of allocating the slots of the deleted SKUs to them. The cost increment in iteration 52 of FIG. 15 is associated with the situation, where the bottom-up deletion approach deletes one SKU with one slot from the forward area, but the candidate SKU for this slot from top of the list, needs more than one slot to be able to have one more lane in the forward area (wider SKU than slot width.) This results in one deleted SKU from the forward area without any value added and the total cost slightly increases. In the example, this approach reduces the total cost by 4.4%.

The static model ($G_2$-$A_4$) may be compared with the dynamic model. In an example, a warehouse with 5000 SKUs is considered. The relevant values of other parameters of the model can be found in TABLE 9. In such an example, the information of the SKUs' dimensions, which belong to a real world warehouse, are used. An order generator simulates the eight different types of demand trends. The order data for 50 days of history is simulated, and a dynamic slotting strategy that uses the daily demand quantity forecasting for 30 days ahead is delivered.

TABLE 9

The values of model's parameters

| Item Information | Slot Information | Order Information | Cost Information |
|---|---|---|---|
| SKU dimensions file | W = 18<br>H = 16.5<br>L = 96 | Order generator | c = 170<br>$c_1$ = 27<br>$c_2$ = 100 |

Seven experiments designed for the different sizes of the forward area listed in TABLE 10 may be run in order to perform a comparison. In this example, the unit of time is one day in the dynamic strategy. The perfect information about the future demand data is assumed as known in this example. The parameters associated with c1, c2 and c costs have been selected from the default values of a commercial slotting software. The units used for measuring the travel distance of picking and replenishment activities, such as inch, describes the unit of unit of cost in the present disclosure.

Assuming that the picking cost from the forward area is fixed in all experiments, it is expected that the larger forward area results in a lower total cost. Results of TABLE 10 for both static and dynamic strategies confirm this expectation. Columns $Imp_1\%$ and $Imp_2\%$ of TABLE 10 presents the improvement percentage of the dynamic over the static model for different sizes of the forward area.

layout updated in the small size case. In large forward areas, it is expected that the proportion of improper SKUs suggested by the static model for the forward area are higher than the medium size forward area, resulting in a total cost increase. Larger forward areas provide the dynamic model more opportunity and flexibility in dynamic slot allocation (changing the number of allocated slots over time based on the changes in demand), which results in cost improvements.

Comparison of the static and the dynamic models with multiple runs of the static model: The best time to re-layout the forward area regarding its current state is still a critical unanswered question in practice. One may assume that running the static model periodically competes with the dynamic strategy. In this section, these two strategies are compared and the benefits of the dynamic model are quantified over updating the forward area in certain intervals by assessing three scenarios:

1. PI: The dynamic forward-reserve problem with Perfect Information (PI) about the next k units of time (day).
2. FI: The dynamic forward-reserve problem with Forecasting Information (FI) about the next k units of time (day).
3. S: The static forward-reserve problem with updating the layout of the forward area in certain points of the planning horizon.

Since there are no established tests for running the discrete forward-reserve problem in certain periods, an example is designed that includes time periods. Running the static model in a certain time interval to get the most updated layout of the forward area is a common way to take the

TABLE 10

Results of cost and solution time comparisons of the static versus dynamic model

| η | $C_{Stat-H}$ | $ST_{Stat-H}$ | $C_{Stat-PI}$ | $ST_{Stat-PI}$ | $C_{Dyn-PI}$ | $ST_{Dyn-PI}$ | $Imp_1$ % | $Imp_2$ % | Gap |
|---|---|---|---|---|---|---|---|---|---|
| 100 | 1761513 | 0.06 | 1677445 | 0.06 | 1538725 | 422 | 12.65 | 8.27 | 0 |
| 150 | 1516117 | 0.07 | 1438928 | 0.05 | 1425630 | 388 | 5.97 | 0.92 | 0.0014 |
| 200 | 1446542 | 0.09 | 1356799 | 0.05 | 1329306 | 486 | 8.10 | 2.03 | 0.0036 |
| 250 | 1368497 | 0.08 | 1272363 | 0.06 | 1244400 | 563 | 9.07 | 2.20 | 0 |
| 300 | 1296999 | 0.08 | 1197283 | 0.06 | 1161791 | 630 | 10.42 | 2.96 | 0.0131 |
| 350 | 1236235 | 0.07 | 1120830 | 0.06 | 1084762 | 1113 | 12.25 | 3.22 | 0.0197 |
| 400 | 1165466 | 0.08 | 1050649 | 0.06 | 1009547 | 794 | 13.38 | 3.91 | 0.0192 |

$C_{Stat-H}$ = Cost of static model using historical demand data,
$C_{Stat-PI}$ = Cost of static model using perfect information about the future data,
$C_{Dyn-PI}$ = Cost of dynamic model using perfect information about the future data,
ST = Solution time (seconds),
Gap = Absolute MIP gap tolerance for the dynamic model,
$Imp_1$ % = Improvement percentage of the Dyn - PI over Stat - H model,
$Imp_2$ % = Improvement percentage of the Dyn - PI over Stat - PI model.

TABLE 10 shows that the dynamic model outperforms the static model for any size of the forward area. The costs of the dynamic model are considerably lower than their static counterparts in all cases, and the greatest benefit of 12.65% is achieved where the forward area is very small (100 slots).

The results of TABLE 10 shows that the dynamic strategy is more effective for small and large sizes of the forward area compared to the medium size in this example. In small forward areas, since a few number of slots are available, selecting the best set of SKUs for the forward area is underlined, and poor decisions about the assignment and allocation are more expensive. The dynamic model can introduce new fast movers to the forward area and keep the demand changes into account. Then the "moves" from the forward area to the reserve area are designated to exclude the obsolete slow movers from the forward area. Each SKU move is charged for "transition" costs equal to the replenishment cost, when an SKU should move from the forward area to the reserve area in the update points.

The demand of every SKU in the warehouse, which is an input of the static model, is not fixed and changes over time in unanticipated ways. The source of this change is due to the changes in customers' behavior over time. Following the language of predictive analytics, the demand per year, which is supposed to be predicted, is referred to as the concept and the process of shifting the concept over time is referred to as the concept drift.

Figure 16:
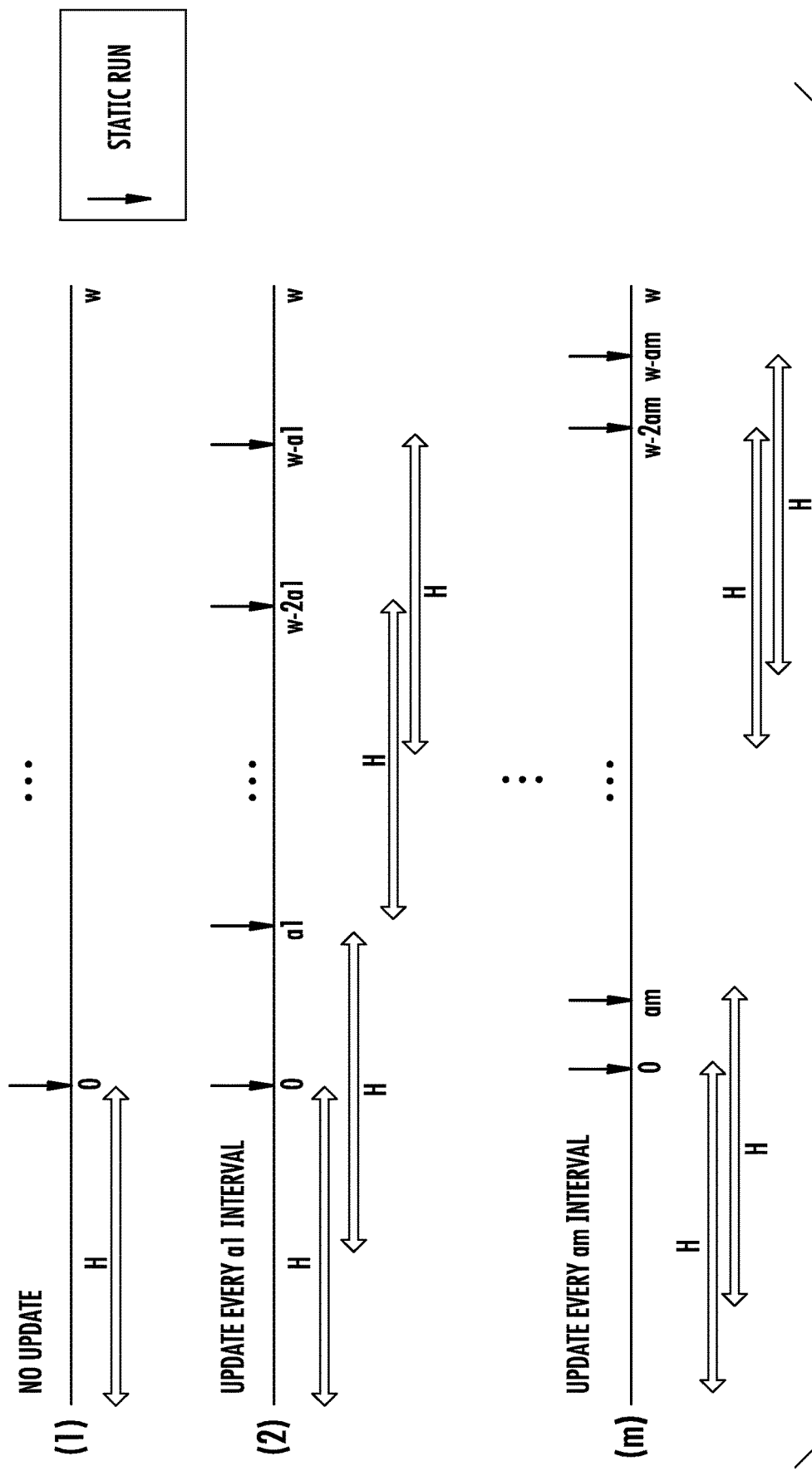
FIG. 16 illustrates a planning horizon diagram with different run intervals for a test example.

As FIG. 16 shows, the horizontal axis represents both a history and future planning horizon. The history is up to point zero in the diagram. The static model is run only once at time zero in the first scenario. The layout of the forward area would be fixed during the planning horizon w.

While the first scenario has a single chunk of data, others have sequential data chunks of sizes $a_1, a_2, \ldots, a_m$. The static model is run every $a_1$ units of time (e.g. days) in the second configuration. The intervals are shrunk in the next runs until $a_m$ days in the last configuration, which is the shortest period of running the static model ($a_1 > a_2 > \ldots > a_m$). Note that in all configurations, the static model will receive the demand profile of the last H days as an input, and the concept, which is the total demand in the last H days, is drifting.

Figure 17:
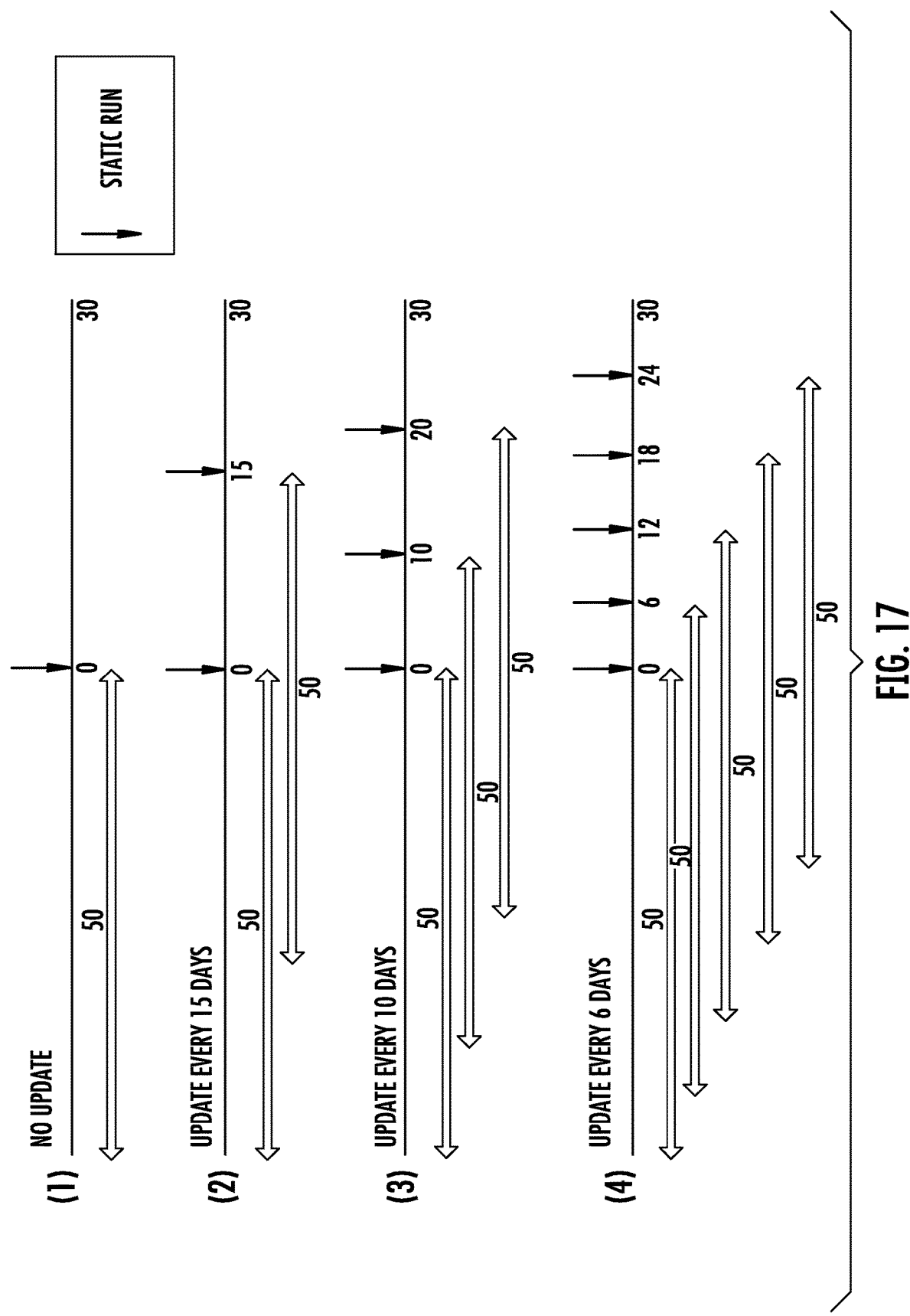
FIG. 17 illustrates a planning horizon diagram with different run intervals.

As FIG. 17 illustrates, the static model are run once (no update), every 15, 10, and 6 days ($a_1=30/2$, $a_2=30/3$, $a_3=30/5$). Here, the historical demand is defined as the most recent 50 days (H=50) and the planning horizon incorporates 30 days (w=30). Other parameters' values can be found in TABLE 9. TABLE 11 represents the total picking and replenishment cost of the static model solved by G2 for different scenarios. For the first scenario that has a single data chunk, there is only one total cost over days 31-80. Nonetheless, other scenarios have more than one cost considering a different data chunk i ahead, which is shown with ci. For example, the scenario with a2=10 calculates the costs of chunks 51-60, 61-70, and 71-80, which are equal to $c^1$, $c^2$, and $c^3$, respectively. The sum of these three costs provides the total picking and replenishment cost, C, during 30 days for this scenario.

The results of C in the last column of TABLE 11 depicts how costly it would be to select an inappropriate interval for running the static model, $a_i$. The total cost of running the static model every 30 days (no update) is less than early update intervals 15, 10 and 6 days that impel "early shock" to the static model. Depending on the activity distribution of the items in the forward area, it takes longer for many SKUs to emerge as cost effective. The SKUs that encounter the replenishment cost should stay for a while in the forward area to generate expected savings by picks. Deleting them early from the forward area and moving them to the reserve area not only incurs the moving cost, but also prevents expected savings per pick.

The results of the last two scenarios in TABLE 11 with two and four updates show that the costs go down and up. Since the slotting of the first period is initiated with an empty forward area, all slots in that period are replenished. However, the following periods begin with non-empty slots. Therefore, the number of replenishments is lower in the middle of the planning horizon, which reduces the total cost. The slots are depleted over time and need to be replenished again in the final periods. As a result, the costs will eventually grow again.

TABLE 11

Picking and replenishment cost for the static model.

|  | $c^1$ | $c^2$ | $c^3$ | $c^4$ | $c^5$ | C |
| --- | --- | --- | --- | --- | --- | --- |
| No update | 1368497 | 0 | 0 | 0 | 0 | 1368497 |
| One update | 697707 | 684351 | 0 | 0 | 0 | 1382058 |
| Two updates | 499925 | 416805 | 485430 | 0 | 0 | 1402160 |
| Four updates | 315898 | 288248 | 240906 | 279170 | 317616 | 1441838 |

In the cases of running the static model more than once if the set of SKUs in the new layout is different from the previous layout, the SKUs not found in the new layout are moved to the reserve area with a cost equal to the replenishment cost. TABLE 12 shows the different SKUs ($DSK_i$) and different slots ($DSL_i$) in chunk i of the previous and the next state. The first columns of TABLE 12 are zero, since example implementations start from an empty forward area. TABLE 13 presents the cost of moves, cmi, in data chunk i. Finally, the total cost, CS=C+CM, in the last column of TABLE 13 will display the total cost of each scenario in the static model.

TABLE 12

The number of different SKUs ($DSK_i$) and the different slots ($DSL_i$) in the previous

|  | $DSK_1$ | $DSL_1$ | $DSK_2$ | $DSL_2$ | $DSK_3$ | $DSL_3$ | $DSK_4$ | $DSL_4$ | $DSK_5$ | $DSL_5$ |
| --- | --- | --- | --- | --- | --- | --- | --- | --- | --- | --- |
| No update | 0 | 0 | 0 | 0 | 0 | 0 | 0 | 0 | 0 | 0 |
| One update | 0 | 0 | 15 | 15 | 0 | 0 | 0 | 0 | 0 | 0 |
| Two updates | 0 | 0 | 14 | 14 | 18 | 18 | 0 | 0 | 0 | 0 |
| Four updates | 0 | 0 | 9 | 9 | 5 | 5 | 13 | 13 | 16 | 16 |

TABLE 13

Cost of moving to reserve area in the static model

| Configuration | $cm_1$ | $cm_2$ | $cm_3$ | $cm_4$ | $cm_5$ | CM | $C_S$ |
|---|---|---|---|---|---|---|---|
| No update | 0 | 0 | 0 | 0 | 0 | 0 | 1368497 |
| One update | 0 | 2550 | 0 | 0 | 0 | 2550 | 1384608 |
| Two updates | 0 | 2380 | 3060 | 0 | 0 | 5440 | 1407600 |
| Four updates | 0 | 1530 | 850 | 2210 | 2720 | 7310 | 1449148 |

There is a tradeoff between continuously going with the previous layout of the forward area and having the most updated layout of the forward area but undergoing the moving cost. TABLE 13 suggests not to reslot before 30 days.

The same data set for the dynamic MIP model discussed in section B may be used with having the Perfect Information (PI) of the future demand. The cost of the dynamic model with perfect information about the future demand is $C_{PI}$.

TABLE 14 presents the comparison results of the static model and the dynamic model with perfect information about the future order transactions. The last column of this table shows the promising cost improvements of the dynamic model over the static model. The total costs of dynamic scenarios, PI, is always less than the static model. Note that the availability of the movers to convert the previous state of the forward area to the new layout in this short interval is questionable. In reality, it takes time to get from the current state to the target map, whereas one can assume no delay for reslotting. The percentages of saving attained by the dynamic model in TABLE 14 provide the cost justification of using the dynamic model for the forward-reserve problem rather than the static model.

TABLE 14

The total cost and savings (%) obtained from the static and dynamic models (PI).

| Configuration | $C_S$ | $C_{PI}$ | saving (%) $C_{PI \to S}$ |
|---|---|---|---|
| No update | 1368497 | 1244400 | 9.07 |
| One update | 1384608 | 1244400 | 10.13 |
| Two updates | 1407600 | 1244400 | 11.59 |
| Four updates | 1449148 | 1244400 | 14.13 |

The traditional wisdom assumes that running the static model more frequently generates more savings than less frequent runs. Nevertheless, TABLE 14 shows that the savings are greater when the layout of the forward area is updated in longer intervals. The reason is that each SKU in the forward area has its own "minimum payback" period. If a SKU exists in the previous layout but is not found in the new target map, it is moved from the forward area to the reserve area. This approach prevents the receiving of the whole expected benefits after the last replenishment. In other words, the SKUs may leave the forward area before reaching their minimum payback point. In each update, it is assumed that the next decision about the layout of the forward area is not influenced by "what state the SKU is in." In essence, the next update "forgets" how much time has elapsed from the last replenishment of the SKUs in the forward area. This memorylessness property is assumed in each update, causing more frequent updates that result in higher costs. Such results suggests to run the static model no earlier than 30 days in this example.

These comparisons provide a basis for warehouse managers to select their desired methodology for updating the forward area. While the static model requires the movers to convert the previous state to the target map, the dynamic strategy takes the advantage of pick clean (having empty slots by picks) to replenish new items in the slot and updates the layout of the forward area.

This disclosure will also show the warehouses that keep short life cycle products, such as fashion products, as well as highly volatile products in order to receive more benefits from the dynamic model, compared to the warehouses that store conventional and fixed demand products.

Figure 18:
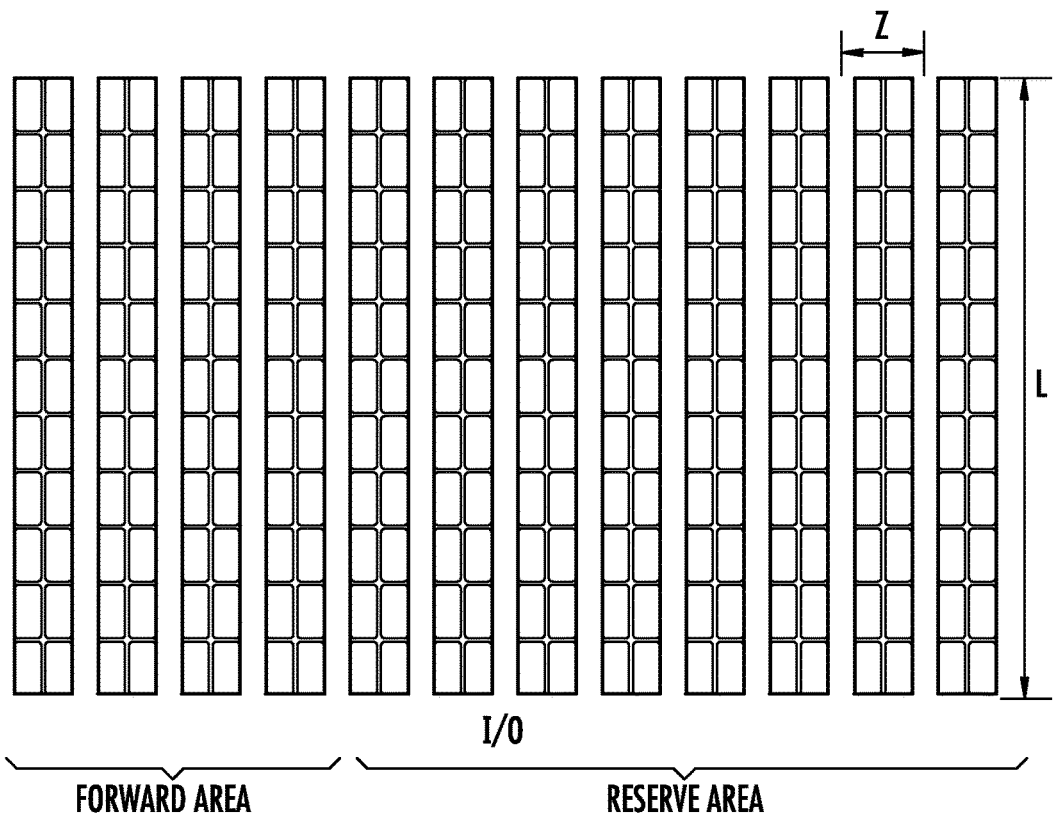
FIG. 18 illustrates a top view of a warehouse layout including forward and reserve areas.

Model enhancement: In this section, the dynamic model is tested by applying the forecasting system and assessing the potential change requirements for making the model more realistic. Then, the static model, S, will be compared to the dynamic model with forecasted demand data, FI, and new features, including the option of moving to the reserve area and selecting the replenishment policy. The DFRP is improved in three ways:

1. Estimating the model parameters and fixed costs adjustments. The dynamic model is enhanced to adjust the costs of picking from the forward area, the reserve area, and the replenishments with respect to the changes in each area's size. The forward area can be recognized from the reserve area in FIG. 18. Obviously, having a forward area with more aisles will increase the picking cost from this area. c, $c_1$ and $c_2$ are then $$c_1 = 2\frac{L}{2} + \frac{Zv}{2} = L + \frac{Zv}{2} \qquad \text{Eqn. 32}$$

$$c_2 = 2\frac{L}{2} + \frac{Zu}{2} = L + \frac{Zu}{2} \qquad \text{Eqn. 33}$$

$$c_3 = \frac{L}{2} + \frac{Zu}{2} + \frac{Z(u+v)}{2} + \frac{L}{2} + \frac{Zu}{2} = L + Z(u+v) \qquad \text{Eqn. 34}$$

Where
L: Length of each picking aisle
v: Number of picking aisles in the forward area
u: Number of picking aisles in the reserve area The picking cost from the forward/reserve areas in equations 32 and 33 is the sum of cross aisle travel and picking aisle travel. The replenishment cost in equation 34 includes three costs: the retrieval cost from the reserve area, the travel cost from the reserve to the forward area, and the storage cost in the forward area. The replenishment cost will not change, when enlarging or shortening the forward area, since it is relative to the total number of aisles (u+v).

2. Moving the slow movers to the reserve area. The opportunity of moving the slow movers nested in the forward area for a long time, due to the lack of sufficient orders in the dynamic problem, is addressed. These moving costs are equal to the replenishment cost. If one does not have the perfect information about future orders, this problem is automatically solved because one may always replenish the exact amount of the future demand and will have the slot empty at some point in the future without any move. Nevertheless, it is not true for the dynamic model to use the forecasted data. The decisions about moving the slow movers to the reserve area determine which SKUs should leave the forward area.

3. Applying different types of replenishment. One limitation of the generic DFRP discussed in section B is when the inventory level of a certain slot gets very low and the actual order is greater than the inventory in the forward area. Three options are available for order fulfillment in this case:

a) Move the item to the reserve area and pick the whole order from the reserve area (c+c2).

b) Replenish the rest of the order (or more) in the forward area and pick the order from the forward area (c+c1).

c) Leave the low inventory item in the forward area and pick the whole order from the reserve area ($c_2+c_w$), where $c_w$ is a waiting time cost to get an order quantity equal to the inventory and have the slot empty. Option a is always more expensive than option b, so the model will not suggest that. Since moving the item to the reserve area results in a cost equal to the replenishment cost, the model rarely suggests the move to the reserve area. It inclines to wait to get an order quantity equal to the inventory level, which makes the slot empty for free. However, this waiting time in option c—leaving some slots with a low inventory level in the forward area to get the order quantity exactly the same as the low inventory—postpones generating the pick savings from the forward area, which is not efficient. This disclosure will show in the following that the size of the forward area impacts these decisions. This disclosure will address this issue by discussing different replenishment policies.

Replenishment policies: In this disclosure, a general form of the dynamic model was addressed by having the restock quantity as the decision variable. This section will elaborate on the different replenishment strategies, the quantity replenishment (model 1), and the full replenishment of a slot (model 2.) Each of these models contains sub-models. Note that model 2 is not a special case of model 1, since the dynamic model is not just a one-time run model for the whole planning horizon and works with forecasted data. The demand input is updated in every t.

The dynamic model, which uses the forecasted data, is run at each t to make both the pick decisions from the forward or reserve area as well as the replenishment decisions. Therefore, the actual demand quantity and picks is prone to the forecast errors. Some example implementations may not receive exactly the same orders as the forecasted ones. As a result, some SKUs may stay in the forward area with low level inventory.

One way to pick again from those low level inventory slots is by replenishing them up to full or less than full with the same SKU, even if they are not empty. Another way to remove the remaining inventory is by moving them to the reserve area anytime, with a cost equal to the replenishment cost. Therefore, moving the low inventory from the forward area to the reserve area and then restocking the emptied slot with another SKU costs twice as much as the replenishment cost.

Quantity replenishment ($M^1$): The replenishment quantity is an integer decision variable in model 1 ($M^1$). Model $M^1_{LH}$ considers a limited horizon aiming to reduce the problem size. If an SKU is selected for the forward area in this strategy, there is the risk of restocking an amount equal to the demand of the limited forecast horizon and losing the chance of a full replenishment of the slot. Consequently, the initial inventory of the slot in the next run of the dynamic model would be less than the full replenishment strategy.

The model considering the whole horizon (T=21) is complex and will not deliver the solutions in a reasonable time. In the unlimited horizon model, $M^1_{ULH}$, the period t is enlarged by aggregating the forecast demand data of 3 consecutive days (t∈{1, ..., 21/3}.) As a result, the final number of periods ahead (T) will be reduced from 21 to 7. Although the shorter periods result in more prompt responses and decisions about the picks, replenishments, and moves, it is not computationally efficient when addressing the whole horizon. One limitation of expanding the period is that the decisions about the forward area are released every 3 days, not daily.

Model 1 is similar to the general model introduced in section B but has the option of moving the slow movers to the reserve area when required.

$$M^1: \text{Min} C_1 = c_1 \sum_{i=1}^{N} \sum_{t=1}^{T} p_{it} x_{it} + c_2 \sum_{i=1}^{N} \sum_{t=1}^{T} p_{it}(1-x_{it}) + c \sum_{i=1}^{N} \sum_{t=1}^{T} (y_{it} + w_{it})$$

subject to:

| | | |
|---|---|---|
| $-I_{it} + I_{i,t-1} + R_{it} - d_{it}x_{it} - s_{it}^f = 0$ | $\forall i, t \geq 2$ | Eqn. 35 |
| $\sum_{i=1}^{N} n_{it} \leq \eta$ | $\forall t$ | Eqn. 36 |
| $R_{it} \leq \eta e_i y_{it}$ | $\forall i, t$ | Eqn. 37 |
| $n_{it} \geq \dfrac{I_{i,t-1} + R_{it}}{e_i}$ | $\forall i, t$ | Eqn. 38 |
| $s_{it}^f \leq \eta e_i w_{it}$ | $\forall i, t$ | Eqn. 39 |
| $R_{it}, I_{it} s_{it}^f \geq 0$ | $\forall i, t$ | Eqn. 40 |
| $x_{it}, y_{it}, w_{it} \in \{0, 1\}$ | $\forall i, t$ | Eqn. 41 |
| $n_{it} \in \{0, 1, 2, 3 ...\}$ | $\forall i, t$ | Eqn. 42 |

Where
Parameters:
N: Number of SKUs (i=1, 2, ..., N)
T: Number of periods (t=1, 2, ..., T)
c: Restock cost
c1: Cost of picking from the forward area
c2: Cost of picking from the reserve area
$e_i$: Number of units of SKU i that can be stored in one slot
$d_{it}$: Demand of SKU i at time t
$p_{it}$: Number of picks of SKU i at time t
η: Total number of slots in the forward area
Decision Variables:
$x_{it}$: 1 if SKU i is picked from the forward area at time t; 0 otherwise
$y_{it}$: 1 if SKU i is restocked at time t; 0 otherwise
$l_{it}$: Inventory of SKU i in the forward area at the end of time t
$R_{it}$: Number of units of SKU i that are restocked at time t
$n_{it}$: Number of slots occupied by SKU i at time t, nit 2 {0, 1, 2, 3, ... }
$s_{it}^f$: Units of SKU i that are moved from the forward to the reserve area at time t.
$w_{it}$: 1, if SKU i is moved from the forward area to the reserve area at time t; 0 otherwise.
Constraint 39 makes the binary variable of the move from the forward to the reserve area, $w_{itnit}$, equal to 1 if any units of SKU i are moved to the reserve area at time t ($s_{it}^f$>0).

Full replenishment ($M^2$): Model 2 restocks the full allocated slot(s). If $U_{it}$ slot(s) are given to the SKU i at time t, the replenishment quantity will be $e_i U_{it}$. Three different strategies for model 2, named $M_a^2$, $M_b^2$, $M_c^2$ are investigated.

$M_a^2$: Can replenish up to full if the slot(s) are empty.

$M_b^2$: Can replenish up to full if the slot(s) are empty and can replenish partially if the slot(s) are non-empty. The partial replenishment can make the slot less than full or full.

$M_c^2$: Can replenish full any time.

Figure 19:
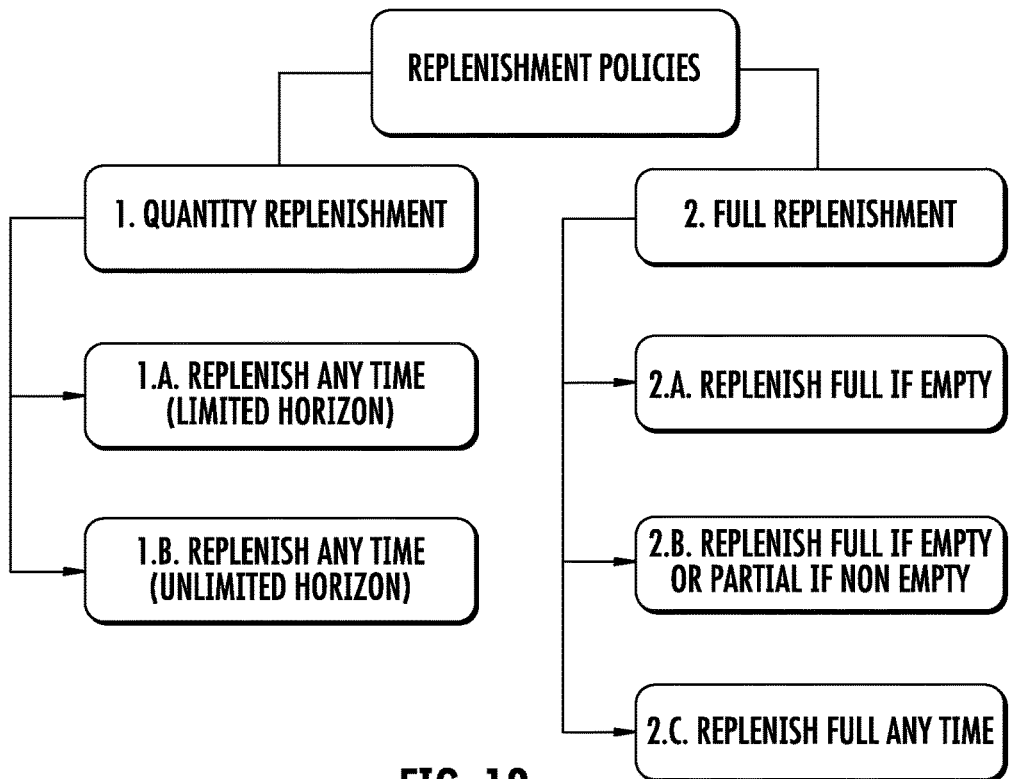
FIG. 19 illustrates a diagram of replenishment policies.

FIG. 19 summarizes the replenishment policies. The three MIP models defined for model 2 are demonstrated below:

Replenish up to full if empty ($M_a^2$):

$$\text{Min} C_1 = c_1 \sum_{i=1}^{N} \sum_{t=1}^{T} p_{it} x_{it} + c_2 \sum_{i=1}^{N} \sum_{t=1}^{T} p_{it}(1-x_{it}) + c \sum_{i=1}^{N} \sum_{t=1}^{T}(y_{it}+w_{it})$$

subject to:

| | | |
|---|---|---|
| $-I_{it} + I_{i,t-1} + e_i U_{it} - d_{it} x_{it} - s_{it}^f = 0$ | $\forall\, i, t \geq 2$ | Eqn. 43 |
| $\sum_{i=1}^{N} n_{it} \leq \eta$ | $\forall\, t$ | Eqn. 44 |
| $U_{it} \leq \eta y_{it}$ | $\forall\, i, t$ | Eqn. 45 |
| $n_{it} \geq \dfrac{I_{i,t-1} + e_i U_{it} - s_{it}^f}{e_i}$ | $\forall\, i, t$ | Eqn. 46 |
| $s_{it}^f \leq \eta e_i w_{it}$ | $\forall\, i, t$ | Eqn. 47 |
| $I_{it}, s_{it}^f \geq 0$ | $\forall\, i, t$ | Eqn. 48 |
| $x_{it}, y_{it}, w_{it} \in \{0, 1\}$ | $\forall\, i, t$ | Eqn. 49 |
| $n_{it}, U_{it} \in \{0, 1, 2, 3 \ldots\}$ | $\forall\, i, t$ | Eqn. 50 |

Constraint 45 makes the replenishment binary variable $y_{it}$ equal to 1, if $U_{it}$ slots are given to SKU i at time t. The number of replenishment units for SKU i at time t is $e_i U_{it}$ in constraint 46.

Replenish up to full if empty or partially if not empty ($M_b^2$):

$$\text{Min} C_1 = c_1 \sum_{i=1}^{N} \sum_{t=1}^{T} p_{it} x_{it} + c_2 \sum_{i=1}^{N} \sum_{t=1}^{T} p_{it}(1-x_{it}) + c \sum_{i=1}^{N} \sum_{t=1}^{T}(y_{it}+w_{it}+h_{it})$$

subject to:

| | | |
|---|---|---|
| $-I_{it} + I_{i,t-1} + e_i U_{it} - d_{it} x_{it} - s_{it}^f + s_{it}^r = 0$ | $\forall\, i, t \geq 2$ | Eqn. 51 |
| $\sum_{i=1}^{N} n_{it} \leq \eta$ | $\forall\, t$ | Eqn. 52 |
| $U_{it} \leq \eta y_{it}$ | $\forall\, i, t$ | Eqn. 53 |
| $n_{it} \geq \dfrac{I_{i,t-1} + e_i U_{it} - s_{it}^f + s_{it}^r}{e_i}$ | $\forall\, i, t$ | Eqn. 54 |
| $s_{it}^f \leq \eta e_i w_{it}$ | $\forall\, i, t$ | Eqn. 55 |
| $s_{it}^r \leq \eta e_i h_{it}$ | $\forall\, i, t$ | Eqn. 56 |
| $s_{it}^r \leq e_i - I_{i,t-1}$ | $\forall\, i, t \geq 2$ | Eqn. 57 |
| $I_{i,t-1} \geq h_{it}$ | $\forall\, i, t \geq 2$ | Eqn. 58 |
| $I_{it}, s_{it}^f, s_{it}^r \geq 0$ | $\forall\, i, t$ | Eqn. 59 |
| $x_{it}, y_{it}, w_{it}, h_{it} \in \{0, 1\}$ | $\forall\, i, t$ | Eqn. 60 |
| $n_{it}, U_{it} \in \{0, 1, 2, 3 \ldots\}$ | $\forall\, i, t$ | Eqn. 61 |

Where $s_{it}^r$: Units of SKU i that is restocked in the non-empty slot containing SKU i at time t (partial replenishment units of SKU i at time t.)

$h_{it}$: 1 if $s_{it}^r$ units of SKU i are restocked in the non-empty slot containing SKU i at time t; 0 otherwise.

Since model $M_b^2$ provides both partial and full replenishment opportunities for the products of the forward area, $n_{it}$ is corresponded with both variables $U_{it}$ and $s_{it}^r$ in constraint 54. $U_{it}$ covers the full replenishments and $s_{it}^r$ accounts for the partial ones. Constraint 56 makes the binary variable hit 1, if any partial replenishment occurs. Constraint 57 assures that the units of partial replenishment are less than or equal to the available capacity of the non-empty slot containing SKU i at time t. Constraint 58 controls the partial replenishments and makes sure that they are executed for only non-empty slots.

Replenish up to full any time ($M_c^2$):

$$\text{Min} C_1 = c_1 \sum_{i=1}^{N} \sum_{t=1}^{T} p_{it} x_{it} + c_2 \sum_{i=1}^{N} \sum_{t=1}^{T} p_{it}(1-x_{it}) + c \sum_{i=1}^{N} \sum_{t=1}^{T}(y_{it}+w_{it}+h_{it})$$

subject to:

| | | |
|---|---|---|
| $-I_{it} + I_{i,t-1} + e_i U_{it} - d_{it} x_{it} - s_{it}^f + s_{it}^r = 0$ | $\forall\, i, t \geq 2$ | Eqn. 62 |
| $\sum_{i=1}^{N} n_{it} \leq \eta$ | $\forall\, t$ | Eqn. 63 |
| $U_{it} \leq \eta y_{it}$ | $\forall\, i, t$ | Eqn. 64 |
| $n_{it} \geq \dfrac{I_{i,t-1} + e_i U_{it} - s_{it}^f + s_{it}^r}{e_i}$ | $\forall\, i, t$ | Eqn. 65 |
| $s_{it}^f \leq \eta e_i w_{it}$ | $\forall\, i, t$ | Eqn. 66 |
| $s_{it}^r \leq \eta e_i h_{it}$ | $\forall\, i, t$ | Eqn. 67 |
| $s_{it}^r \leq e_i - I_{i,t-1}$ | $\forall\, i, t \geq 2$ | Eqn. 68 |
| $s_{it}^r \geq e_i - I_{i,t-1} - e_i(1 - h_{it})$ | $\forall\, i, t \geq 2$ | Eqn. 69 |
| $I_{it}, s_{it}^f, s_{it}^r \geq 0$ | $\forall\, i, t$ | Eqn. 70 |
| $x_{it}, y_{it}, w_{it}, h_{it} \in \{0, 1\}$ | $\forall\, i, t$ | Eqn. 71 |
| $n_{it}, U_{it} \in \{0, 1, 2, 3 \ldots\}$ | $\forall\, i, t$ | Eqn. 72 |

Model $M_c^2$ can replenish fully at any time. This model is similar to model $M_c^2$, except in one constraint: model $M_c^2$ does not need constraint 58. Instead, constraint 69 is added to link to constraint 68 and replenish an amount exactly equal to the available capacity of the slot ($e_i - I_{i,t-1}$) when a partial replenishment is required ($h_{it}=1$).

Heuristics for the dynamic forward-reserve problem (T.P): In this section, a simple threshold policy is investigated that performs almost as well as the dynamic MIP model $M_c^2$ described elsewhere herein. The problem gets significantly more computationally expensive for large amounts of data. The suggested intuitive heuristic T.P. delivers a near optimal solution within a reasonable computing time as well as an acceptable performance consuming the sensible number of SKUs and size of the forward area in practice. It is assumed that the replenishments can be made over time with a negligible operational time and when the pick list for the current period (t=0) is known. The demand data for the next w period is forecasted.

T.P. uses heuristic $G_2$ (see Appendix) for an SKU assignment and slot allocation of the forward area. In the case of the initial empty forward area, the $G_2$ is run first to get the initial layout and slot allocation. In each period, the inventory level of the slots drop based on the SKU demand in that period. If the inventory level of the SKU is zero or below, $G_2$ is run to decide the SKU re-assignment in the forward area. If re-assigned, it will be replenished and the inventory level gets updated. If not, the slot gets empty by pick. Note that the SKUs that are available in the forward area with Iit>0 are excluded from the candidate set of SKUs imported to $G_2$. Finally, all replenishments and picks from the forward and reserve areas counted for the total cost calculations.

T.P. is an algorithm used simultaneously for a dynamic SKU and an assignment of the forward area. In other words, this heuristic not only keeps the currency of the forward area by updating the set of assigned SKUs to the fast picking area, but also adjusts the allocated slots to them. The pseudo code for the heuristic T.P. that updates both the SKU assignment and the discrete space allocation in the forward area is as follows:

```
Dynamic SKU assignment and slot allocation in the forward area
(heuristic T.P.)
Input: The generic MIP DFRP model's parameters.
Output: The dynamic SKU assignment and slot allocation in the forward
area over time.
r, p, k,E = 0
For (t = 1 to T)
    Read the initial inventory of the current layout of the forward area (I_it);
    Read the actual demand data for the current time;
    Read the forecasted demand (d_it) of forecasting window w;
    For all SKUs in the forward area
        I_it = I_i,t-1 - d_it;
    EndFor
    e_1, e_2, e, x = 0;
    For all SKUs in the forward area
        If I_it = 0 & I_i,t-1 > 0 then e_1 = e_1 + 1; endIf
        If I_it < 0 then e_2 = e_2 + 1; endIf
    EndFor
    e = e_1 + e_2;
    If e > 0 then
    Run G_2 to get SKU assignment and allocation;
    comment: (Procedure A_4 was used in G_2 for ranking and
    space allocation:
```

$$A_4: f_{4it} = \frac{d_{it}}{b_i} \, le_{it} = \frac{p_{it}}{\sqrt{f_{4it}}} \, y_{4it} = \frac{\sqrt{q'_{it}}}{\Sigma_{j\in A} \sqrt{q'_{jt}}} S.$$

```
    Exclude all available SKUs in the forward area (I_it > 0) from the
    solution of G_2;
    comment: (Replenish the empty slots with the first e allocated slots
    from
        the solution of G_2.)
    For all SKUs in the forward area
        If I_it ≤ 0 then I_it = I_it + a_i n_it; endIf
    EndFor
    For all SKUs in the forward area
        If Iit < 0 then I_it = 0; k = k + 1;
        comment: (k is the number of SKUs that leave the forward area and
        only the rest of order is replenished at time t.)
        endIf
    EndFor
    EndIf
    E = E + e; comment: (E calculates total number of emptied slots during
    T.)
EndFor
For (t = 1 to T)
    For all SKUs in the forward area
        If I_i,t-1 > I_it
            r = r + 1; comment: (Find number of replenishments.)
        EndIf
        If I_it > 0 & I_i,t-1 & I_i,t-1 < Iit
            p = p + 1; comment: (Find number of picks from the forward
            area.)
        EndIf
    EndFor
EndFor
comment: (Calculate the picking and replenishment costs as below. P is
the total picks during T)
Total cost = c_1(p + E - k) + c_2(P - p) + c(r + k)
```

Examining the effect of a slot allocation on the total cost, algorithm T.P.' is developed for the dynamic slotting problem that only considers the assignment of SKUs to the forward area, not the space allocation. Heuristic T.P.' assumes one slot per SKU in the forward area and is based on the following four steps:

```
Dynamic SKU assignment in the forward area (heuristic T.P.')
Input: The generic MIP DFRP model's parameters.
Output: The dynamic SKU assignment in the forward area over time.
For (t = 1 to T)
1. Find empty slots. Find e, the total number of the empty slots and the
slots that become empty by the order picking at time t.
2. Sort. Rank the SKUs by the labor efficiency of SKU it at time t (leit)
using the forecast demand data for the forecasting window,
``` where $f_{4it} = \frac{d_{it}}{b_i}$, $le_{it} = \frac{p_{it}}{\sqrt{f_{4it}}}$

```
3. Update. Update the list by excluding those SKUs that still have
inventory in the forward area, even after order picking at time t.
4. Assign SKUs to the empty slots. Assign the first e SKUs of the list to
the emptied slots. Each assigned SKU gets one slot.
EndFor
```

Model Validation and Numerical Discussions: This section first compares the static model of an SKU assignment and a discrete space allocation of the forward area to the most similar dynamic model, which is $M_2^a$. The solution of the problem with perfect information about the future demand demonstrates the resulted gap due to the demand forecasting process. The effect of an activity distribution of items on the total saving by the dynamic model is addressed. Then, the performance of DFRP is compared to the different replenishment strategies in FIG. 19; a static FRP and two threshold policies developed in section G. Finally, how the volatility of the demand patterns impact the computational results using a variety of data sets is examined.

Comparison of the static and dynamic models using the forecast demand data: The static and dynamic model picking and replenishment costs are presented in TABLE 16. While the demand data of the first period (t=1) is assumed as known, the demand data for the rest of the planning horizon is forecasted and updated at each run t. Therefore, the pick and replenishment decisions of the first period using the known demand and picks data are actual, causing the inventory level of slots to drop by the actual demand values, but those for t>1 provide the planning insights. Note that all DFRP results are associated with forecasted data, unless were the PI for the perfect information is mentioned.

It is observed in TABLE 16 that the dynamic model always outperforms the static model. The cost improvement by the dynamic model is greater when the static model is interrupted more frequently (four updates or every four days, T=20). The reason is that some SKUs leave the forward area in each update before finishing their minimum payback period ($T'_i$). $T'_i$ is the minimum time that SKU i should stay in the forward area to make a profit. The smallest number that satisfies non-equality 74 below is $T'_i$.

$$c + c_1 \sum_{i=1}^{T'_i} p_{it} < c_2 \sum_{i=1}^{T'_i} p_{it} \qquad \forall t \quad \text{Eqn. 73}$$

$$\sum_{i=1}^{T'_i} p_{it} > \frac{c}{c_2 - c_1} \qquad \forall t \quad \text{Eqn. 74}$$

$T'_i$s values are not the same for every SKU. Thus, re-layouting the forward area in a certain interval will be disruptive for the SKUs, which have been stored for less than $T'_i$ periods after their last replenishment in the forward area and are forced to leave the forward area during update times.

TABLE 16

Total cost and savings (%) obtained from static (S) and dynamic model M2

|  | $C_S$ | $C_{Ma2}$(PI) | % $\text{Imp}_{ma2(PI) \to S}$ | $c_{Ma2}$ | % $\text{Imp}_{ma2 \to S}$ |
|---|---|---|---|---|---|
| No update | 1643452 | 1392004 | 15.30 | 1403328 | 14.61 |
| One update | 1625704 | 1392004 | 14.38 | 1403328 | 13.68 |
| Three updates | 1756932 | 1392004 | 20.77 | 1403328 | 20.13 |
| Four updates | 1822404 | 1392004 | 23.62 | 1403328 | 23.00 |

In order to study the performance of the dynamic model for a different activity level of the items in the facility, the experiments listed in TABLE 17 were generated. Active items are those items that are picked frequently. The percentage of the fast movers ranges from 10% to 85%. The results of TABLE 17 shows that active warehouses with large percentage of fast movers can benefit more from the dynamic model rather than the slow warehouses, which contains a large fraction of slow movers. As expected, a saving of 9.72%, which was obtained from the dynamic model over the static model, is still considerable for the inactive warehouse in the designed experiments.

TABLE 17

Cost comparisons of the activity distribution of items ($M_a^2$)

| No. of SKUs | No. of slow movers | % fast movers % | Imp ($M_a^2 \to static$) |
|---|---|---|---|
| 5000 | 4500 | 10 | 9.72 |
| 2500 | 2000 | 20 | 11.94 |
| 1666 | 1166 | 30 | 12.92 |
| 1250 | 750 | 40 | 13.48 |
| 1000 | 500 | 50 | 13.84 |
| 600 | 100 | 85 | 14.45 |

Comparison of different replenishment strategies of the dynamic model, static model and threshold policies: This section, first provides a mechanism for constructing the data set used in comparisons. By applying the ABC analysis, the size of a data set may be drastically reduced. The slow movers are excluded from the candidate set of SKUs for the forward area by this method. While a large portion of the SKUs in the warehouse are slow movers, a small portion accounts for most of the picking activities and makes up a large percentage of orders. In some example implementations, it is necessary to know the fast movers, which can be candidates in DFRP analysis. Traditionally, the ABC analysis classifies the SKUs based on their activities in three groups: a small fraction of fast movers, medium movers, and a large fraction of slow movers.

The small fraction of SKUs (the fast movers) matters in making decisions for the forward area. The intermittent demand trend (trend 8), which contains many zeros in the demand profile, forms a large portion of slow movers.

Figure 20:
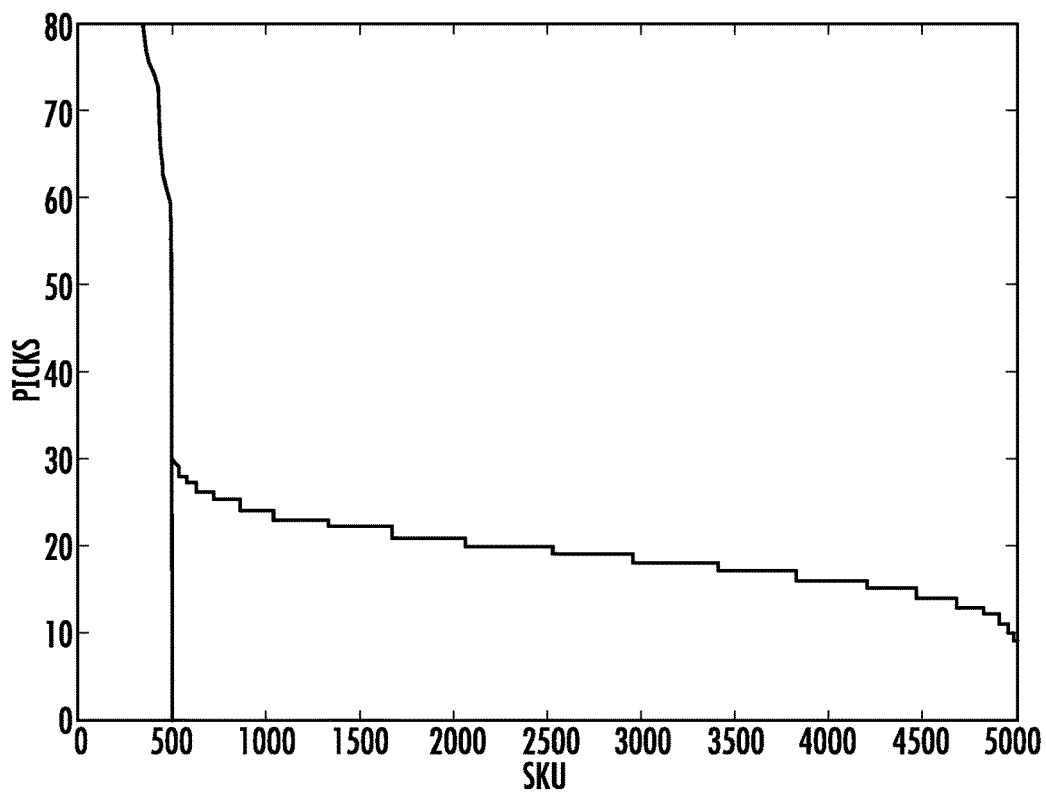
FIG. 20 illustrates a graphical plot of ABC analysis.

FIG. 20 shows the demand curve of the total 5000 SKUs in the warehouse. The items are ranked in decreasing order based on their contribution to the total demand. The SKUs up to the red line are considered in DFRP. Since there is no fixed threshold for each class, depending on the size of the forward area, the red line can move left or right based on objective criteria in the dynamic assignment and allocation problem to consider less or more SKUs as DFRP input. The forward area in the following numerical examples has 320 slots. Respecting the recommended break down for ABC classes, 500 of the fastest movers (10% of all SKUs) were truncated as the candidates to be stored in the forward area. This 10% accounts for 68.73% of all picks in the data set.

The total costs of the discussed replenishment strategies for the dynamic model were investigated, along with the dynamic, static, and dynamic heuristics T.P. and T.P.' comparisons. TABLE 18 contains the results of a computational study on the DFRP with different replenishment policies. The full replenishment models ($M^2$) always outperform the quantity replenishment models ($M^1$). The quantity replenishment models have a higher number of partial replenishments compared to the full replenishment models. Part of the partial replenishments of M1 models is due to vacating the slots based on the forecasted demand data. However, the actual demand may not be exactly the same as the forecasted demand and so the slots cannot get empty. This risk does not concern the $M_a^2$ and $M_c^2$ models, where only full replenishments are allowed.

TABLE 18

Results for different replenishment policies of DFRP

|  | Static | $M^1_{LH}$ | $M^1_{ULH}$ | $M_a^2$(PI) | $M_a^2$ | $M_b^2$ | $M_c^2$ | T.P. | T.P.' |
|---|---|---|---|---|---|---|---|---|---|
| Full Replens | 1659 | — | — | 674 | 577 | 350 | 350 | 1020 | 1226 |
| Partial replens | — | 1134 | 691 | — | — | 667 | 667 | — | — |
| Move to reserve | 37 | 0 | 66 | 0 | 1 | 0 | 0 | 222 | 213 |
| Replens&moves | 1696 | 1134 | 757 | 674 | 578 | 1017 | 1017 | 1242 | 1439 |
| Forward picks | 5396 | 5061 | 4103 | 4351 | 4028 | 4900 | 4991 | 5269 | 5842 |
| Reserve picks | 4277 | 4612 | 5570 | 5322 | 5645 | 4773 | 4682 | 4404 | 3831 |
| Total cost | 1625704 | 1461724 | 1460248 | 1392004 | 1403328 | 1441092 | 1378604 | 1471980 | 1462036 |
| % Imp. Over static | — | 10.09 | 10.18 | 14.38 | 13.68 | 11.36 | 15.20 | 9.46 | 10.07 |

$M^1_{LH}$ model considers a limited horizon, where the replenishment quantity may be less than the full slot. In this case, the chance of restocking the whole slot is missed. Consequently, the number of replenishments rises, but still less than the static model. The unlimited horizon in $M^1_{ULH}$ does not fix this problem. Similarly, it may fill a portion of a slot, even having the whole horizon forecast, in the hopes of vacating a slot. However, slot vacating may not come true by the actual demand. Another limitation of model $M^1_{ULH}$ is that the length of period t is 3 days (t in the other models is one day) due to the computational complexity reduction. So, the delivered solutions are corresponded to the 3 days demand data, not the daily demand. In other words, the decisions about the forward area can only be updated every 3 days. It is observed that $M^1_{ULH}$ generates the largest number of moves to the reserve area.

Among all three replenishment policies defined for the full slot replenishment in $M_2$, model $M_b^2$, which allows the partial replenishment of a non-empty slot along the operations, suffers from the aforementioned limitations of the partial restocking, including the high number of replenishment and so a greater total cost. Compared to $M_a^2$, which does not have the option of a partial replenishment of the non-empty slots, $M_b^2$ allows more picks from the forward area rather than the reserve area, but the number of moves and replenishments in $M_b^2$ is 43% higher than M2 a. Therefore, it is suggested to not partially replenish the forward area slots any time.

Model $M_c^2$, which fully replenish the empty slot(s) and also have the option of replenishing the non-empty slots up to full capacity, $e_i$, is the best strategy with the lowest cost among all of the DFRP's replenishment policies. Although the number of replenishments and moves in $M_c^2$ is not minimum among all other models, this model has the minimum number of picking and replenishment costs. The cost of $M_c^2$ is even less than the $M_a^2$(PI) cost because it can replenish any time up to full while $M_a^2$ (PI) can replenish full only when the slot is empty. It is worth noting that although $M_c^2$ is more constrained than the quantity replenishment models ($M^1$), its lower total cost during the planning horizon after multiple runs of $M_c^2$ with the updated forecasted demand data at each t justifies the fitness of this model in the dynamic slotting (See FIG. 12). It will be appreciated that this is not comparing the one-time run models with fixed input data. The models are fed with the varying demand and pick data at each t and the models' decisions are changed with the updated inputs at each t.

It can also be referred from TABLE 18 that the dynamic threshold policies T.P. and T.P.' are almost as good as the dynamic model with partial replenishment. Space allocation by T.P. heuristic makes 0.61% more savings than allocating the same amount of space (one slot per assigned SKU) in the T.P.' heuristic.

Figure 21:
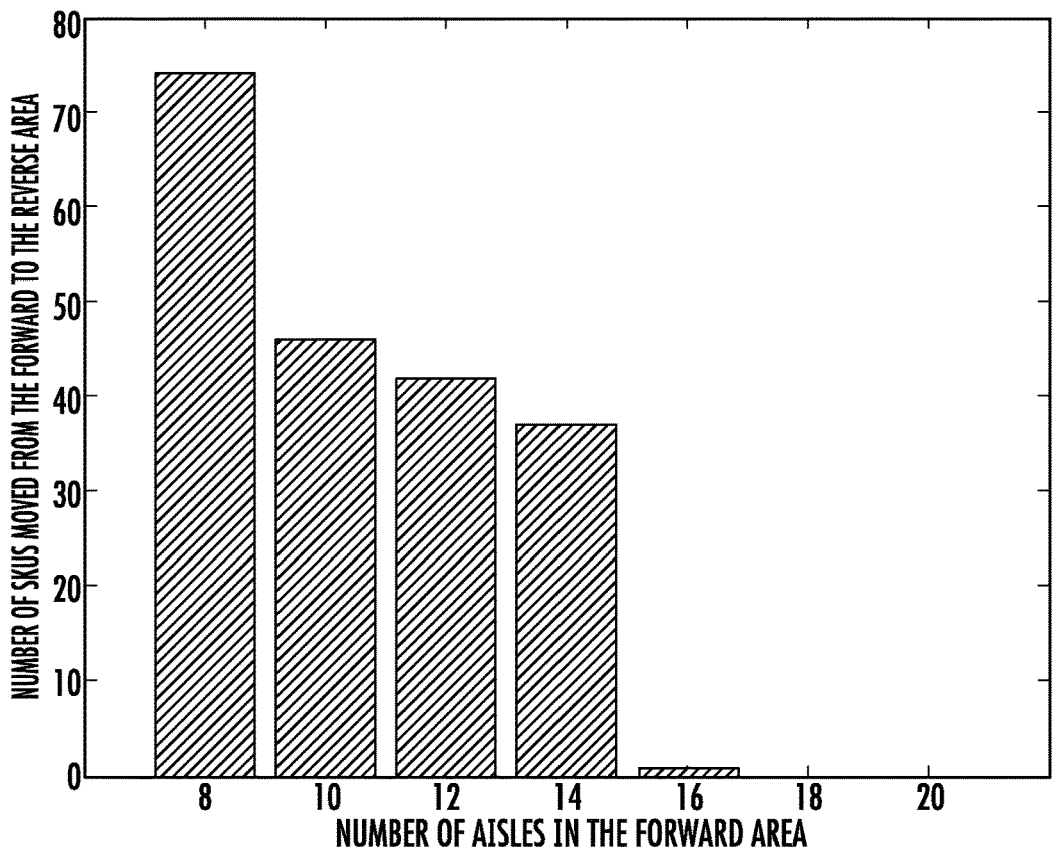
FIG. 21 illustrates a graphical plot of number of moves from the forward area to reserve area.

The number of moves to the reserve area depends on the size of the forward area. FIG. 21 shows that the smaller forward areas experience a higher number of moves from the forward area to the reserve area due to the open space for the candidate SKUs in the forward area.

The dynamic slot allocation behavior for different replenishment policies was investigated. $SL_i$ is the set of allocated slots to the SKU i during the planning horizon, $SL_i = \{n_{i1}, n_{i2}, n_{i3}, \ldots, n_{iT}\}$, where T is the length of the planning horizon and $n_{it} \geq 0$. Parameter $K_i$ is defined as the number of unique values in $SL_i$. Higher values of parameter $K_i$ show that the SKU experiences a more diverse number of allocated slots in the forward area. For example, if an SKU is given, sometimes 2 slots, other times 3 slots, in the forward area, $SL_i$ will have two unique values ($K_i=2$). Note that $n_{it}$ can be zero, which means that SKU i has not been in the forward area at time t (nit=0). One example's solutions reveal that the assigned SKUs to the forward area never receive more than 3 slots in all of the strategies ($K_i \leq 4$). $K_i=1$ is split to two cases:

$$K_i = \begin{cases} 1' & \text{if all } n_{it} = 0 \\ 1'', & \text{otherwise} \end{cases}$$

$K_i=1'$ refers to the SKUs that are always picked from the reserve area and so their allocated slots are always zero. $K_i=100$ refers to the SKUs that always have a fixed number of allocated slot(s) in the forward area.

TABLE 19 returns the number of SKUs with different $K_i$ for the static model with one update and the dynamic model with different replenishment strategies. It is observed that the static model excludes the greatest number of SKUs for being stored in the forward area. Compared to the full slot allocation models, M2, the partial replenishment models, M1, face a higher number of SKUs with $K_i \geq 3$, meaning that more allocated slots to the SKUs in the forward area and a higher variability in slot allocation as well.

TABLE 19

| | No. of SKUs with different values of $K_i$ | | | | | | | |
|---|---|---|---|---|---|---|---|---|
| $K_i$ | Static | $M^1_{LH}$ | $M^1_{ULH}$ | $M_a^2$(PI) | $M_a^2$ | $M_b^2$ | $M_c^2$ | T.P. | T.P.' |
| 10 | 200 | 137 | 177 | 138 | 142 | 160 | 138 | 51 | 49 |
| 100 | 231 | 140 | 84 | 117 | 122 | 285 | 201 | 138 | 169 |
| 2 | 69 | 139 | 197 | 211 | 212 | 54 | 134 | 285 | 282 |
| 3 | 0 | 80 | 40 | 34 | 24 | 1 | 27 | 26 | 0 |
| 4 | 0 | 4 | 2 | 0 | 0 | 0 | 0 | 0 | 0 |

Figure 22:
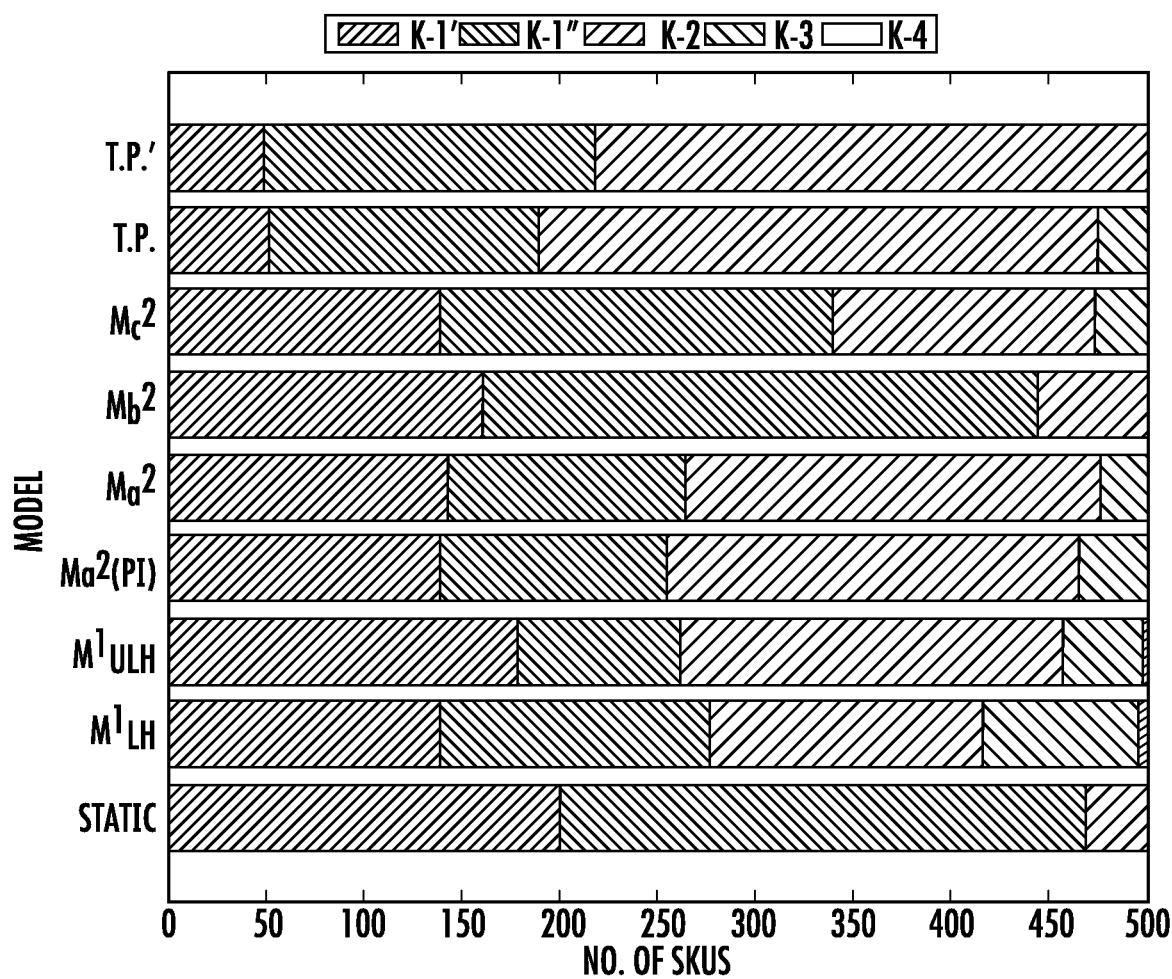
FIG. 22 illustrates a graphical bar chart of distribution of SKUs with different values of Ki.

FIG. 22 displays the stacked bar graph of distribution of items, based on $K_i$, for different models. Each bar is multicolored, with colors corresponding to $K_i$ and showing the relative contribution that different values of $K_i$ make to the total number of SKUs. This figure shows that Mb2, which can partially replenish the non-empty slots, is the most similar case to the static model regarding the slot allocation. While Ma2 and Mb2 has a large portion of SKUs in storage mode 2 and 1, respectively, $M_c^2$—the best replenishment strategy using the forecasted demand data—has the SKUs more evenly distributed among these two storage modes. In dynamic slotting strategies, on average 39% of the SKUs experience more than one storage mode ($K_i \geq 2$) in the forward area. However, updating the forward area periodically in the static model changes the storage mode of only 6% of the SKUs.

Although the static model has the option of periodically updating the forward area, FIG. 22 also shows that the $K_i$ values of this model do not exceed 2, which shows the less variability and flexibility in the number of allocated slots to the SKUs.

Volatility: What industries can benefit most from implementing the dynamic slotting? Is the dynamic model more effective in high volatile periods? Demand volatility is a reality in the logistics industry. The dynamic slotting model can alleviate the adverse effects of the demand volatility on the decisions about the forward area over time. Given the historical demand data, it is possible to aim to find out in what periods of the year a warehouse will benefit more from the dynamic approach compared to the static strategy. It is valuable to assess the effectiveness of the dynamic model in two situations:

1. The demand trends of the majority of SKUs in a warehouse is normal (the first demand trend defined or, 2. The majority of SKUs shows a high level of volatility in their demand trends (the second to seventh demand patterns defined.)

The SKUs' demand trends are statistically equivalent to the time series. The volatility index discussed in this section does not represent the variation within the demand trends. It is also different from the beta factor in finance, which measures the stock's volatility over time in relation to the overall market. Nevertheless, it aims to denote the non-similarity between the SKUs' demand trends over time. The volatility index contains the influence of the abnormal demand patterns. One simple way to compute this index is by detecting the change in the linear trend (slope) through the use of the end points from the time segments. The slope between the consecutive break points is a simple measure that can provide the information about the demand pattern variation. The high volatility index refers to the high variance between the slopes of SKUs' demand trends in each time segment.

Time-varying demand volatility implies that the volatility is itself subject to swings at various points in time. In other words, the order data reflects the high and low volatility periods over time. An algorithm to represent the volatility of the demand patterns over time was investigated. The saving levels resulted from the dynamic model, which corresponds to the different amount of volatility is also discussed herein.

Assessing the time-varying demand volatility, the following procedure was developed:

Step 1. Shift the SKU demand curves towards the mean of the mean curve.

Step 2. $\forall t$, compute the slope, $s_{it}$, of the next $T^s$ period for each SKU, using the following formula:

$$s_{it} = \frac{D_{i,t+T^s} - D_{it}}{T^s} \qquad \text{Eqn. 75}$$

Step 3. Compute the variance of the slopes over time.

The example below is provided to clearly explain the algorithm for finding the volatility index.

Figure 23:
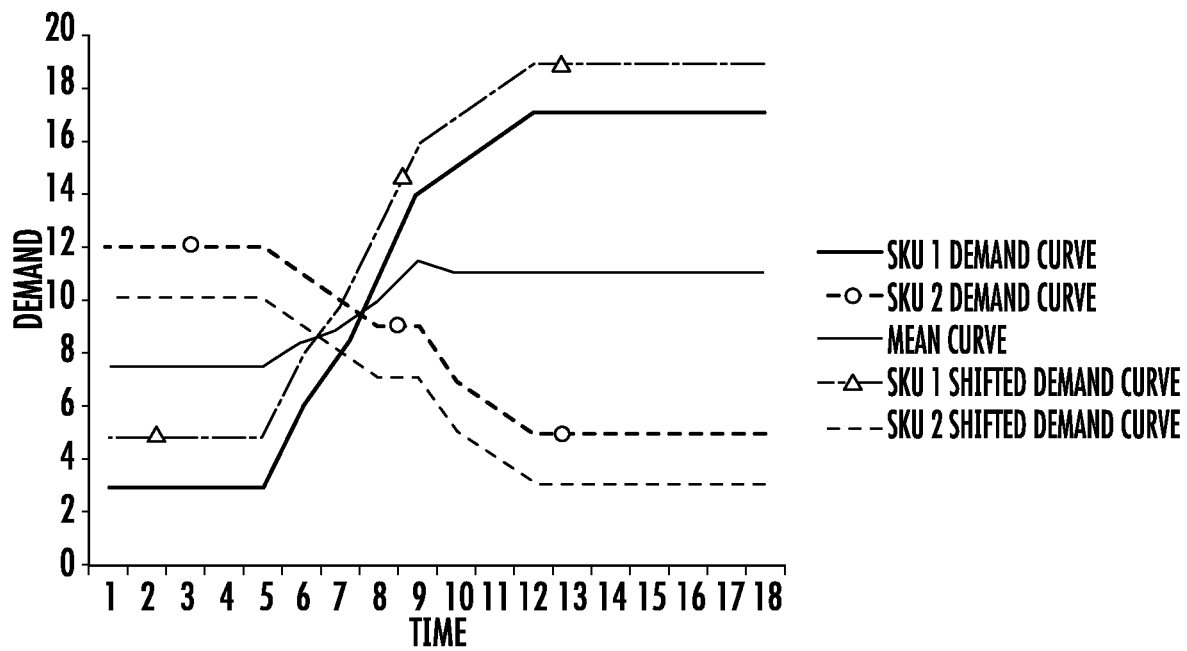
FIG. 23 illustrates a graphical plot of demand curves corresponded to TABLE 20.
Figure 24:
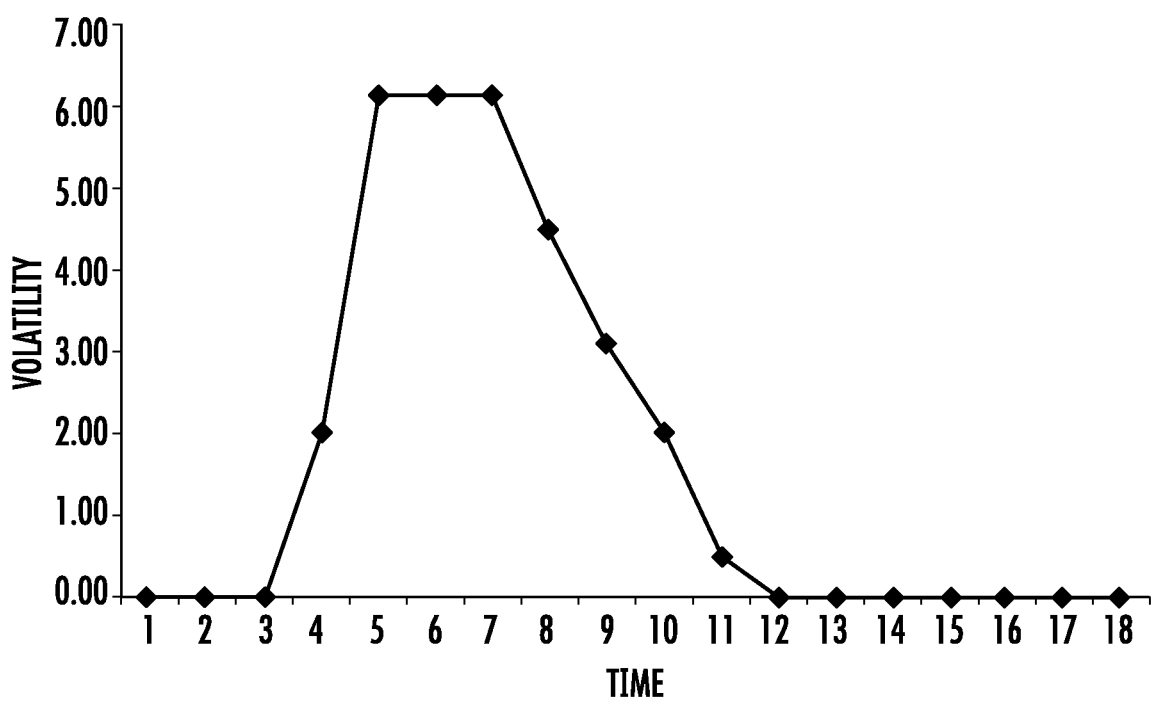
FIG. 24 illustrates a graphical plot of volatility curve of a numerical example.

Example: A numerical example for the volatility index algorithm contains two SKUs. The second and third columns of TABLE 20 show the demand data for the SKU 1 and 2. The fourth column of this table forms the mean curve points, shown in FIG. 23, based on the mean of $D_1$ and $D_2$ columns at each t. The demand curves in FIG. 23 are shifted toward the mean curve, an amount equal to the difference between the mean of the mean curve (13.71) and mean of the demand curves. Thus, $D_1$ is shifted 15.58−13.71=1.87 and $D_2$ is shifted 13.71−11.83=1.88 toward the mean curve for all t. The decimal values of the numbers in this table are rounded. Next, the slopes of the shifted demands are obtained in columns S1$t$ and S2$t$, using the equation 75 and the arbitrary value of $T^s$=2. The last column of TABLE 20, which is corresponded to the curve in FIG. 24, calculates the variance of the slopes at each t. These variance values are the volatility indexes of an example over time. FIG. 24 shows that the demand data volatility of this data set is rising, which starts at period 4 and will go down until period 12 where the demand curves start to follow the smooth and stationary pattern again with no up/down trend.

TABLE 20

Example for the volatility index calculation

| Time | $D_1$ | $D_2$ | MD | $SD_1$ | $SD_2$ | $S_{1t}$ | $S_{2t}$ | Var |
|---|---|---|---|---|---|---|---|---|
| 1 | 3 | 12 | 7.5 | 4.88 | 10.125 | 0.00 | 0.00 | 0.00 |
| 2 | 3 | 12 | 7.5 | 4.88 | 10.125 | 0.00 | 0.00 | 0.00 |
| 3 | 3 | 12 | 7.5 | 4.88 | 10.125 | 0.00 | 0.00 | 0.00 |
| 4 | 3 | 12 | 7.5 | 4.88 | 10.125 | 1.50 | −0.50 | 2.00 |
| 5 | 3 | 12 | 7.5 | 4.88 | 10.125 | 2.50 | −1.00 | 6.13 |
| 6 | 6 | 11 | 8.5 | 7.88 | 9.125 | 2.50 | −1.00 | 6.13 |
| 7 | 8 | 10 | 9 | 9.88 | 8.125 | 3.00 | −0.50 | 6.13 |
| 8 | 11 | 9 | 10 | 12.88 | 7.125 | 2.00 | −1.00 | 4.50 |
| 9 | 14 | 9 | 11.5 | 15.88 | 7.125 | 1.00 | −1.50 | 3.13 |
| 10 | 15 | 7 | 11 | 16.88 | 5.125 | 1.00 | −1.00 | 2.00 |
| 11 | 16 | 6 | 11 | 17.88 | 4.125 | 0.50 | −0.50 | 0.50 |
| 12 | 17 | 5 | 11 | 18.88 | 3.125 | 0.00 | 0.00 | 0.00 |
| 13 | 17 | 5 | 11 | 18.88 | 3.125 | 0.00 | 0.00 | 0.00 |
| 14 | 17 | 5 | 11 | 18.88 | 3.125 | 0.00 | 0.00 | 0.00 |
| 15 | 17 | 5 | 11 | 18.88 | 3.125 | 0.00 | 0.00 | 0.00 |
| 16 | 17 | 5 | 11 | 18.88 | 3.125 | 0.00 | 0.00 | 0.00 |
| 17 | 17 | 5 | 11 | 18.88 | 3.125 | 0.00 | 0.00 | 0.00 |
| 18 | 17 | 5 | 11 | 18.88 | 3.125 | 0.00 | 0.00 | 0.00 |
| Mean | 15.58 | 11.83 | 13.71 | | | | | |

$D_1$ = Demand of SKU 1,
D2 = Demand of SKU 2,
MC = Mean of SKUs demand,
$SD_1$ = Shifted demand of SKU 1,
SD2 = Shifted demand of SKU 1,
S1t = Slope of SKU 1 with Ts = 2,
S2t = Slope of SKU 2 with Ts = 2.
S2t = Variance of slopes of SKU 1 and 2.

Figure 25A:
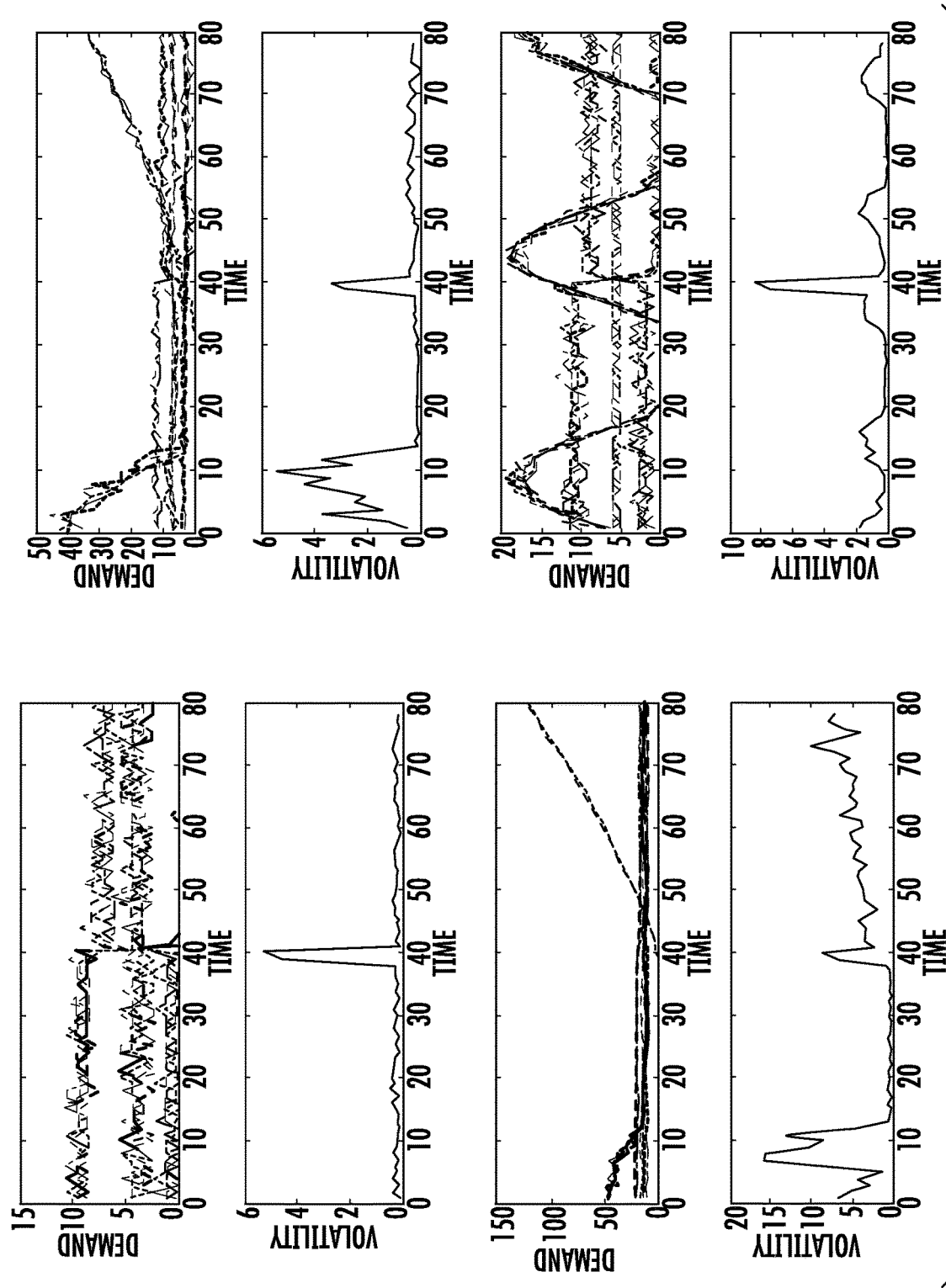
FIGS. 25A and 25B illustrate volatility diagrams of simulated order data 1 through 6.
Figure 25B:
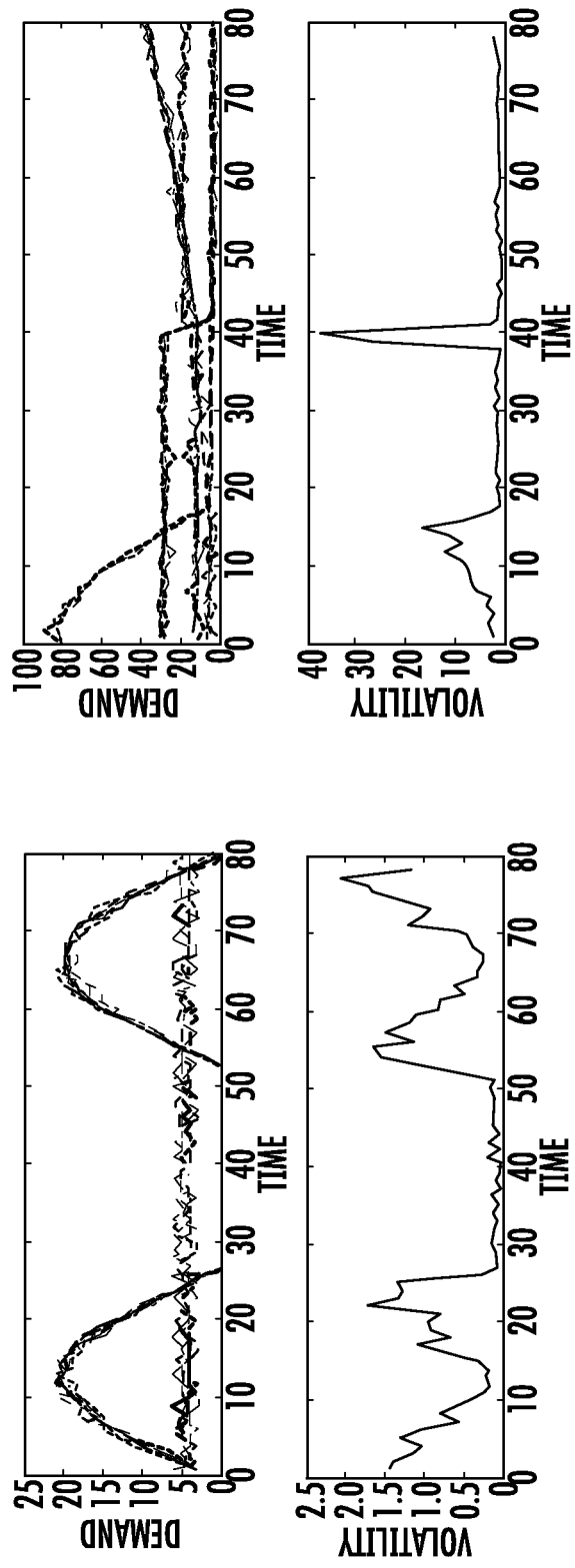
Figure 26:
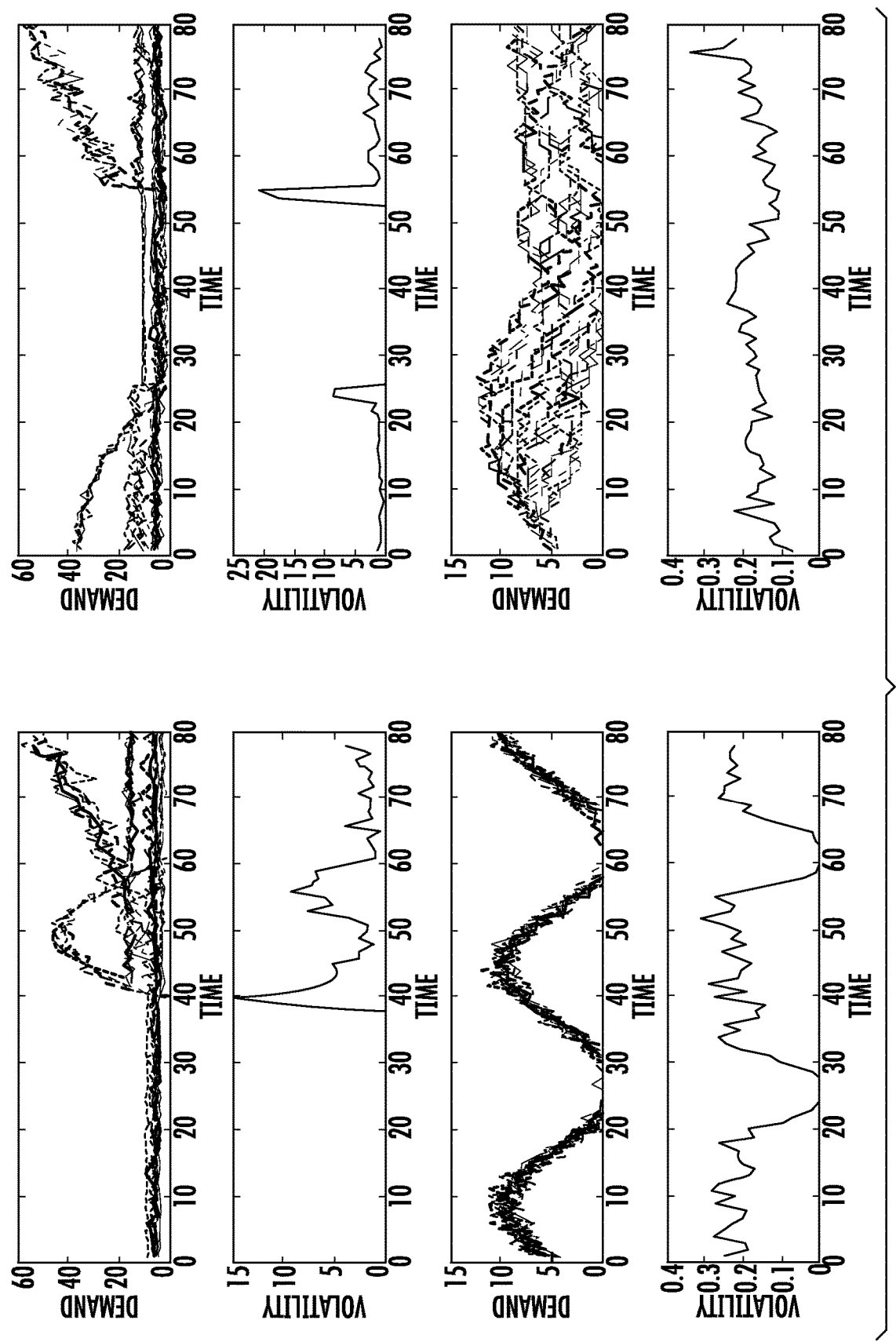
FIG. 26 illustrates volatility diagrams of simulated order data 7 through 10.

The index that is obtained from step 3 of the algorithm is named the Volatility index in the analysis disclosed herein. FIGS. 25A, 25B, and 26 display the variation of this index over time. When the majority of SKUs follows a normal demand pattern, the volatility index is close to zero. On the other hand, the volatility index rises in periods when the order data contains the variety of demand trends (up/down trends, up/down shifts, cyclic, systematic).

Investigating the improvement percentage of the dynamic over the static model, 7 order transaction data were simulated, as presented in TABLE 21. The portion of the SKUs with a normal demand pattern in the data set varies, as shown in the first column of this table. It is observed that the dynamic model makes more profit when the demand volatility is higher. This disclosure presents the results of TABLE 21, using FIGS. 27 to 30.

Figure 27:
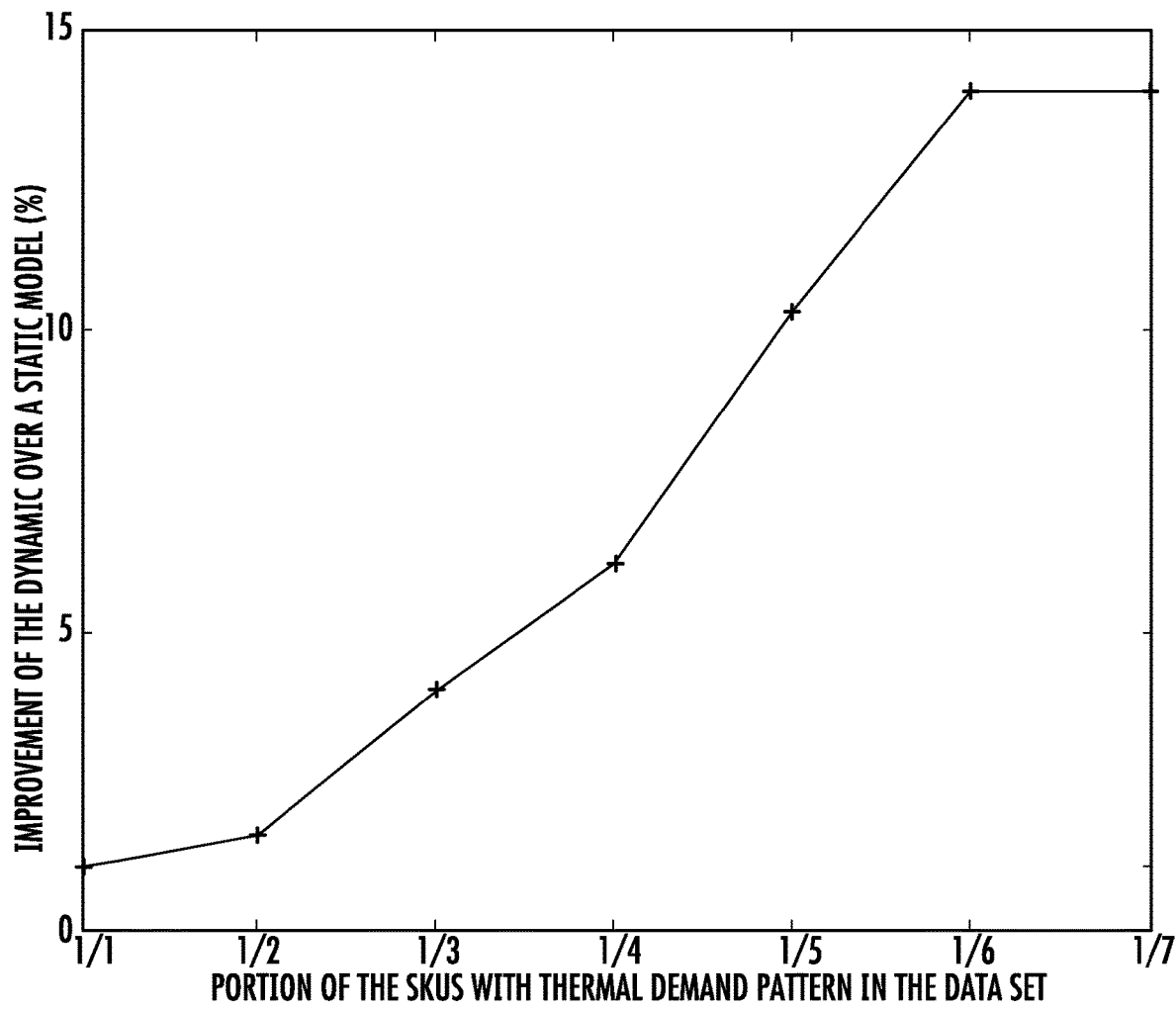
FIG. 27 illustrates a graphical plot of dynamic model efficiency versus the demand volatility.

FIG. 27 represents the profits of the dynamic model for a different portion of the normal demand patterns in the data set. As this figure shows, the dynamic model generates more savings for high volatility cases (the lower portions of the normal demand trends in the data set). The maximum saving of the dynamic model over the static model in this example is 14% and it occurs when the portion of the SKUs with normal demand patterns is the lowest (1/7).

The main insight of this section is that once one has decided to use the dynamic re-slotting strategy, the profits are higher during the periods of the year when the SKUs' demand patterns encounter instability (e.g. seasonality, SKU growth, demand growth, promotions, competitor's offering, etc.). However, it does not mean that the stable time conveys no benefit, since the first data set with 100% normal data still results in 2.26% saving.

Figure 28:
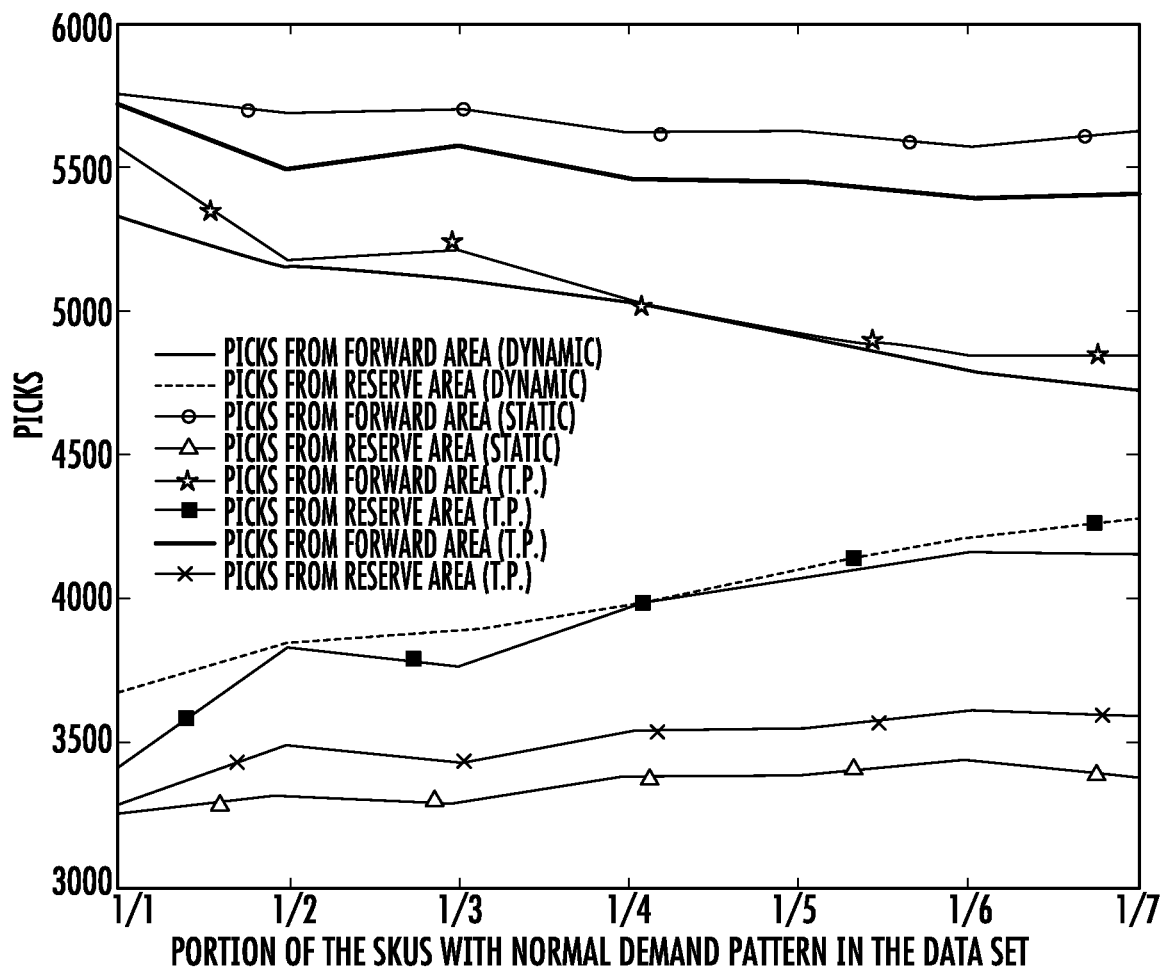
FIG. 28 illustrates a graphical plot of demand volatility impacts on picks from the forward or reserve area.

FIG. 28 shows the number of picks from the forward and reserve areas versus the demand volatility for different models. Interestingly, the number of picks from the forward area in the dynamic model decreases when the demand volatility is higher. Therefore, the picks from the reserve area increases during high volatile periods. The static model is less sensitive in this regard; once an SKU is assigned to the forward area, it is always picked from the forward area. Nevertheless, the dynamic model allows picking from the reserve area when unusual orders are being received. The goal is avoiding extra replenishments and moves in high volatile periods.

Figure 29:
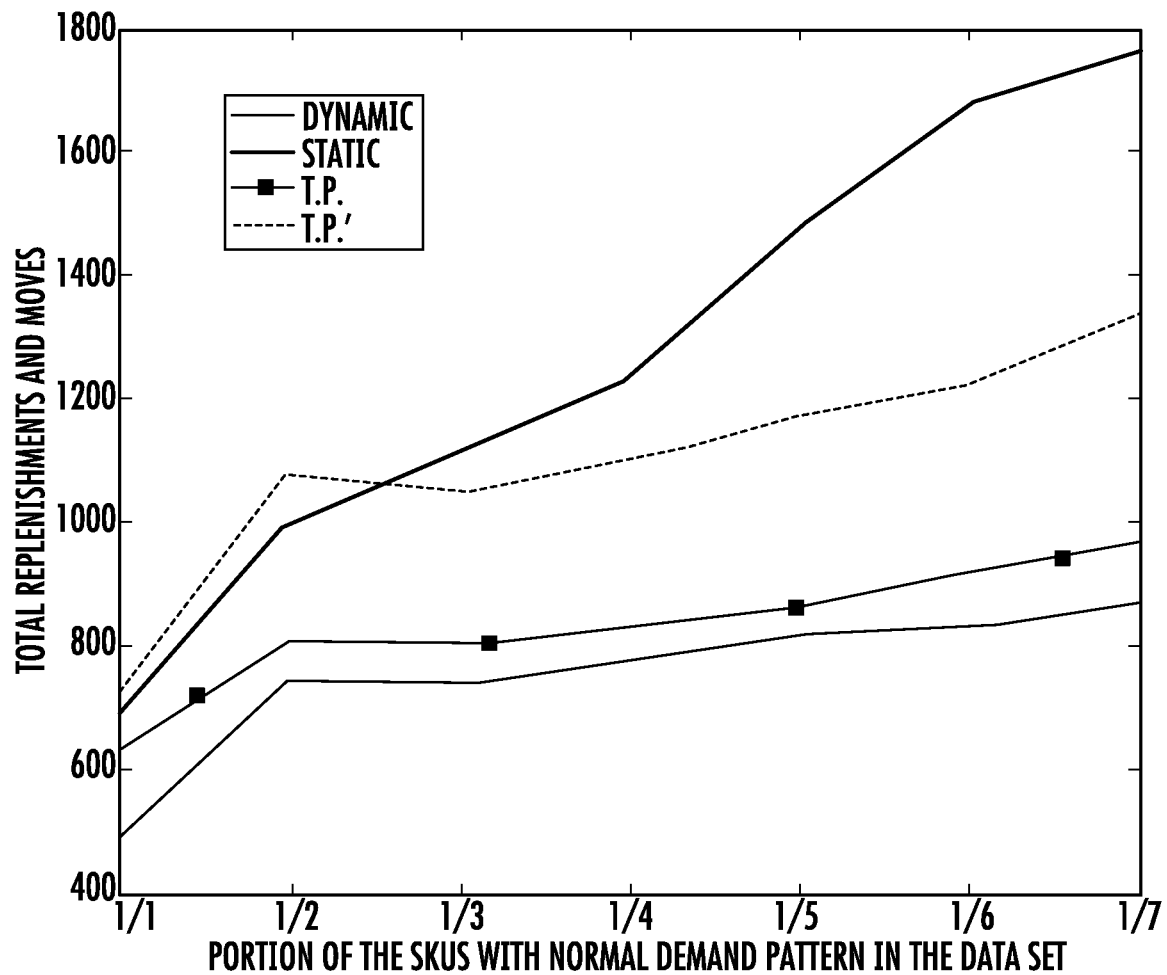
FIG. 29 illustrates a graphical plot of demand volatility impacts on the total replenishments and moves.

FIG. 29 displays how the dynamic model moderates and controls the total number of moves and replenishments in medium and high volatile periods (½ normal and after). Nonetheless, the static model experiences the growth in the total number of the moves and replenishments when facing the demand abnormality.

Checking the robustness of the models: This section checks the robustness of the dynamic model, the static model, and the threshold policies to establish the reliability, validity, and applicability of the results. The experimental design and the statistical analysis to address the three concerns listed below is presented:

1. A sensitivity analysis is carried out to study the effects of the parameters used for the demand trends' generation on the total picking and replenishment costs of the static, T.P., T.P.', and dynamic models. Hence, the total cost is the response variable.

2. Whether there is statistically a difference between the four aforementioned models is evaluated.

3. For each model, the significance level of difference between the four order data sets is evaluated. An investigation into if there is statistically a significant difference in the mean costs of the four order data sets with different portions of the normal demand pattern is also performed.

Eight types of demand patterns were studied, including normal, up/down trends, up/down shifts, cyclic, systematic and intermittent. The mean of an abnormal pattern, a(t), consists of two important components of a constant term μ and a particular abnormal function d(t) that models a particular abnormal pattern. This term d(t) is zero for the normal

TABLE 21

Comparison of the dynamic model, threshold policies T.P. and T.P.' and static model for warehouses with different portion of SKUs with normal demand pattern of the moves and replenishments when facing the demand abnormality.

| Normal* | Model | FW. Picks | RES. Picks | Replens. | Moves to RES | Replens. + moves | Cost |
|---|---|---|---|---|---|---|---|
| 100% | Dynamic | 5330 | 3670 | 401 | 82 | 483 | 1050700 |
| | T.P. | 5582 | 3418 | 604 | 20 | 624 | 1066984 |
| | T.P.' | 5709 | 3291 | 670 | 33 | 703 | 1078208 |
| | Static | 5742 | 3258 | 674 | — | 674 | 1062304 |
| ½ | Dynamic | 5156 | 3844 | 416 | 319 | 735 | 1172212 |
| | T.P. | 5172 | 3828 | 653 | 146 | 799 | 1194164 |
| | T.P.' | 5507 | 3493 | 890 | 181 | 1071 | 1247944 |
| | Static | 5688 | 3312 | 992 | — | 992 | 1191136 |
| ⅓ | Dynamic | 5110 | 3890 | 406 | 334 | 740 | 1180920 |
| | T.P. | 5232 | 3768 | 653 | 142 | 795 | 1183764 |
| | T.P.' | 5562 | 3438 | 898 | 144 | 1042 | 1228784 |
| | Static | 5706 | 3294 | 1102 | — | 1102 | 1230272 |
| ¼ | Dynamic | 5033 | 3967 | 428 | 336 | 764 | 1213216 |
| | T.P. | 5028 | 3972 | 663 | 156 | 819 | 1223076 |
| | T.P.' | 5471 | 3529 | 949 | 145 | 1094 | 1262012 |
| | Static | 5616 | 3384 | 1230 | — | 1230 | 1292232 |
| ⅕ | Dynamic | 4903 | 4097 | 433 | 378 | 811 | 1238536 |
| | T.P. | 4940 | 4060 | 681 | 169 | 850 | 1247880 |
| | T.P.' | 5451 | 3549 | 1001 | 165 | 1166 | 1292332 |
| | Static | 5616 | 3384 | 1463 | — | 1463 | 1380772 |
| ⅙ | Dynamic | 4791 | 4209 | 451 | 378 | 829 | 1261952 |
| | T.P. | 4844 | 4156 | 727 | 186 | 913 | 1286028 |
| | T.P.' | 5398 | 3602 | 1055 | 164 | 1219 | 1320316 |
| | Static | 5562 | 3438 | 1671 | — | 1671 | 1467804 |
| 1/7 | Dynamic | 4721 | 4279 | 470 | 390 | 860 | 1284092 |
| | T.P. | 4849 | 4151 | 774 | 186 | 960 | 1303148 |
| | T.P.' | 5409 | 3591 | 1125 | 207 | 1332 | 1361628 |
| | Static | 5616 | 3384 | 1758 | — | 1758 | 1492872 |

*The first column represents the portion of all SKUs with normal demand patterns. The lower number in the Normal column refers to the higher volatility.
** The best solution of static model is associated with "no update" during the planning horizon. Thus, the moves to the reserve area is not applicable in a static case.

Figure 30:
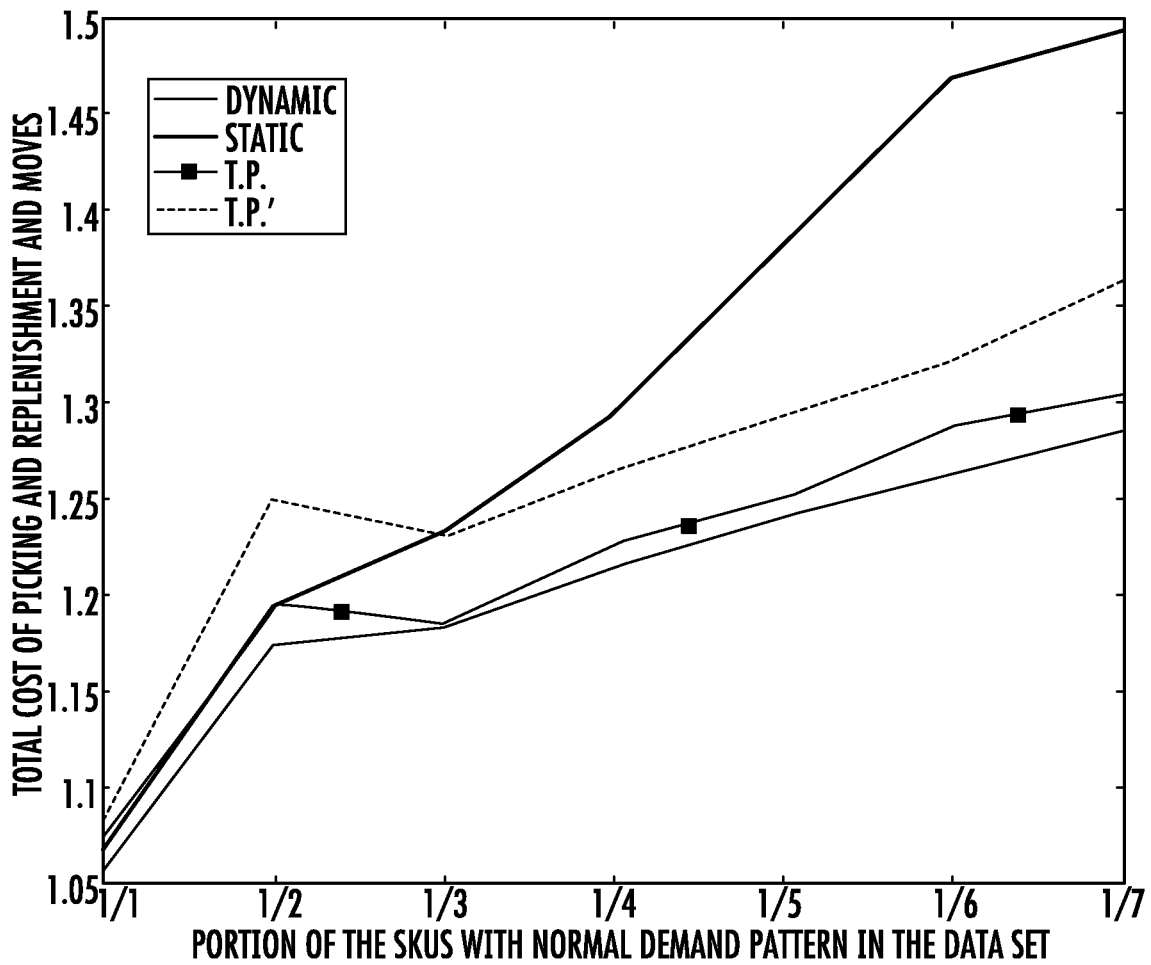
FIG. 30 illustrates a graphical plot of demand volatility impacts on the total cost.
Figures 31, 32, 33:
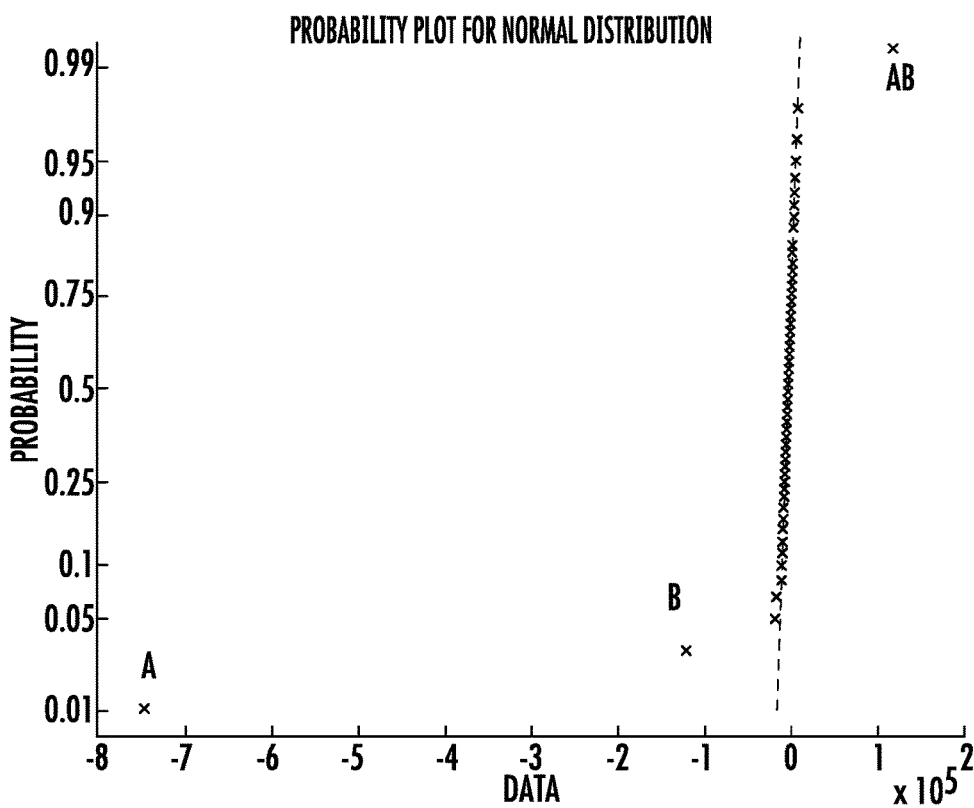
FIG. 31 illustrates a table of first analysis of variance (ANOVA1) test for a static model.
FIG. 32 illustrates second analysis of variance (ANOVA2) test for the static model.
FIG. 33 illustrates a normal probability plot for the static model.
Figures 34, 35, 36:
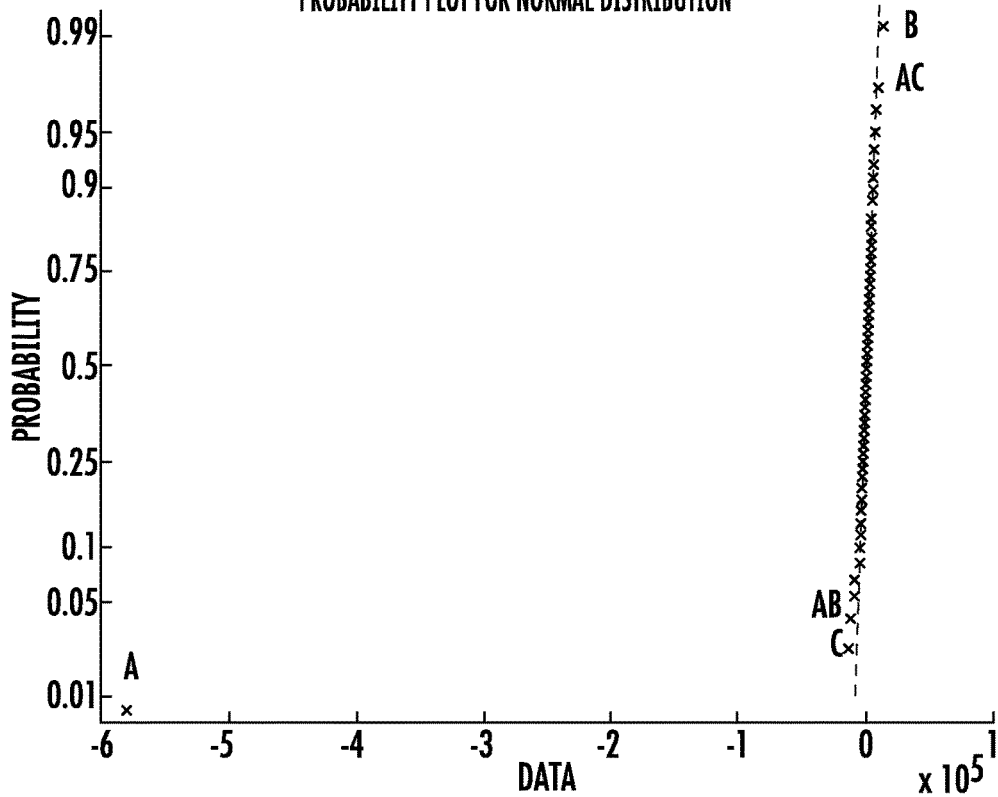
FIG. 34 illustrates ANOVA1 test for the T.P. model.
FIG. 35 illustrates ANOVA2 test for the T.P. model.
FIG. 36 illustrates normal Probability Plot for the T.P. model.
Figures 37, 38, 39:
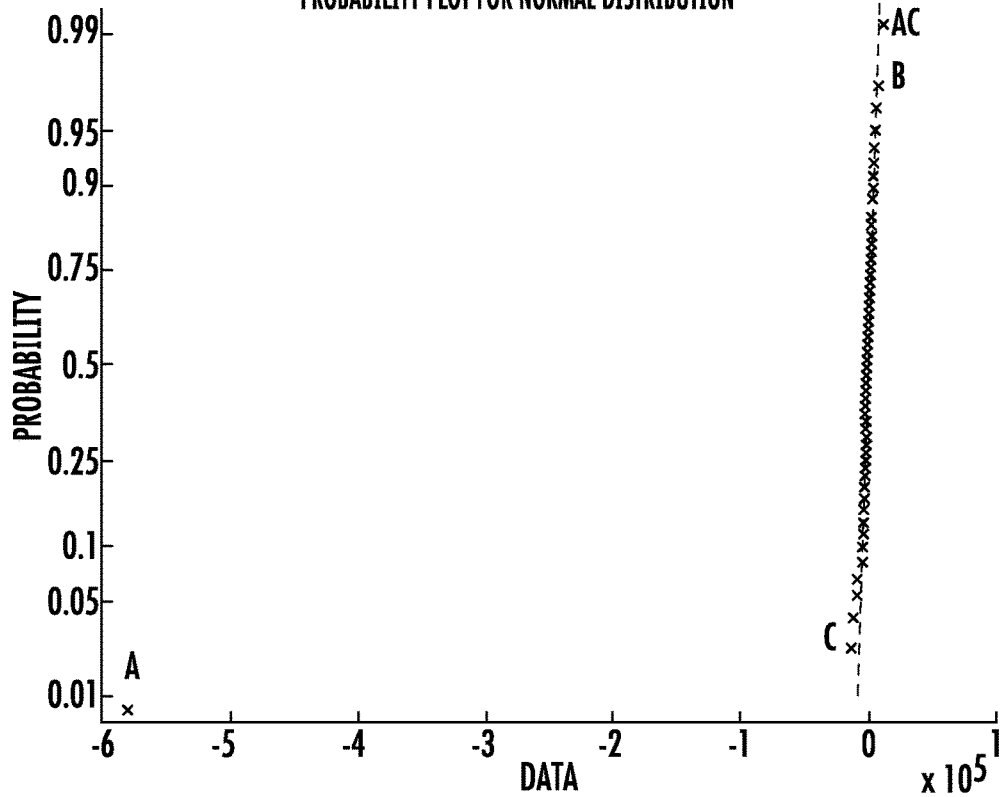
FIG. 37 illustrates ANOVA1 test for the T.P.' model.
FIG. 38 illustrates ANOVA2 test for the T.P.' model.
FIG. 39 illustrates normal Probability Plot for the T.P.' model.
Figures 40, 41, 42:
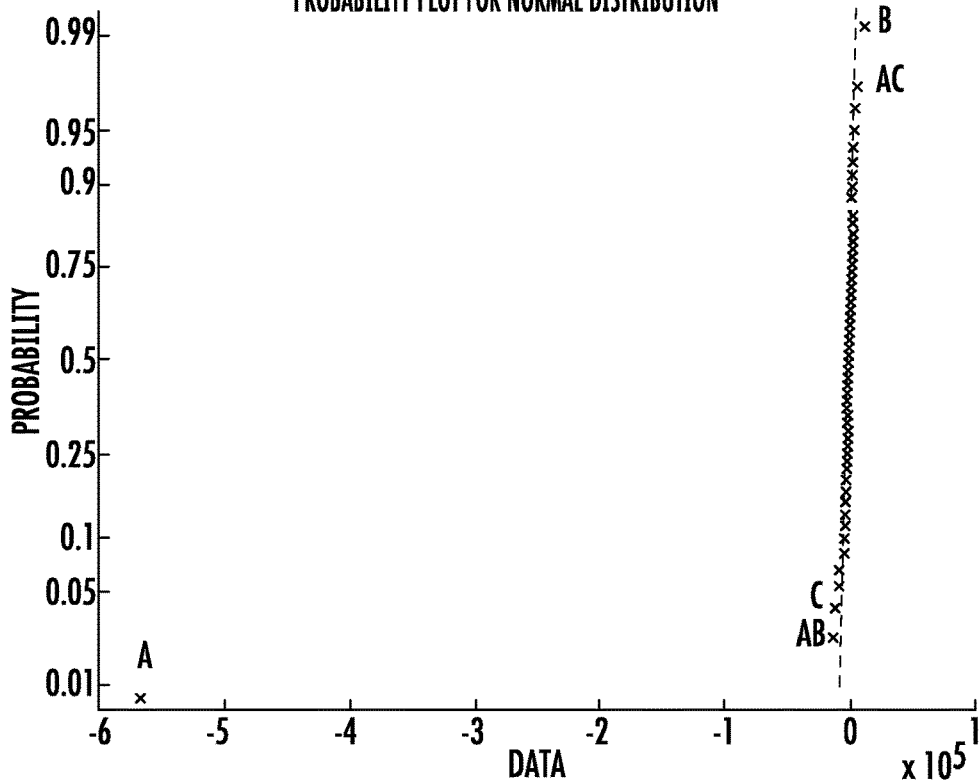
FIG. 40 illustrates ANOVA1 test for the dynamic model.
FIG. 41 illustrates ANOVA2 test for the dynamic model.
FIG. 42 illustrates normal Probability Plot for the dynamic model.

Finally, FIG. 30 illustrates the total costs of the four models. The dynamic model has the lowest cost in all experiments 1 to 7. From this figure, it can be interpreted that the threshold policy T.P. can fairly represent the dynamic model. The average gap between the dynamic model and the T.P. is 1.21% in this figure. The total cost of the static model gets higher than the T.P.' when the volatility increases (after ⅓ normal.)

demand pattern. The mathematical model for the mean of simulated patterns can be expressed by the following:

$$a(t) = \mu + d(t) \qquad \text{Eqn. 76}$$

In Eqn. 76, d(t) is defined as the following for different abnormal patterns:

1. Up/Down trends: $d(t)=\lambda t$, where $\lambda$ is the trend slope in terms of $\sigma_\varepsilon$. The parameter $\lambda>0$ is selected for up trends and $\lambda<0$ for down trends.

2. Up/Down shifts: $d(t)=\gamma$, where parameter shows the shift magnitude. The parameter $\gamma>0$ is selected for up shifts and $\gamma<0$ for down shifts.

3. Cyclic pattern: $d(t)=\kappa(2\pi t/\Omega)$, where $\kappa$ is the amplitude of the cyclic patterns, and $\Omega$ is the cyclic pattern period.

4. Systematic trends: $d(t)=\nu(-1)^t$, where $\nu$ is the magnitude of systematic pattern.

To obtain the demand patterns, a random number t is first generated from the normal distribution with the mean a(t) and the standard deviation parameter $\sigma$ at time t. Then, the Exponentially Weighted Moving Average (EWMA) technique is applied, where the demand at time t depends on the EWMA statistic. EWMA is an exponentially weighted average of all prior demand data, including the most recent demand. Successive demand points $Z_t$ are applied using all preceding demand points and the weighting factor of $\Theta$. The EWMA static is calculated as:

$$Z_t = \Theta_{pt} + (1-\Theta)Z_t - 1 \qquad \text{Eqn. 77}$$

The warehouse of this example contains 5000 SKUs. The data sets are generated containing 10% fast and medium movers. The slow movers, which have many zeros in their demand file and follow the intermittent demand pattern, are more efficiently picked from the reserve area. The fast and medium movers, following the demand patterns 1 to 7, are the candidates for being slotted in the forward area.

Sensitivity analysis: An experimental design was performed to investigate the effects of six factors listed in TABLE 22 on the cost of each model. Two levels were considered, upper and lower bounds, for the six variables. TABLE 23 shows a two-level full factorial design (2⁶=64 runs for each model) with six variables (factors). The response is the total picking and replenishment costs.

In the sensitivity analysis of the demand patterns' parameters, the steps below are performed for all models:

1. Run each model with 64 data sets, corresponding to the full factorial design used in an example. Each row of the TABLE 23 represents one experiment out of 64 experiments.

2. Conduct a six-way analysis of variance (ANOVA) to extract the main factors with a P-value less than 0.05 (ANOVA1). The results of the ANOVA1 tests for the static, T.P., T.P.', and the dynamic models have been presented in FIGS. 31, 34, 37, and 40, respectively.

3. Delete the negligible effect factors with a P-value greater than 0.05.

4. Conduct the second n-way ANOVA test (ANOVA2), where n=6—(No. of deleted factors), by considering the two-factors' interactions and creating a generalized linear regression model. FIGS. 32, 35, 38, and 41 are the ANOVA2 tests for the static, T.P., T.P.', and the dynamic models, respectively.

5. Plot the normal probability plots in FIGS. 33, 36, 39, and 42, which verify the significant effects and interaction for the static, T.P., T.P.', and the dynamic models, respectively. The statistical and magnitude significance of the main effects and their interaction effects in a two-level factorial design can be compared using normal probability plots. If the effects were zero, one would expect the points to fall on the fitted line. Significant effects have a label and fall toward the left or right side of the graph. The negative effects are on the left side of the graph, and the positive effects are on the right side of the graph.

TABLE 22

Factors and levels in experimental design

| Factor | Factor in ANOVA[1] | Factor in ANOVA[2] | Description | Level 1 | Level 2 |
|---|---|---|---|---|---|
| Normal % | $X_1$ | A | % of normal patterns | 10% | 70% |
| $\lambda$ | $X_2$ | B | Up/Down trends | 0.005 | 0.008 |
| $\gamma$ | $X_3$ | C Up/Down shifts | 1.5 | 2 | |
| $\kappa$ | $X_4$ | D | Cyclic pattern | 0.5 | 0.75 |
| $\nu$ | $X_5$ | E | Systematic trends | 0.5 | 0.75 |
| $\sigma$ | $X_6$ | F | Standard deviation | 0.7 | 0.9 |

TABLE 23

Full factorial design $2^6$

| # | % Normal | $\lambda$ | $\gamma$ | $\kappa$ | $\nu$ | $\sigma$ | # | % Normal | $\lambda$ | $\gamma$ | $\kappa$ | $\nu$ | $\sigma$ |
|---|---|---|---|---|---|---|---|---|---|---|---|---|---|
| 1 | − | + | + | + | + | + | 33 | + | + | + | + | + | + |
| 2 | − | + | + | + | + | − | 34 | + | + | + | + | + | − |
| 3 | − | + | + | + | − | + | 35 | + | + | + | + | − | + |
| 4 | − | + | + | − | + | + | 36 | + | + | + | − | + | + |
| 5 | − | + | − | + | + | + | 37 | + | + | − | + | + | + |
| 6 | − | − | + | + | + | + | 38 | + | − | + | + | + | + |
| 7 | − | + | + | + | − | − | 39 | + | + | + | + | − | − |
| 8 | − | + | + | − | + | − | 40 | + | + | + | − | + | − |
| 9 | − | + | + | − | − | + | 41 | + | + | + | − | − | + |
| 10 | − | − | + | + | + | − | 42 | + | − | + | + | + | − |
| 11 | − | + | + | − | + | − | 43 | + | + | + | − | + | − |
| 12 | − | + | − | + | + | − | 44 | + | + | − | + | + | − |
| 13 | − | − | + | + | + | − | 45 | + | − | + | + | + | − |
| 14 | − | + | − | + | − | + | 46 | + | + | − | + | − | + |
| 15 | − | − | + | + | − | + | 47 | + | − | + | + | − | + |
| 16 | − | + | − | − | + | + | 48 | + | + | − | − | + | + |
| 17 | − | + | + | − | − | − | 49 | + | + | + | − | − | − |
| 18 | − | + | − | + | − | − | 50 | + | + | − | + | − | − |
| 19 | − | + | − | − | + | − | 51 | + | + | − | − | + | − |

TABLE 23-continued

Full factorial design $2^6$

| # | % | Normal | λ | γ | κ | ν | σ | # | % | Normal | λ | γ | κ | ν | σ |
|---|---|---|---|---|---|---|---|---|---|---|---|---|---|---|---|
| 20 | − | + | − | − | − | + | | 52 | + | + | − | − | − | − | + |
| 21 | − | − | + | + | − | − | | 53 | + | − | + | + | − | − | |
| 22 | − | − | + | − | + | − | | 54 | + | − | + | − | + | − | |
| 23 | − | − | + | − | − | + | | 55 | + | − | + | − | − | + | |
| 24 | − | − | − | + | + | − | | 56 | + | − | − | + | + | − | |
| 25 | − | − | − | + | − | + | | 57 | + | − | − | + | − | + | |
| 26 | − | − | − | − | + | + | | 58 | + | − | − | − | + | + | |
| 27 | − | − | − | − | − | + | | 59 | + | − | − | − | − | + | |
| 28 | − | − | − | − | + | − | | 60 | + | − | − | − | + | − | |
| 29 | − | − | − | + | − | − | | 61 | + | − | − | + | − | − | |
| 30 | − | − | + | − | − | − | | 62 | + | − | + | − | − | − | |
| 31 | − | + | − | − | − | − | | 63 | + | + | − | − | − | − | |
| 32 | − | − | − | − | − | − | | 64 | + | − | − | − | − | − | |

TABLE 24 summarizes example sensitivity analysis results. It shows the main effects of all models. The percentage of the SKUs with a normal demand pattern (factor A) and the up/down trend parameter (factor B) are the main effects of all models. The T.P.' model is the only model that is not significantly affected by the interaction of factor A and B. It is observed that while the dynamic model and threshold policies TP and T.P.' are sensitive to the up/down shift parameter (factor C) and their interaction with factor A, the static model is not affected by factor C. Factors κ, ν, and σ (D,E,F) are not a main effect of all four models.

TABLE 24

Summary of the main effects of the models

| | Static | T.P. | T.P.' | Dynamic |
|---|---|---|---|---|
| Main effects and interactions | A B AB | A B C AB AC | A B C AC | A B C AB AC |

In this section, the main effects of the dynamic model, the static model and the threshold policies were extracted. The results of TABLE 24 justifies the following conclusions:

The portion of the SKUs with normal demand patterns and the up/down trend parameter are both the main effects of all aforementioned models. Therefore, the forward area's picks and replenishments decisions as well as the total costs are influenced by these two factors.

While the static model is not sensitive to the up/down shift parameter, both the dynamic model and the threshold policies are sensitive to this parameter. If the SKUs' demand patterns are experiencing the up/down shift, it is expected that the dynamic model adjusts the layout of the forward area, causing its total cost to be significantly affected by this adjustment. Nevertheless, the up/down shifts in the demand data do not impact the static model decisions about the forward area.

As expected, the main effects of the dynamic model and T.P. are the same.

The most interesting insight found from the results of TABLE 24 was that none of the discussed models are significantly affected by the cyclic and systematic demand patterns as well as the standard deviation used for generating the random normal number in the EWMA statistic. When the demand time series data exhibit rises and falls in the cyclic or systematic patterns, even the dynamic model and the threshold policies are not significantly affected by those fluctuations in the demand trends.

Statistical comparison of the models: A one-way analysis of variance with sample size 128 was performed to compare the static, dynamic, T.P., and T.P.' models in a cost manner. The hypotheses of interest in an ANOVA used herein are as follows:

H0: $\mu$static=$\mu$T.P.=$\mu$T.P.'=$\mu$dynamic

H1: The means are not equal, where $\mu$model is the mean cost of model. The results of ANOVA test in FIG. 43 with very small p-value (less tan 0.05) verifies there is significant difference between four models and the null hypothesis is rejected.

Figures 43, 44, 45:
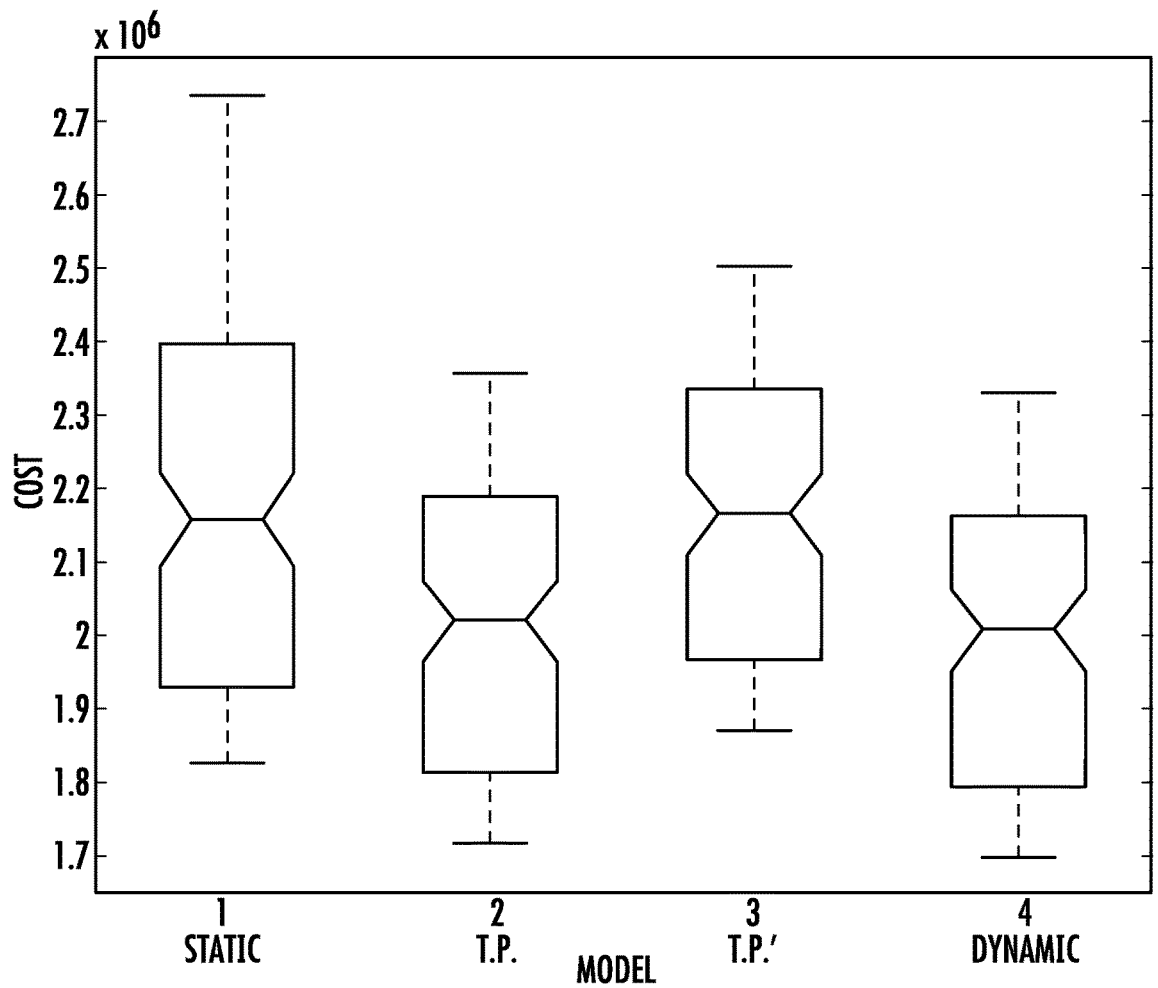
FIG. 43 illustrates ANOVA table for comparison of the models.
FIG. 44 illustrates box plot of the costs for four models.
FIG. 45 illustrates ANOVA table for significance of the normal patterns portion in the order data (static model)
Figures 46, 47:
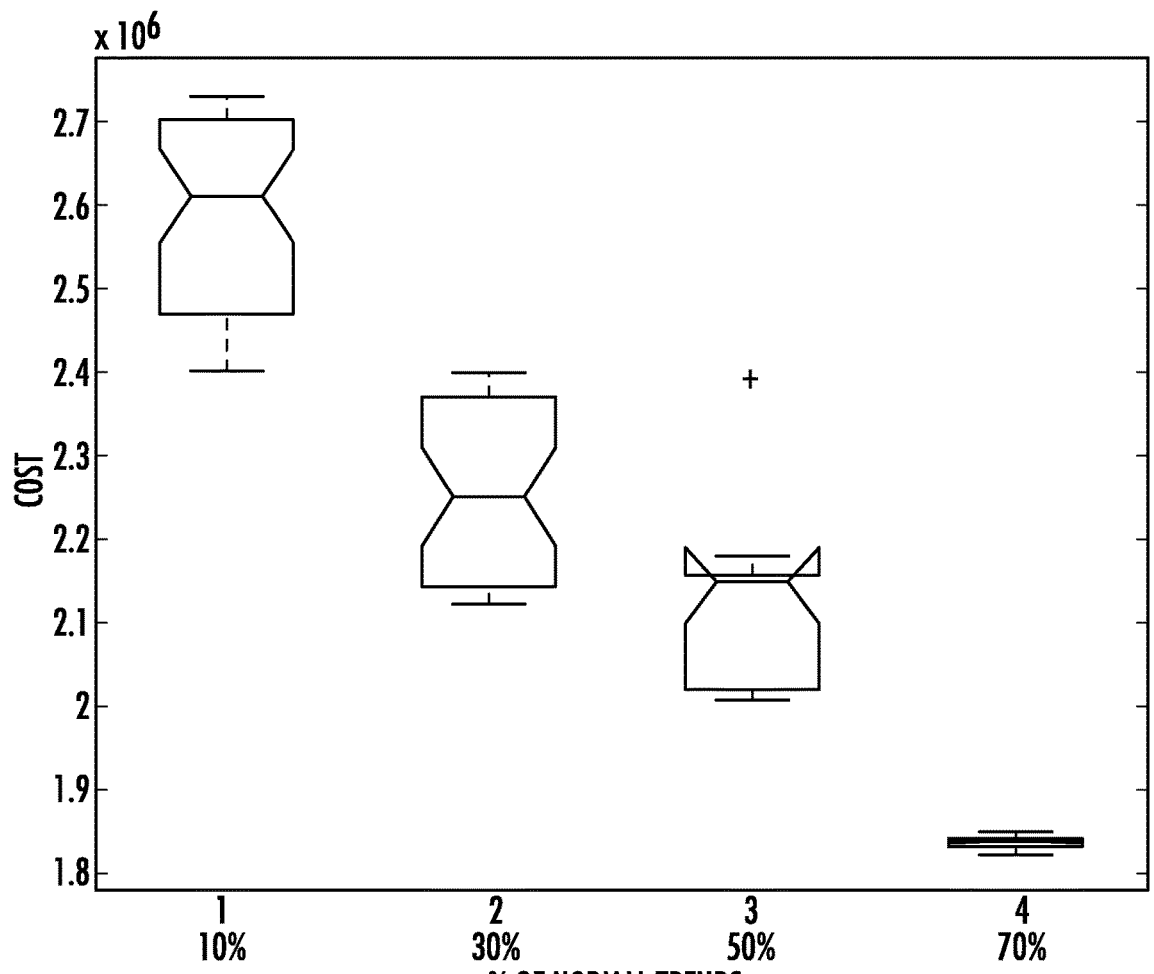
FIG. 46 illustrates box plot for significance of the normal patterns portion in the order data (static model)
FIG. 47 illustrates ANOVA table for significance of the normal patterns portion in the order data (T.P. model)
Figures 48, 49:
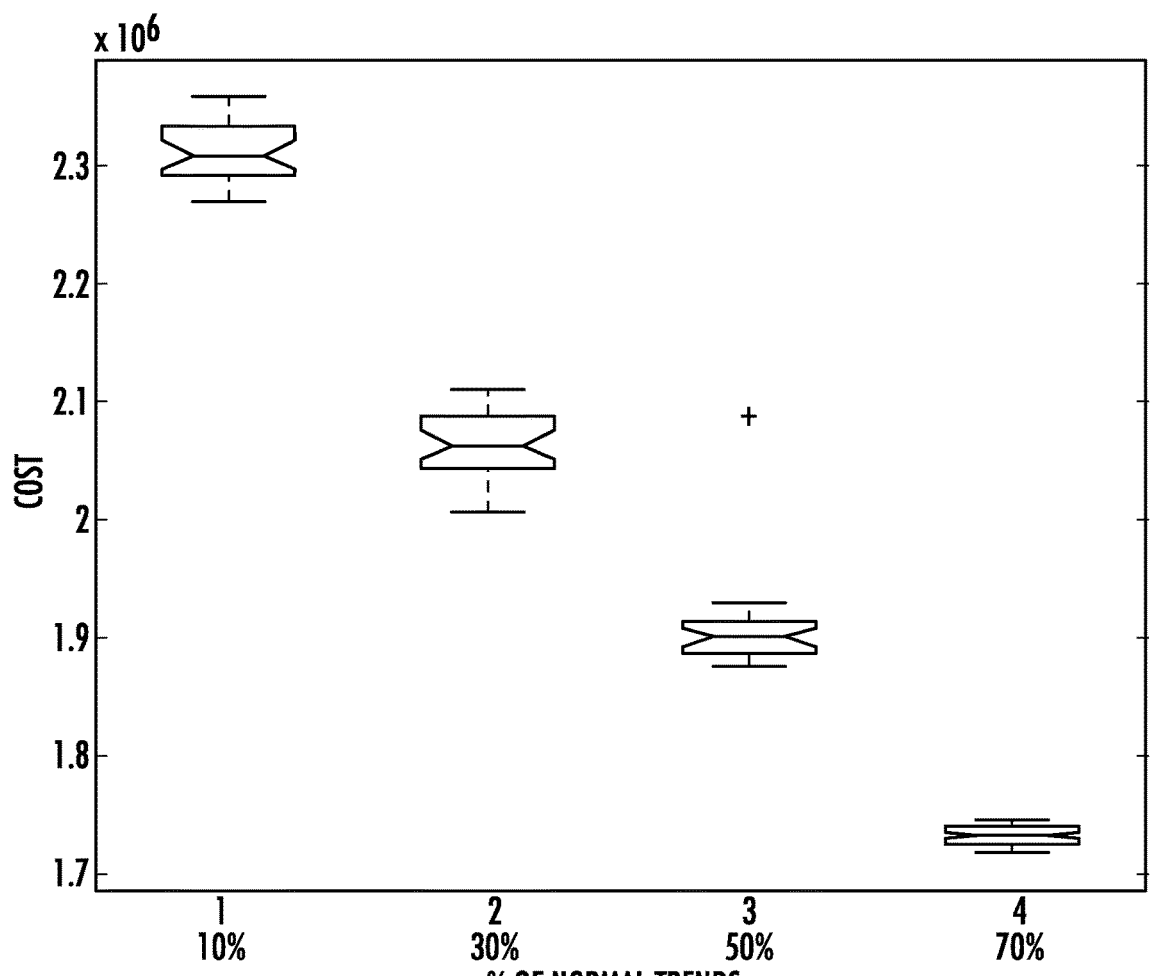
FIG. 48 illustrates box plot for significance of the normal patterns portion in the order data (T.P. model)
FIG. 49 illustrates ANOVA table for significance of the normal patterns portion in the order data (T.P.0 model)
Figures 50, 51:
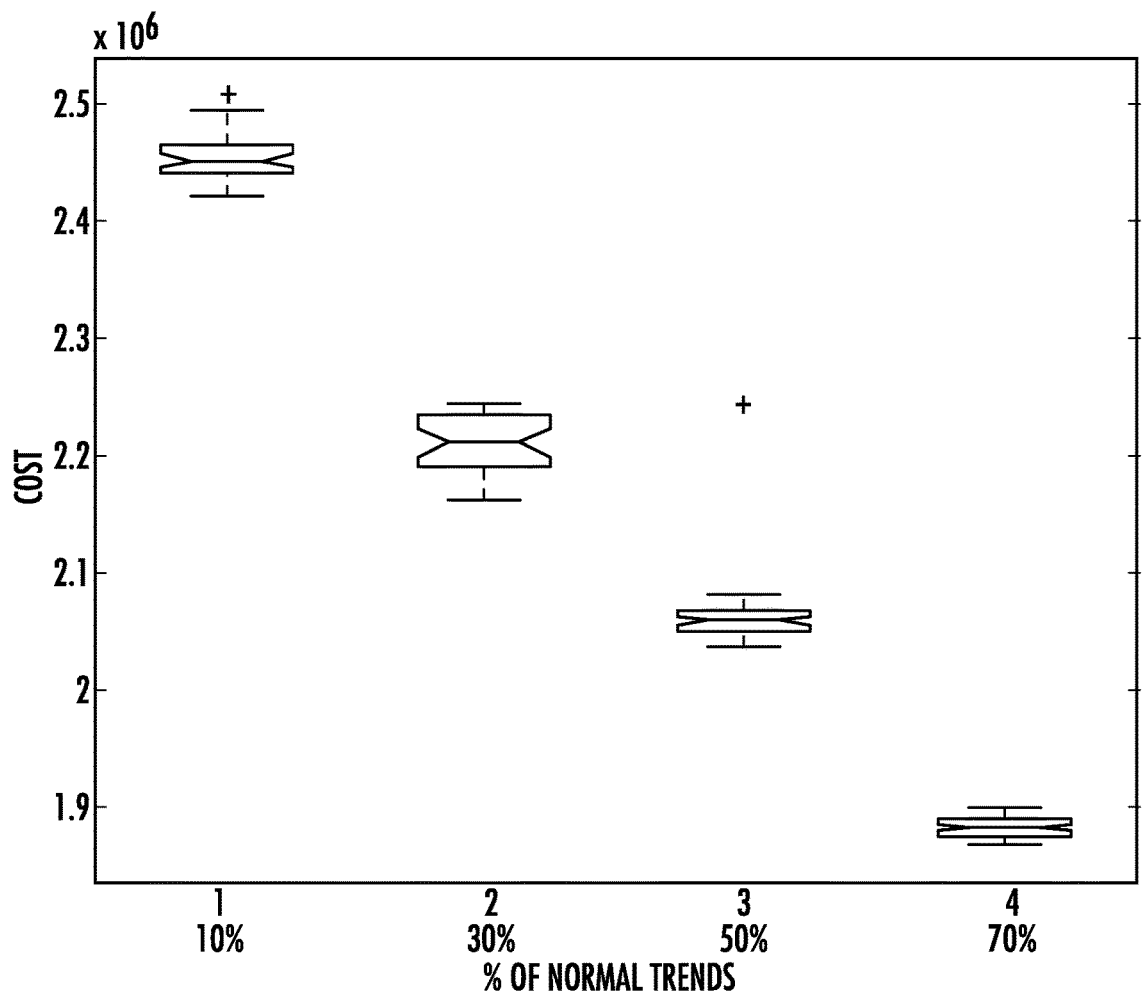
FIG. 50 illustrates box plot for significance of the normal patterns portion in the order data (T.P.0 model)
FIG. 51 illustrates ANOVA table for significance of the normal patterns portion in the order data (dynamic model model)
Figure 52:
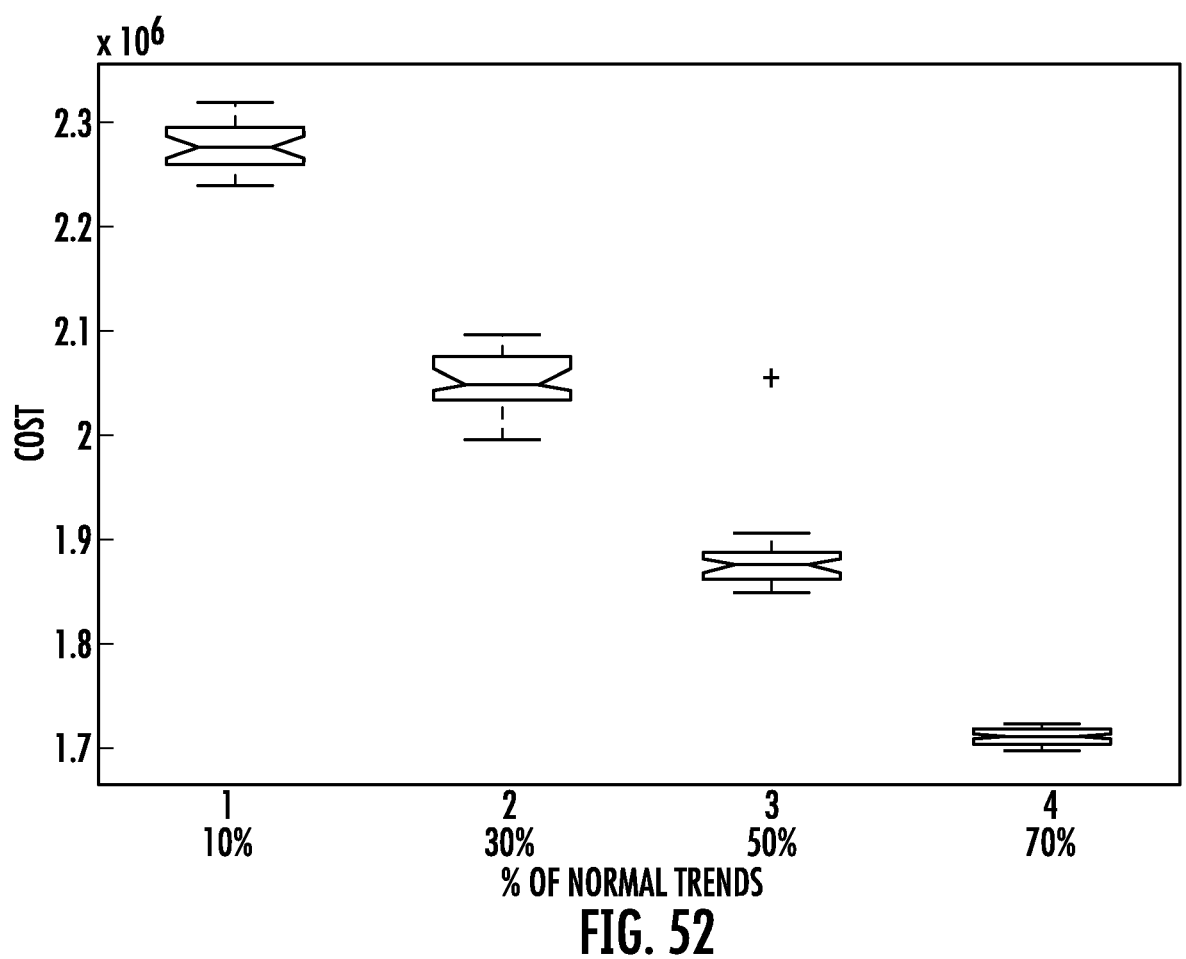
FIG. 52 illustrates box plot for significance of the normal patterns portion in the order data (dynamic model)

The box plot of the costs in FIG. 44 shows the difference between the median of the dynamic model and the threshold policy T.P. is negligible; however, the dynamic model outperforms the threshold policy as well as the static and T.P.' models. The T.P.' model, which is based on the dynamic approach, but disregards the slot allocation, competes with the static model, which considers both the SKU assignment and slot allocation.

Effects of the size of normal patterns in order data: This section, investigates the models separately to find out whether there is statistically significant difference in the mean cost among the four groups of order data with different portions of normal demand trends (10%, 30%, 50% and 70%). The ANOVA test is conducted for each model to compare the mean cost of the four groups. The groups are independent and the sample size is 32. The hypotheses of interest in an ANOVA used herein are as follows:

H0: $\mu$M 10%=$\mu$M 30%=$\mu$M 50%=$\mu$M 70%

H1: The means are not equal, where $\mu$Mx % represents the mean cost of the model M 2 {static, T.P., T.P.', dynamic}, corresponding to the order data with x % normal demand trends.

FIGS. 45, 47, 49 and 51 present the results of ANOVA tests for the static, dynamic, T.P. and T.P.' models, respectively. The large F-statistics and small p-value (less than 0.05) confirms that there is statistically significant difference between the four groups of order data in all models, causing us to reject the null hypothesis.

The box plots in FIGS. 46, 48, 50, and 52, corresponding to each of the aforementioned models, visually represents the cost data for the four groups with different portions of normal demand patterns. For all studied models, it is observed that the medians of groups are not equal and the data set with the lowest volatility (70% normal patterns) has the least median and variation. Comparing the four models, the static model shows the greater variation in cost data when the percentage of the normal demand patterns are 10%, 30% and 50%. Therefore, the models based on the dynamic slotting strategy (T.P., T.P.' and the dynamic model) are more robust than the static model.

Figure 53:
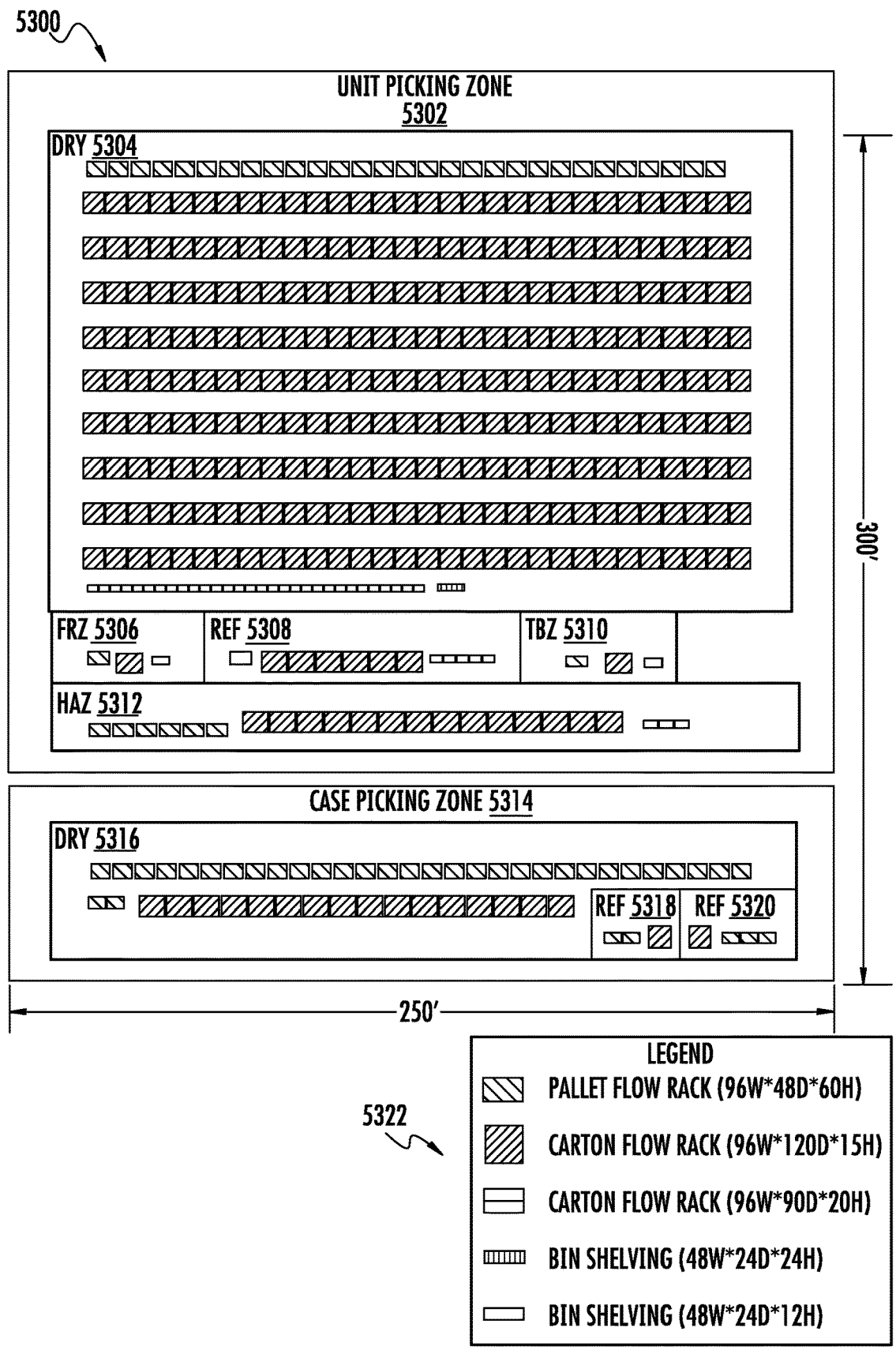
FIG. 53 illustrates an example warehouse layout optimized for forward-reserve space and allocation.

FIG. 53 illustrates an example warehouse layout 5300 optimized for forward-reserve space and allocation in accordance with an implementation of the approaches disclosed herein. In the example shown in FIG. 53, the example warehouse layout 5300 is placed within a space measuring 300' by 250', though it will be appreciated that other dimensions may be used in other example implementations. As shown, the example warehouse layout 5300 incorporates a Unit Picking Zone 5302 and a Case Picking Zone 5314. In the Unit Picking Zone 5302, a dry area 5304 is shown as incorporating several pallet flow racks, carton flow racks, and bin shelving. Legend 5322 provides example dimensions for each rack unit shown in example warehouse layout 5300 and sets out example dimensions of the rack units. It will be appreciated that the dimensions presented in the legend are set out as example dimensions, and may be altered in other example implementations. In the example warehouse layout 5300, the Unit Picking one 5302 is also configured with an FRZ area 5306, a Ref area 5308, a TBZ area 5310, and an HAZ 5312, each of which are shown in an optimized layout and as incorporating one or more pallet flow rack units, carton flow rack units, and bin shelving units. Example warehouse layout 5300 also incorporates a Case Picking Zone 5314, which incorporates a dry area 5316, a Ref area 5318, and an Haz area 5320, each of which are depicted as being optimally configured with one or more pallet flow racks units, and carton flow rack units.

Conclusion: Dynamic slotting of the forward area is a warehousing approach where the set of SKUs and the slots allocated to them are changed to continuously have an updated layout that will improve the picking and replenishment costs. The main contribution of this section is developing the first mathematical programming formulation for the dynamic slotting optimization with discrete slot allocation as well as the MIP formulations for the dynamic models with different replenishment strategies. The gap between the static and dynamic forward-reserve problems were quantified in terms of the total picking and replenishment costs. Two heuristics based on the threshold policies are proposed that closely perform as well as the dynamic model but have a shorter solution time. The second heuristic enforces one slot per SKU in the forward area. When the SKUs' demand patterns are highly volatile, the dynamic model significantly reduces the overall costs. Through the experimental design, the static, dynamic, and the threshold policies models were validated and compared. An exhaustive full factorial design was executed to check the sensitivity of the aforementioned models to the variety of the factors affecting the SKUs' demand patterns.

Figure 54:
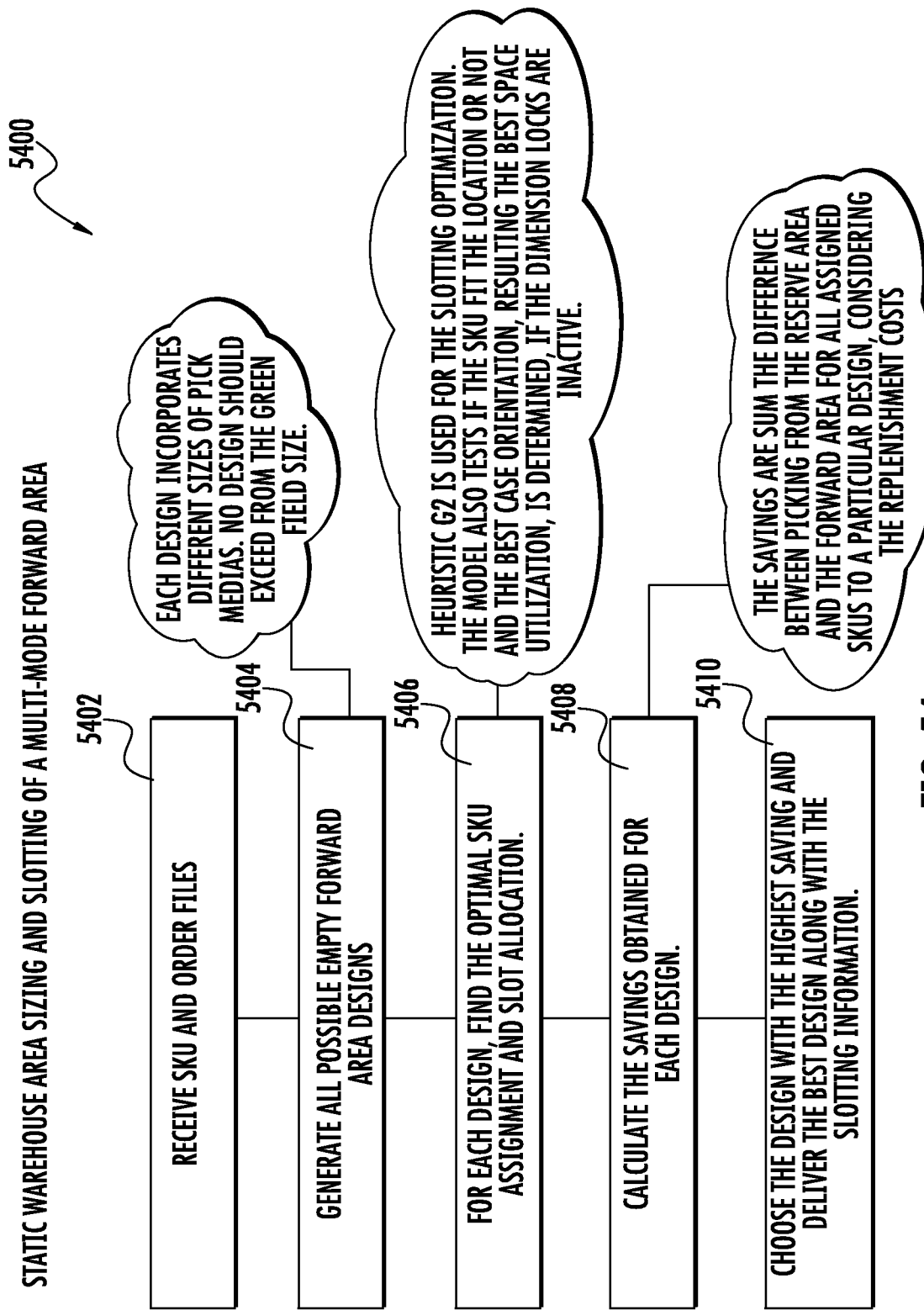
FIG. 54 illustrates a flow diagram of a method of static warehouse area sizing and slotting of a multi-mode forward area, according to one or more embodiments

Turning to FIG. 54, example process 5400 illustrates an approach to static warehouse area sizing and slotting of a multi-mode forward area. As shown in FIG. 54, process 5400 commences at operation 5402, with the receipt of SKU and order files. Upon receipt of the relevant SKU and order files, process 5400 proceeds to operation 5404, which includes generating all of the possible empty forward area designs. In example implementations of operation 5404, each possible empty forward area design incorporates difference sizes of pick medias, and designs are generally bounded by the relevant green field size. As shown in operation 5406, process 5400 also involves, for each generated design, finding the optimal SKU assignment and slot allocation. In some example implementations of operation 5406, the heuristic G2 (as discussed herein) is used for the slotting optimization. The model used to generate and/or optimize the SKU assignment and slot allocation may also test if the SKU fits the location, and may further determine the best orientation for a case associated with the SKU. This approach may be particularly advantageous in achieving an optimal space utilization in situations where locks or other controls on the relevant dimensions are not imposed. After finding the optimal SKU assignment and slot allocation, the process 5400 transitions to operation 5408, which involves calculating a savings obtained for each design. In some example implementations of operation 5408, the savings are calculated as the sum of the difference in costs associated with picking each assigned SKU in a particular design from the forward area as opposed to the reserve area, and may further incorporate replenishment costs. As shown in operation 5410, the design with the highest savings may be chosen, and the design and slotting information associated with the highest savings may be passed to a user.

DEMAND FORECASTING: The traditional forward-reserve problem fails to consider the effect of significant changes in demand. In some cases, only the products with seasonal demand patterns are considered for the forward area. Consequently, important opportunities and costly threats may be missed. The static slotting optimization addresses a problem, when the decisions about the forward area are made periodically and ignores the historical demand trends of SKUs. As such, it is possible to define dynamic slotting optimization as a methodology that uses information available during the planning period to affect storage and retrieval decisions (e.g. how to fill empty slots).

The problem of forecasting different types of demand trends is addressed in this section. In the first step, the type of demand trend is recognized using the Neural Network (NN). Next, the demand quantity is predicted using the appropriate method depending on the demand trend of the SKU. For example, some SKUs have an irregular demand pattern, for which traditional smoothing-based forecasting methods do not work. The SKUs with an intermittent demand have many zero values of demand during the planning horizon. So the method of forecasting them is different from the SKUs that are ordered frequently The selection of a method depends on, but is not limited to, the relevance and availability of the historical data, the desirable degree of accuracy, the time period to be forecasted, and the time available for making the analysis. This disclosure presents an approach for acquiring demand forecast data as an input for the dynamic forward-reserve problem. An Artificial Neural Network (ANN) technique is employed as a tool for qualitative step and a time series data analysis for the quantitative step.

In this portion of the disclosure, a new method based on ANN for forecasting different types of demand trends is presented. This disclosure also describe how, after recognition of a demand trend type, the demand quantity is forecasted.

Figure 55:
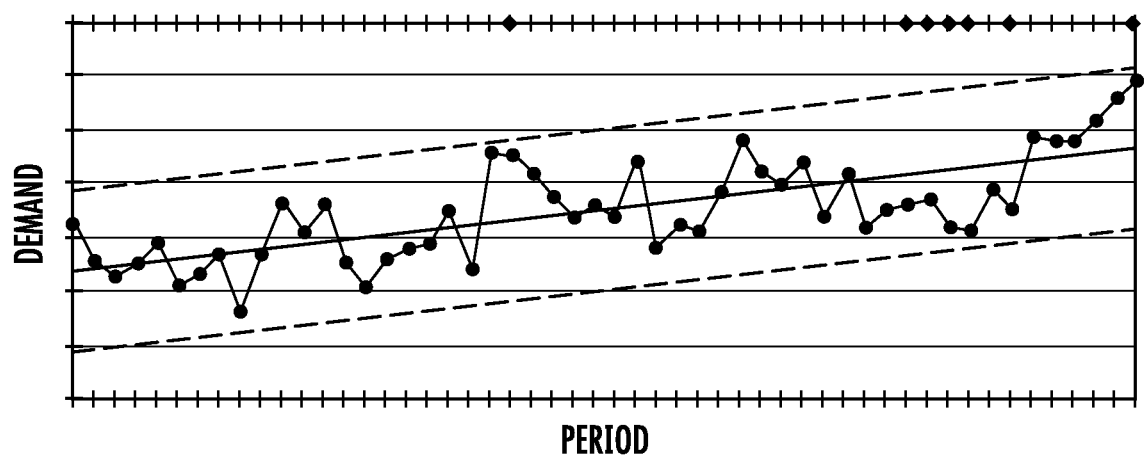
FIG. 55 illustrates an example control chart (CC) which monitors demand statistics during a planning horizon.

Qualitative model: The Control Chart Pattern Recognition (CCPR) technique, which is an effective tool in Statistical Process Control (SPC) for detecting process mean shifts, has been applied for the demand trend recognition. In Statistical Process Control, selected statistics are used to monitor processes for instability. The process is said to be "out of control" if the statistic falls outside of the defined control limits or follows a trend. The demand of each SKU may be assumed as the statistic plotted on the control chart. FIG. 55 shows an example Control Chart (CC), which monitors the demand statistics during the planning horizon.

The demand patterns considered in this disclosure include normal, down trend, up trend, systematic, down shift, up shift, cyclic, and intermittent patterns. Previous studies on CCPR consider one pattern as normal and all other patterns are defined as different kinds of abnormality.

Figure 56:
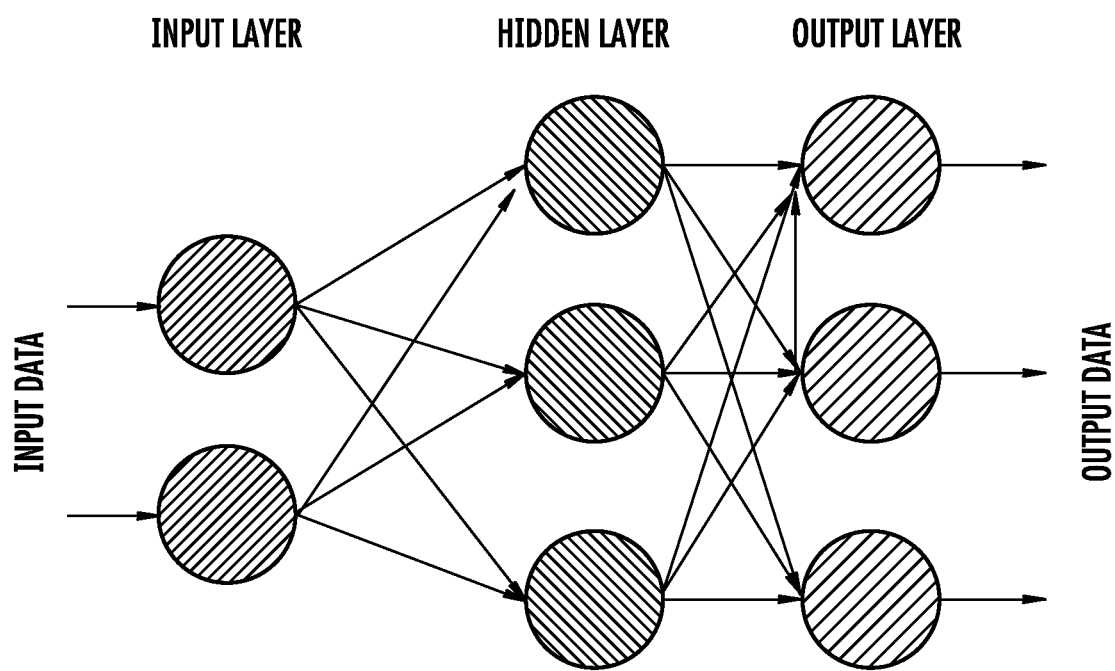
FIG. 56 illustrates an example basic structure of a neural network (NN)

There are several methods for CCPR pattern recognition in the literature. Artificial Neural Network (ANN) is a common tool for classification problems and pattern recognition. FIG. 56 illustrates a basic structure of a NN with three layers: input, hidden, and output. It contains artificial neurons and interconnections similar to the human brain. Each processing unit (neuron) receives and combines the input and then transforms them into a single output. The network connects an input layer to an output layer through hidden, or internal, nodes.

Two stopping criteria in modeling a neural network are defined. The hidden nodes are added until the further addition no longer reduces the forecast error or until the forecast error is within a defined tolerance level. Some advantages of NN are non-linearity, the capability of learning from instances, adaptivity, evidential response, fault tolerance, and the uniformity of analysis and design (Kantardzic, 2011).

Pattern recognition is defined as the process whereby a received pattern is assigned to one of a prescribed number of classes (Kantardzic, 2011). Pattern recognition may be performed through a learning process. The ANN first operates the training phase, during which the network receives a set of historical demand patterns along with the class of which each specific pattern belongs. Next, a new demand pattern is given to the network during the testing phase to identify the category of that particular demand pattern.

Pattern recognition accuracy is designed as a performance measure in ANN-based approaches. Guh and Hsieh (1999) proposed an ANN that not only recognizes the abnormal pattern, but also estimates the abnormality parameters, such as trend slope and shift magnitude. Perry et al. (2001) report an ANN that automatically detects and corrects out-of-control states. Purintrapiban and Corley (2012) develop a NN-based model for autocorrelated processes. They state that all previous applications assume that the monitoring statistic is independent and identically distributed. Masood and Hassan (2012) present issues corresponding to input data representation, training, diagnosis, and recognizer design.

Recently, there has been a trend towards applying feature-based input representation techniques and hybrid recognition systems. According to Motoda and Liu (2002), feature selection is the process of choosing a subset of features, while feature extraction is the process of creating a new set of features. Pham and Wani (1997) use a feature extraction module on unprocessed data to raise the recognition accuracy of pattern shapes. Gauri and Chakraborty (2006) introduce eight new features to enhance ANN and recognizer performance. Hassan et al. (2003) demonstrates that a feature-based ANN pattern recognizer for SPC, gives significantly better results compared to a raw data-based recognizer. Ranaee and Ebrahimzadeh (2011) improve the classification performance of a proposed feature-based Support Vector Machine (SVM) by integrating this classifier with a Genetic Algorithm (GA) for SVM parameter optimization.

Figure 57:
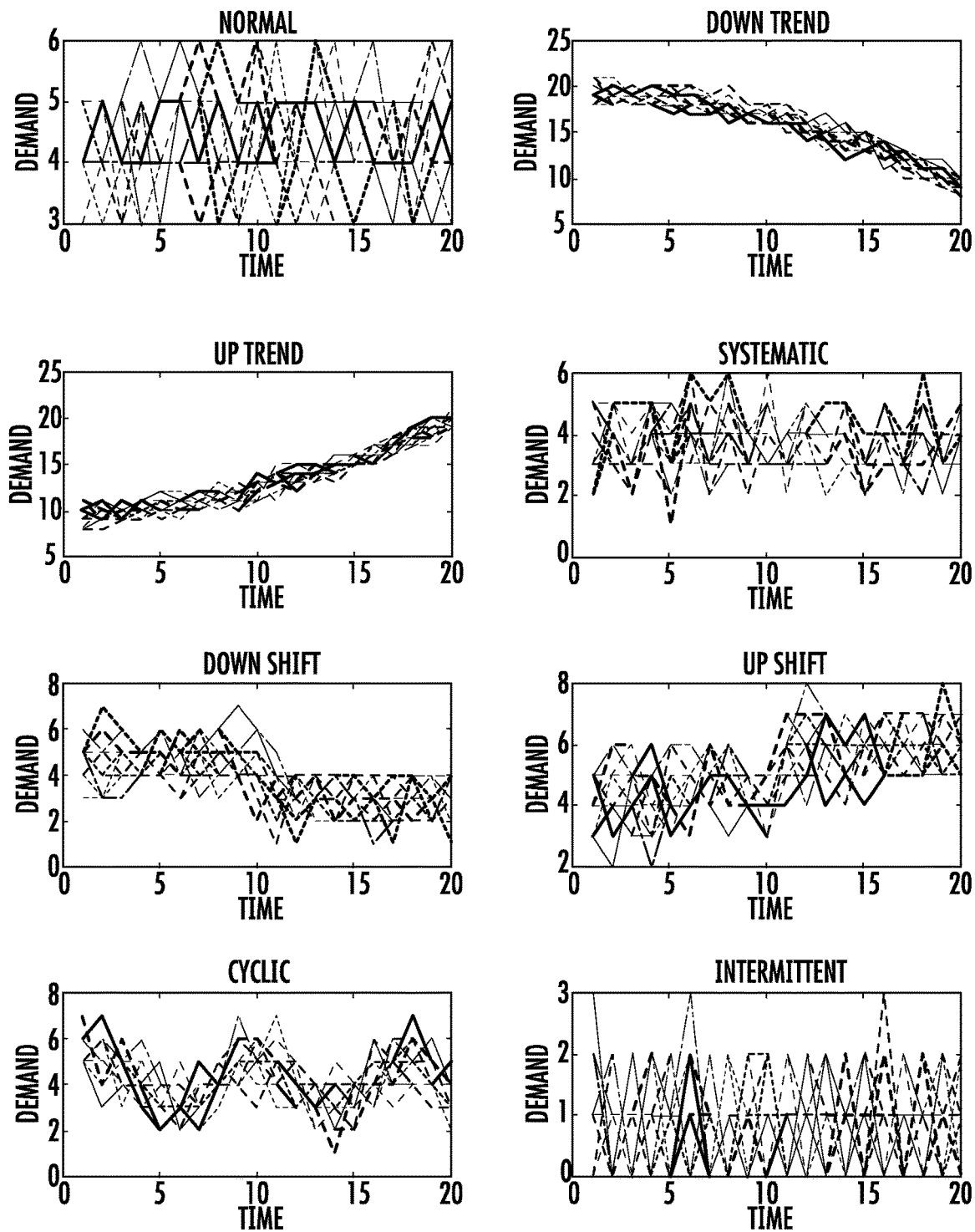
FIG. 57 illustrates example generated demand patterns.

Based on mathematical models described in studies by Al-Assaf (2004), Gauri and Chakraborty (2006), Gauri and Chakraborty (2009), and Shao (2012), normal and abnormal patterns were simulated, as illustrated in FIG. 57.

The mean of abnormal pattern, a(t), consists of two important components of a constant term: $\mu$ and a particular abnormal function d(t) that models a particular abnormal pattern. This term d(t) is zero in the normal demand pattern. The mathematical model for the mean of simulated patterns can be expressed by the following:

$$a(t)=\mu+d(t) \qquad \text{Eqn. 78}$$

In equation 78, d(t) is defined as the following for different abnormal patterns:

11. Up/Down trends: $d(t)=\lambda t$, where $\lambda$ is the trend slope in terms of $\sigma_e$. The parameter $\lambda>0$ is selected for up trends and $\lambda<0$ for down trends.
12. Up/Down shifts: $d(t)=\gamma$, where parameter $\gamma$ shows the shift magnitude. The parameter $\gamma>0$ is selected for up shifts and $\gamma<0$ for down shifts.
13. Cyclic pattern:

$$d(t) = \kappa\left(\frac{2\pi t}{\Omega}\right),$$

where $\kappa$ is the amplitude of the cyclic patterns, and $\Omega$ is the cyclic pattern period.

14. 4. Systematic trends: $d(t)=\nu(-1)^t$, where $\nu$ is the magnitude of systematic pattern.

In obtaining the demand patterns, a random number $\rho\hat{\ }t$ is first generated from the normal distribution with mean a(t) and standard deviation parameter $\sigma$ at time t. Then, the Exponentially Weighted Moving Average, EWMA, technique, is applied where the demand at time t depends on the EWMA statistic, which is an exponentially weighted average of all prior demand data, including the most recent demand. Successive demand points $Z_t$ are computed using all preceding demand points and the weighting factor of $\Theta$. The EWMA static is calculated as:

$$Zt=\Theta a(t)+(1-\Theta)Z_{t-1} \qquad \text{Eqn. 79}$$

With respect to the broad spectrum of parameters levels in relevant studies, (Gauri and Chakraborty, 2009) and (Shao, 2012), a trial-and-error approach is taken in this research to improve the model's parameters.

The CCPR problem has been formulated into a classification problem with ANN. In the example shown in FIG. 57, random independently and identically normal and abnormal distributed samples with size $m$ =30 were generated for different patterns during the observation window length $w$ =20.

It can be assumed that the cyclic pattern is influenced by the seasonal factors with fixed and known periods (e.g., the quarter of the year, the month, or day of the week). Therefore, the term cyclic pattern can be replaced by seasonal pattern. Visualization tools such as FIG. 57 provide the trend cycle in cyclic and systematic trends.

After generating eight demand patterns, the minimum and maximum values of each sample were scaled to [−1,1] for better training. Next, the targets were divided into three sets: training (70%), validation (15%), and testing (15%) sets for our network. The Levenberg-Marquardt back propagation algorithm is suitable in an example network for training process. The Logsig transfer function that calculates the NN layer's output from its net input may be used. These choices of transfer function and training algorithm give the best classification accuracy by trial-and-error and are often used in the literature. The Mean Square Error (MSE) performance function with error weighting is used as the stopping criteria.

Figure 58:
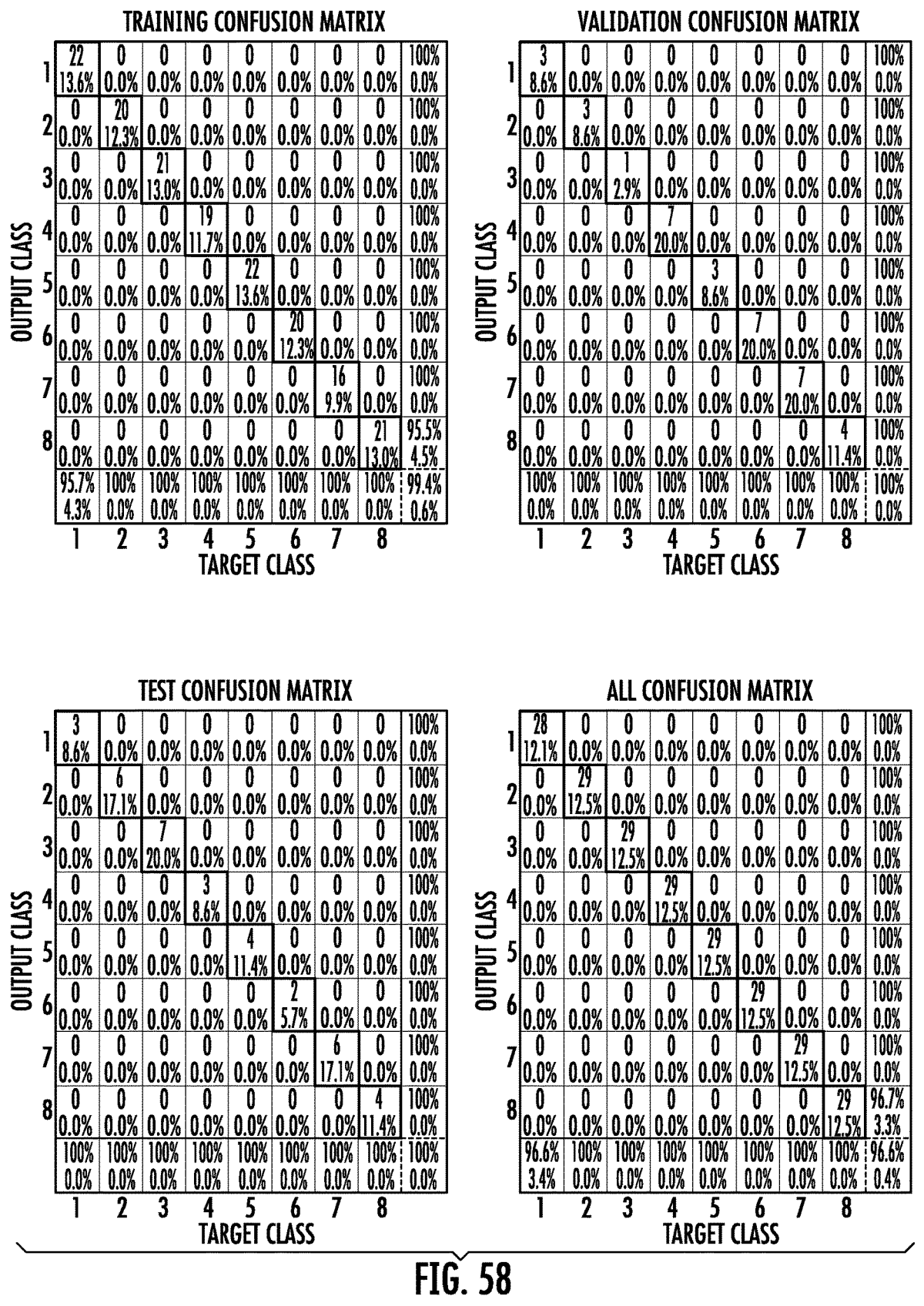
Figure 59:
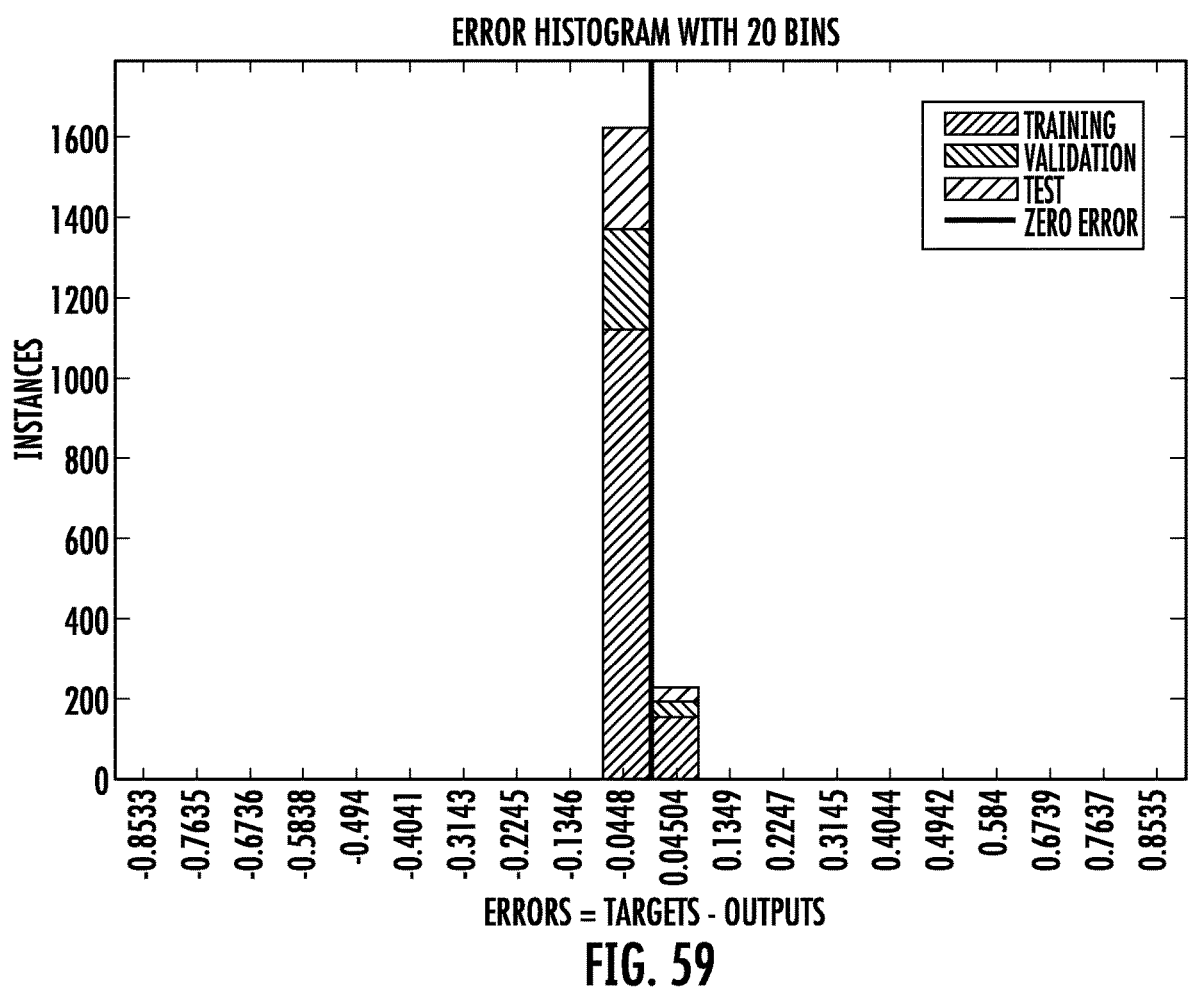
FIG. 59 illustrates an example error histogram demonstrating a validation of small values of errors.

As the confusion matrix in FIG. 58 shows, the performance of the ANN classifier for detecting demand pattern is 99.6% for all cases, which demonstrates the capability of NN for predicting the demand trends. In this figure, each row represents the instances in an actual class, while each column presents the instances in a predicted class (type of demand trend). The high accuracy shown in this matrix verifies the ANN's capability in recognizing demand trends. The Mean Square Error (MSE) of this classification problem is 0.00391 after 6 iterations with solution time of less than five seconds. The error histogram plot, shown in FIG. 59, validates the small values of errors for the three phases. This small error confirms the quality and fitness of the ANN classifier for this pattern recognition problem.

Model: It is not possible to perfectly forecast the future, but ignoring the forecast is very expensive. The predictive models will not tell what will happen in the future. Instead, they determine what will probably happen with an acceptable level of error. Assessing demand trends using real-time order transaction data is an essential aspect of a warehouse management system. Selecting the method of demand forecasting differs for different demand trends. Models for time series demand data can have many forms.

Three classes of the autoregressive (AR), the integrated, and the moving average (MA) models are the most common ones for forecasting time series points. These three classes depend linearly on previous points on times series (Gershenfeld, 1999). Bootstrapping methods are more accurate for forecasting an intermittent demand time series. In this section, the forecasting method of demand trends 1 to 7 in FIG. 57, and then the forecasting approach for intermittent demand data will be discussed.

Autoregressive Integrated Moving Average (ARIMA): One key assumption of ordinary regression analysis is that the errors are independent of each other. However, the ordinary regression residuals usually are correlated over time with time series data. This statistical assumption makes the ordinary regression analysis undesirable for time series data. There are regression models for time series analysis with the capability of adjusting estimated regression coefficients and standard errors when the errors have an AR structure.

As a consequence of violating the assumption of independent errors on ordinary regression, the statistical tests of the significance of the parameters and the confidence limits for the predicted values would be false. Further, the estimates of the regression coefficients are more effective when considering autocorrelation. The dependency of the regression residuals can improve the prediction of future values. In this study, AR error correction or a serial correlation correction is used to forecast the demand time series data except for the intermittent trend.

Before applying the regression model with AR errors, one may start by doing an ordinary regression and storing the residuals. If the residuals from the ordinary regression seem to have an AR structure, applying the regression model with the AR model improves the accuracy of forecasting.

A simple regression model with AR errors can be written as:

$$Y_t = \gamma_0 + \gamma_1 X_1 + \xi_t \qquad \text{Eqn. 80}$$

$$\xi_t = X_1 \xi_{t-1} + X_2 \xi_{t-2} + \ldots + X_m \xi_{t-m} + \varepsilon_t \qquad \text{Eqn. 81}$$

$$\varepsilon_t \sim iidN(0, \sigma^2) \qquad \text{Eqn. 82}$$

where $Y_t$ and $X_t$ are time series variables, $\gamma_t$ is the regression coefficient, $X_t$ is the autoregressive error model parameters, and $\xi_t$ is the autoregressive error model variable. The notation $\varepsilon_t \sim iidN(0, \sigma^2)$ shows that each $\varepsilon_t$ follows a normal distribution with mean 0 and variance a2 and is identically and independently distributed. The parameter εt is called white noise. For a higher order AR, the adjustment variables are calculated in the same way with more lags.

Since the current value of an AR series is correlated with all previous values, the AR model has a relatively "long" memory. Therefore, the AR model cannot be a good representative of the series, where the current value is only correlated with a few previous values. The "very short memory" property of the MA model makes it a favorable approach for modeling univariate time series. If it is algebraically equivalent to a converging infinite order AR model, the MA model will be invertible (AR coefficients decrease to 0 as we move back in time). The MA model is defined as the following:

$$Y_t = \mu_0 + \xi'_t \qquad \text{Eqn. 83}$$

$$\xi'_t = \varrho_1 \varepsilon_{t-1} + \varrho_2 \varepsilon_{t-2} + \ldots + \varrho_m \varepsilon_{t-m} + \varepsilon_t \qquad \text{Eqn. 84}$$

$$\xi_t \sim iidN(0, \sigma^2) \qquad \text{Eqn. 85}$$

where the $\varrho_1$s are the parameters of the MA model, $\mu$ is the expectation of $Y_t$, and the $\varepsilon_t$ is a white noise error term and $\varepsilon_t \sim iidN(0, \sigma^2)$.

As a result, the ARMA model, which contains both AR and MA models, is written:

$$Y_t = c + \xi_t + \xi'_t \qquad \text{Eqn. 86}$$

In the time series analysis, the ARIMA model is the integration of the AR and MA models. In other words, the ARIMA model is a generalized version of an ARMA model. The notation of ARIMA(p, d, q)(P, D, Q) represents the model with p order of autoregressive model, d degree of differencing, and q order of the MA model. The parameters P, D and Q are respectively the autoregressive, differencing, and moving-average terms for the seasonal part of the ARIMA model. Note that the ARIMA(0,1,1) model without a constant is equivalent to the Simple Exponential Smoothing model.

Figure 60:
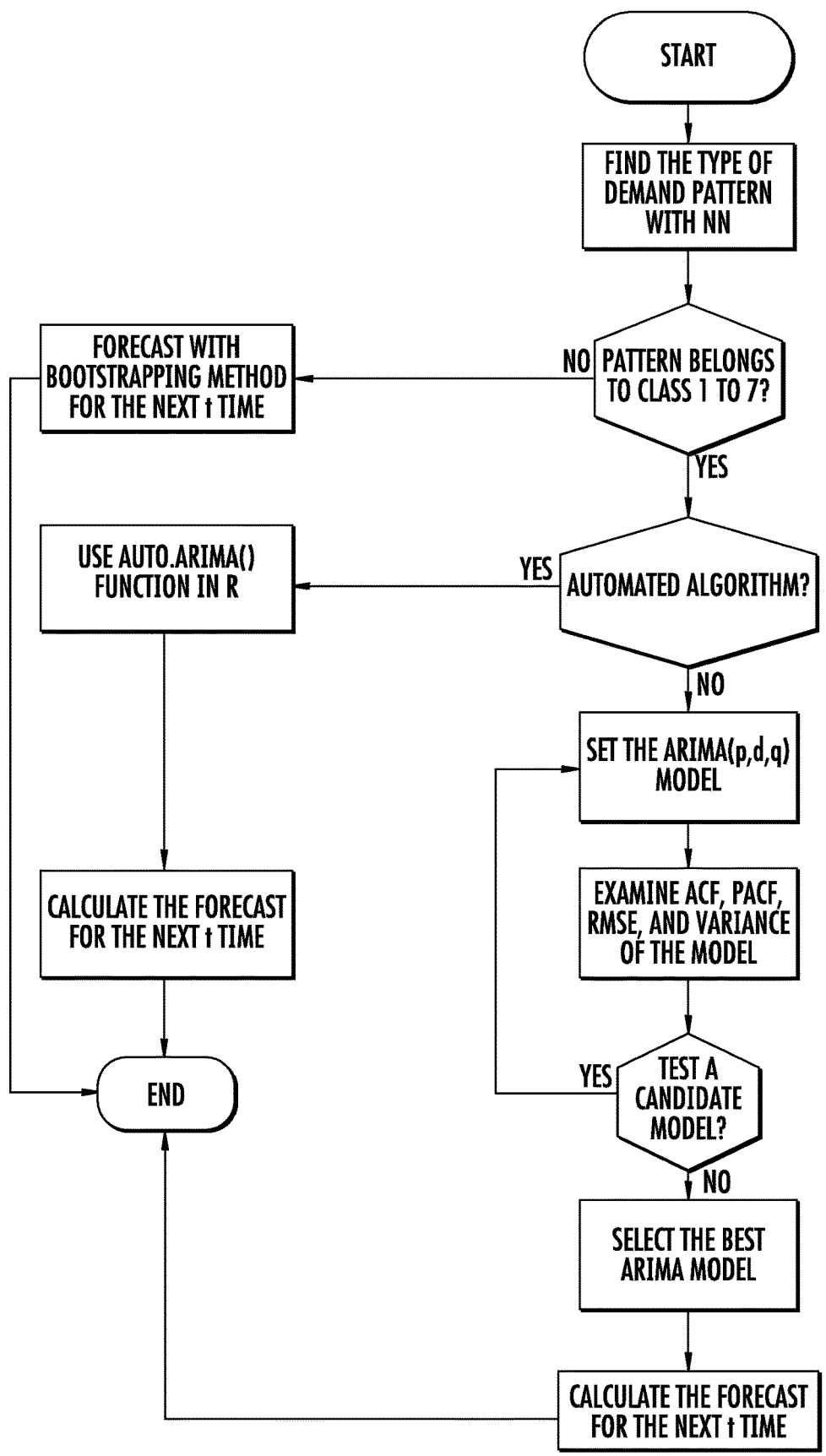
FIG. 60 illustrates an example algorithm which may be used to forecast demand.

FIG. 60 represents a forecasting algorithm applied for the demand quantity prediction of trends 1 through 7. First, the demand trend class is found by the NN method described in section A. If the demand trend belongs to any class in 1 through 7, which were defined before, the ARIMA model will be executed. If the demand trend is intermittent, the bootstrapping method will be implemented.

FIG. 60 shows that it is possible to execute the auto.arima( ) function in the R software to find the best order for the ARIMA model. On the other hand, it is possible to use a procedure to reach the best model, which examines some performance measures that test the alternative ARIMA models to select the best one.

The non-automated procedure scans four decision criteria, which include the autocovariance or autocorrelation function (ACF), partial autocorrelation function (PACF), root mean square error (RMSE), and $\sigma^2$, to find the appropriate model.

The automated function takes care of these steps by using the embedded function in the R software auto.arima. The $\sigma^2$ that resulted from the automated algorithm is equal or greater than the non-automated algorithm in all cases.

TABLE 28

The ARIMA model results for instances of demand trends classes of 1 through 7.

| Trend | ARIMA Order | Coefficients | | | | | | | $\sigma^2$ | AIC |
|---|---|---|---|---|---|---|---|---|---|---|
| 1 | (0, 0, 0) | Intcp. 4.75 | | | | | | | 5.76 | 242.66 |
| 2 | (5, 0, 0) | ar1 0.65 | ar2 0.56 | ar3 0.38 | ar4 −0.42 | ar5 −0.18 | | | 0.02 | −43.75 |
| 3 | (5, 0, 0) | ar1 0.51 | ar2 0.65 | ar3 0.30 | ar4 0.07 | ar5 −0.54 | Intcp. 3.24 | | 0.00 | −111.79 |
| 4 | (1, 0, 3) | ar1 −0.99 | ma1 1.20 | ma2 0.27 | ma3 −0.04 | Intcp. 1.18 | | | 0.06 | 16.84 |
| 5 | (4, 0, 2) | ar1 −0.02 | ar2 −0.33 | ar3 0.70 | ar4 0.34 | ma1 0.40 | ma2 0.76 | Intcp. 1.03 | 0.08 | 34.39 |
| 6 | (1, 0, 1) | ar1 0.91 | ma1 −0.33 | Intcp. 1.69 | | | | | 0.02 | −38.30 |
| 7 | (1, 0, 1)(0, 1, 2) | ar1 1.03 | ar2 −0.46 | ar3 −0.34 | ma1 −0.59 | sma1 −1.48 | sma2 0.52 | | 0.52 | 133.94 |

One way to find the best order of the ARIMA model is through the visual inspection of the ACF and PACF plots and making a decision about the AR and MA orders by a sharp cutoff that appears in the ACF and PACF plots. For example, the PACF with a sharp cutoff while the slow decay of ACF represents an "AR signature" rather than "MA signature". Notwithstanding, this method is not practical in some implementations where it is necessary to forecast the demand of very large number of the SKUs in the warehouse. Instead, statistics obtained from these functions may be involved in analysis in such implementations, and in other implementations.

Table 28 presents the results of the algorithm from FIG. 60, for the seven demand trend classes of 1 through 7. The algorithm suggests the best model for forecasting the demand trend of the instances. Class 7, which represents a cyclic trend, has two AR terms: one MA term and two seasonal terms. After having the coefficients of the best ARIMA model, it is possible to forecast the demand quantity of t time units ahead.

The bootstrapping method for intermittent demand data: Forecast errors can be costly in terms of keeping obsolete SKUs inside the forward area when using dynamic slotting. Although the traditional forecasting methods predict smooth demand data with proper accuracy, they are not capable of producing accurate forecasting for intermittent demand time data because these time series have a large number of zero values. Many of them assume that the probability distribution of the total demand over a planning horizon follows a normal distribution, which is not true. Croston (1972) was the first to recognize this phenomenon. This section is motivated to explore a way that increases the accuracy of the intermittent demand data forecasting using the bootstrapping methods.

Kourentzes (2013) propose a NN for forecasting intermittent demand data. They consider an inter-arrival rate of demand events to improve Croston's method. Gutierrez et al. (2008) also compare the NN forecasts against Croston's method, single exponential smoothing, and the Syntetos-Boylan approximation.

Wallström and Segerstedt (2010) evaluate performance/error measurements for the intermittent demand, since the comparison of different techniques is highly dependent on choosing appropriate decision criteria. Besides the traditional performance measures (e.g. MSE, RMSE), the new measurements' "number of shortage" and "periods in stock" are assessed to suggest a complementary measure.

Teunter and Duncan (2009) compare Exponential Smoothing, the Simple Moving Average, the Croston's method, and the bootstrapping methods in terms of forecasting accuracy. They conclude that Croston's method and the bootstrapping technique for forecasting intermittent demand outperform the MA and single exponential smoothing.

Croston's method applies exponential smoothing separately to the intervals between nonzero demands and the demand quantities in order to predict the mean demand per unit time. Willemain et al. (2004) show that the bootstrapping method generates more accurate forecasts of the demand distribution over a fixed planning horizon, compared to the exponential smoothing and the Croston's forecasts.

Following Croston's method, Willemain et al. (2004) apply a normal distribution with a specific mean and a standard deviation. The authors also show that there is no statistically significant difference between the Croston's method and exponential smoothing at forecasting the entire lead time and that the bootstrapping method outperforms both. Furthermore, the accuracy of the Croston's method encounters a very serious bias compared to the other techniques (Teunter and Sani, 2009). Thus, the Willemain et al's method for intermittent demand data forecasting is suitable in some example implementations.

Figure 61:
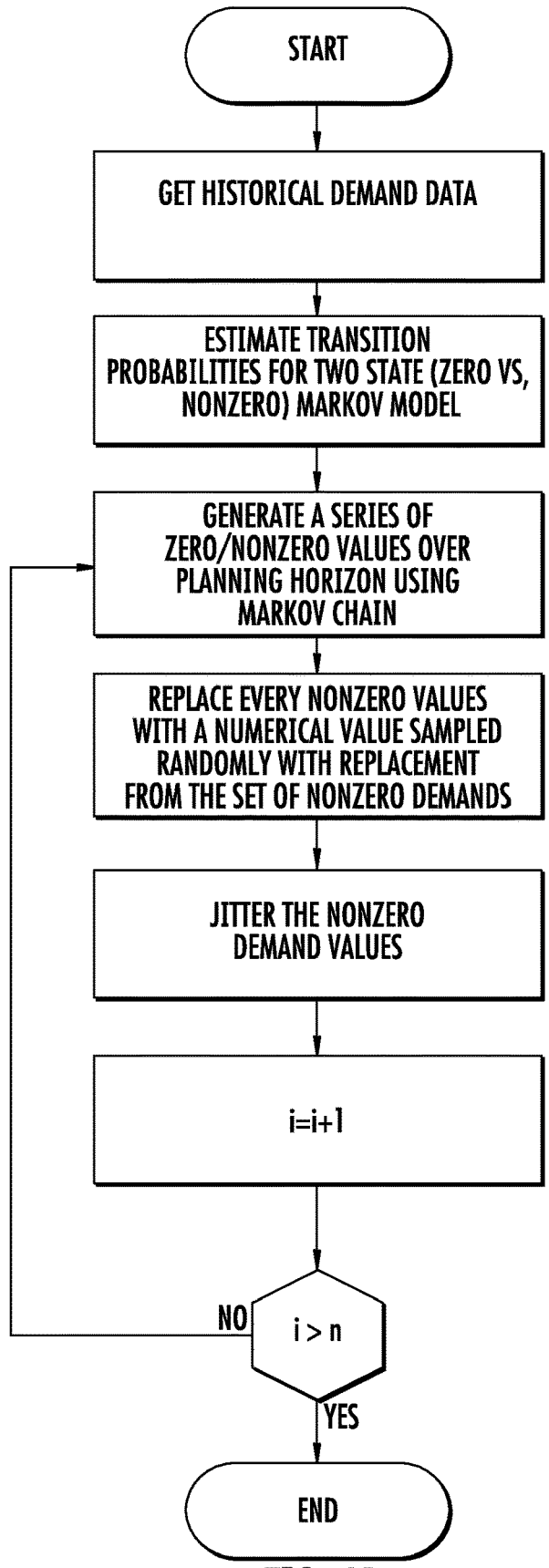
FIG. 61 illustrates an example algorithm which may be used to forecast intermittent demand.

Forecasting the demand size and the nonzero demand intervals are two important issues, which are considered in intermittent demand forecasting. An implementation of Willemain et al's algorithm, is shown in FIG. 61. This algorithm performs a two-state first order Markov process to model the autocorrelation. The forecast of the sequence of zero and nonzero values are conditional on having or not having a demand in the last period (X(T)=1 or X(T)=0).

They define the jittering process as follows:

$$\text{JITTERED} = \begin{cases} X^* & \text{If JITTERED} \leq 0 \\ 1 + \lfloor X^* + Z\sqrt{X^*} \rfloor & \text{otherwise} \end{cases},$$

where X* is one of the historical demand values randomly selected and Z is the standard normal random deviate.

TABLE 29

Summary statistics for intermittent demand forecasting
Forecasting lead time (% of data size)

|  | 10% | 20% | 30% | 40% | 50% |
|---|---|---|---|---|---|
| MMSE | 0.1575 | 0.1588 | 0.1588 | 0.1587 | 0.1580 |
| MRMSE | 0.2691 | 0.3269 | 0.3580 | 0.3694 | 0.3752 |
| MMAE | 0.1393 | 0.1403 | 0.1404 | 0.1399 | 0.1393 |

Table 29 summarizes the statistics of the intermittent demand forecasting for 6000 SKUs that follow this pattern during 52 days of historical demand data. On average, each SKU demand profile has a 87.05% zero value. Different chunks of the forecasting horizon in terms of the fraction of available historical demand are evaluated. For example, if the forecasting horizon is supposed to be 10% of the 52 days, the first 52−5=47 days would be the training input data for the algorithm in FIG. 61, and the remaining 5 days are the testing data. A bootstrap size of 1000 was arbitrarily chosen.

The results from Table 29 show the capability of the Willemain et al's method for intermittent demand data forecasting, which is a good fit for forecasting class 8 of the defined demand patterns disclosed herein. The errors do not experience fast growth by enlarging the lead time and look satisfactory even for larger forecasting horizons.

In summary, this disclosure presents an algorithm for the demand forecasting of different demand trends. The Control Charts Pattern Recognition (CCPR) using ANN presented excellent accuracy in terms of detecting the demand trend. The ARIMA method is recommended for forecasting the demand quantity of patterns belonging to classes 1 through 7. However, the bootstrapping method fits well for the intermittent demand pattern, class 8.

In summary, CCPR using ANN presented excellent accuracy in terms of detecting demand trends. The ARIMA method is recommended for forecasting the demand quantity of smooth patterns that belong to classes 1 through 7. However, the bootstrapping method is a good match for the last class, intermittent demand pattern. The forecasted demand data are applied to the dynamic model in the next chapter, when the perfect future demand data is not available.

SUMMARY: The forward area is a small area of the warehouse with a low picking cost. Therefore, the items of the warehouse compete to be located in this area rather than the reserve area, which has a higher picking cost. Two approaches for selecting the SKUs of the fast picking area and the allocated space were investigated: the static and dynamic approaches.

An algorithm was proposed for both profiling and slotting optimization. The proper profiling significantly reduces the replenishment activities and picking costs, while at the same time, maximizing the space utilization within a slot type in the forward area. The proposed algorithm evaluates the slot types in the fast picking areas and determines the best size of each pick mode, along with the SKU assignment and slot allocation.

The concept of a dynamic forward-reserve problem was introduced to warehousing. Under the dynamic environment, different sets of SKUs are assigned to the forward area and the number of slots allocated to them is not fixed for different periods. Therefore, the fast picking area is updated over time with replenishment of the appropriate SKUs, as opposed to the traditional static model that periodically reslots the forward area to reach the target map. A proper slotting methodology not only considers seasonality, but also other types of demand shifts, trends, and frequencies. The methods for demand pattern detection and demand forecasting were explored before proposing the dynamic model.

The MIP mathematical model for the dynamic forward-reserve problem was proposed for the first time. This model relaxes the major implicit assumptions of the static model. Assignment, allocation, and sizing problems are highly dependent on the activity distribution of products. Considering a fixed demand over time adversely affects decisions made regarding this efficient area of the warehouse in terms of a low picking cost.

The effects of using a static versus a dynamic setting were quantified. In some example experiments, the dynamic model for SKU assignment and slot allocation in the fast picking area always outperforms the static model, regardless of having or not having future orders. The lost savings that resulted from forecasting errors is negligible in the dynamic model. Results show that early reslotting of the forward area is not the best way to always have the most effective layout of the forward area. Updating the layout of the fast picking area can be very costly if it is done at an inappropriate time.

Different replenishment policies for the forward area were investigated. Choosing the option of partial replenishment or full replenishment of slots affects the total picking and replenishment costs. The slots get empty later in the full replenishment scenario, but the number of replenishments is lower than the quantity replenishment scenario. In both strategies, the slow movers can be deleted from the forward area any time by moving them to the reserve area. The results recommend the full replenishment over the quantity replenishment. Even if the slot is not empty but needs more inventory to meet the demand, it is suggested to replenish the slot up to the full capacity. The dynamic model assumes that the replenishment of the forward area can be promptly accomplished.

Compared to the dynamic model, the static model excludes a significant portion of SKUs to be stored in the forward area. Smaller forward areas require more moves to the reserve area in the dynamic strategy to stay tuned with changes. The benefits attained from the dynamic model over the static model is greater for more volatile warehouses because the dynamic model adjusts the forward area's layout quickly to the changes in the demand pattern by replenishing the new SKUs. This research provides insights for practitioners to choose the appropriate setting for updating their forward area.

Finally, a simple threshold policy that performs almost as well as the dynamic model was developed. The dynamic model gets significantly more computationally expensive for large problems. The suggested intuitive methodology delivers a near optimal solution within a reasonable computing time as well as a good performance for the sensible number of SKUs and the size of the forward area in practice. Another model based on a threshold policy was developed to optimize the dynamic SKU assignment, but not slot allocation, in the forward area. The static and dynamic models were compared with two threshold policies by several experiments. The robustness of the models were checked with designing the experiments on the factors impacting the models. These factors include the parameters used for the demand trends' generation. Thus the conclusions with these experiments can be generalized.

This disclosure provides insights for the practitioners who aim to achieve the pick efficiency by applying the dynamic slotting approach. Based on numerical tests, the dynamic strategy can improve the total picking and replenishment costs by 6% to 14%.

Example: Pick media Analysis: THE AREA SIZING AND SLOTTING OF A MULTI-MODE FORWARD AREA

TABLE 25

| Pick Media | | | No. of bays without time window analysis → No. of bays with time window analysis | | | | |
|---|---|---|---|---|---|---|---|
| | | | Unit pick zone | | | | |
| type | Shelf Type | | DRY | FRZ | REF | TBC | HAZ |
| Pallet Flow rack | Type 1 (96 W*48 D*60 H) | Bays SKUs | 31 → 28 62 | 1 → 1 1 | 2 → 1 3 | 1 → 1 2 | 8 → 6 15 |
| Carton flow rack | Type 1 (96 W*120 D*15 H) | Bays SKUs | 279 → 266 4394 | 1 → 1 3 | 6 → 6 94 | 1 → 1 8 | 15 → 15 142 |
| | Type 2 (96 W*90 D*20 H) | Bays SKUs | — — | — — | — — | — — | — — |
| Bin Shelving | Type 1 (48 W*24 D*24 H) | Bays SKUs | 1 → 1 18 | — — | — — | — — | — — |
| | Type 2 (48 W*24 D*12 H) | Bays SKUs | 31 → 30 1230 | 1 → 1 4 | 5 → 5 181 | 1 → 1 6 | 3 → 3 113 |
| | Solution time (sec) | | 682.15 | 3.06 | 18.24 | 4.01 | 3.68 |

TABLE 26

| Pick Media | | | No. of bays without time window analysis → No. of bays with time window analysis | | | | |
|---|---|---|---|---|---|---|---|
| | | | Case pick zone | | | | |
| type | Shelf Type | | DRY | FRZ | REF | TBC | HAZ |
| Pallet Flow rack | Type 1 (96 W*48 D*60 H) | Bays SKUs | 80 → 32 160 | — — | 5 → 2 10 | — — | 4 → 3 8 |
| Carton flow rack | Type 1 (96 W*120 D*15 H) | Bays SKUs | 32 → 16 389 | — — | 1 → 1 3 | — — | 1 → 1 9 |
| | Type 2 (96 W*90 D*20 H) | Bays SKUs | — — | — — | — — | — — | — — |
| Bin Shelving | Type 1 (48 W*24 D*24 H) | Bays SKUs | — — | — — | — — | — — | — — |
| | Type 2 (48 W*24 D*12 H) | Bays SKUs | — — | — — | — — | — — | — — |
| | Solution time (sec) | | 13.45 | — | 1.87 | — | 1.96 |

| | | |
|---|---|---|
| Pallet Flow rack | Type 1 (96W*48D*60H) | 74 |
| Carton flow rack | Type 1 (96W*120D*15H) | 307 |
| | Type 2 (96W*90D*20H) | 0 |
| Bin Shelving | Type 1 (48W*24D*24H) | 1 |
| | Type 2 (48W*24D*12H) | 40 |

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

The various embodiments may be implemented in any of a variety of computing devices. A computing device will typically include a processor coupled to volatile memory and a large capacity nonvolatile memory, such as a disk drive of Flash memory. The computing device may also include a floppy disc drive, solid state drive, and a compact disc (CD) drive coupled to the processor. The computing device may also include a number of connector ports coupled to the processor for establishing data connections or receiving external memory devices, such as a USB or FireWire™ connector sockets, or other network connection circuits for establishing network interface connections from the processor to a network or bus, such as a local area network coupled to other computers and servers, the Internet, the public switched telephone network, and/or a cellular data network. The computing device may also include the trackball or touch pad, keyboard, and display all coupled to the processor.

The various embodiments may also be implemented on any of a variety of commercially available server devices. Such a server typically includes a processor coupled to volatile memory and a large capacity nonvolatile memory, such as a disk drive. The server may also include a floppy disc drive, compact disc (CD) or DVD disc drive coupled to the processor. The server may also include network access ports coupled to the processor for establishing network interface connections with a network, such as a local area network coupled to other computers and servers, the Internet, the public switched telephone network, and/or a cellular data network.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

Additional information regarding aspects of the subject matter discussed herein may be found in Parvaneh Jahani's *Dynamic Warehouse Optimization Using Predictive Analytics*, the entirety of which is incorporated herein by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for efficiently configuring a first picking area and a second picking area, wherein the first picking area is associated with a lower cost than the second picking area, wherein the first picking area is associated with one or more picking configurations comprising one or more racks with a rack type selected from a pallet flow rack, a carton flow rack, a decked rack, a unit of steel shelving, and a unit of bin shelving, and wherein each picking configuration includes one or more storage configurations and picking and replenishment policies stored in a memory and accessed by at least one processor, the method comprising:

importing, by the at least one processor, the one or more storage configurations from the memory, wherein the one or more storage configurations comprises a set of stock keeping unit (SKU) data, a set of order data, a set of rack data, and a set of facility data;

defining, by the at least one processor, all possible the one or more storage configurations up to a maximum size of the first picking area;

identifying, by the at least one processor, one or more slots in the first picking area in which a case associated with an SKU is fitted, wherein the identification is based at least in part on one or more of the storage configurations;

determining, by the at least one processor, for each of the one or more picking configurations, an optimal orientation for the case associated with the SKU; and determining, by the at least one processor, a cost savings associated with a location of the case in the one or more slots in the first picking area, wherein the cost savings is determined for each of the one or more of the storage configurations based on the optimal orientation of the case associated with the SKU;

determining, by the at least one processor, an optimized storage configuration of the first picking area from the one or more storage configurations based on the optimal orientation of the case and the cost savings;

sorting one or more SKUs of the first picking area based on the optimized storage configuration of the first picking area;

dynamically updating, by the at least one processor, the one or more storage configurations of the first picking area based on replenishment of one or more empty slots by the one or more SKUs sorted in the first picking area.

2. The method of claim 1, wherein the set of SKU data comprises a length measurement, a width measurement, and a height measurement associated with a numerical SKU identifier.

3. The method of claim 1, wherein the set of order data comprises a time, numerical SKU identifier, and quantity identifier associated with an order.

4. The method of claim 1, wherein the set of rack data comprises a width measurement, a depth measurement, and a height measurement associated with a shelf of a rack.

5. The method of claim 1, wherein the set of facility data comprises a horizontal length measurement of the first picking area and a vertical length of the first picking area.

6. The method of claim 1, further comprising:
determining, based at least in part on the cost savings associated with the location of the case in the one or more slots in the first picking area, an optimized configuration of the first picking area, the optimized configuration comprising an identification of a rack type, an effective rack size, a size of the first picking area, and a slot type for an item associated with each SKU, wherein a slot is a physical storage location in the warehouse.

7. The method of claim 6, wherein determining the optimized configuration of the first picking area further comprises applying an SKU grown factor and a volume growth factor.

8. The method of claim 7, further comprising:
detecting a depletion condition under a reorder point associated with a slot in the first picking area of the warehouse; and automatically triggering a replenishment process for each slot associated with the depletion condition.

9. The method of claim 1, further comprising:
defining a forecasting algorithm to determine one or more demand patterns based on at least the set of stock keeping unit (SKU) data, the set of order data, the set of rack data, and the set of facility data.

10. An apparatus for efficiently configuring a first picking area and a second picking area, wherein the first picking area is associated with a lower cost than the second picking area of a warehouse, wherein the first picking area is associated with one or more picking configurations comprising one or more racks with a rack type selected from a pallet flow rack, a carton flow rack, a decked rack, a unit of steel shelving, and a unit of bin shelving, and wherein each picking configuration includes one or more storage configurations and picking and replenishment policies stored in at least one processor and accessed by at least one memory, the apparatus comprising the at least one processor and the at least one memory having program code instructions embodied therein, the at least one memory and program code instructions being configured to, with the at least one processor, direct the apparatus to at least:

import, by the at least one processor, the one or more storage configurations from the at least one memory, wherein the one or more storage configurations comprises a set of stock keeping unit (SKU) data, a set of order data, a set of rack data, and a set of facility data;

define, by the at least one processor, all possible the one or more storage configurations up to a maximum size of the first picking area;

identify, by the at least one processor, one or more slots in the first picking area in which a case associated with an SKU is fitted, wherein the identification is based at least in part on one or more of the storage configurations;

determine, by the at least one processor, for each of the one or more picking configurations, an optimal orientation for the case associated with the SKU; and determine, by the at least one processor, a cost savings associated with a location of the case in the one or more slots in the first picking area, wherein the cost savings is determined for each of the one or more of the storage configurations based on the optimal orientation of the case associated with the SKU;

determine, by the at least one processor, an optimized storage configuration of the first picking area from the one or more storage configurations based on the optimal orientation of the case and the cost savings;

sort one or more SKUs of the first picking area based on the optimized storage configuration of the first picking area;

dynamically update, by the at least one processor, the one or more storage configurations of the first picking area based on replenishment of one or more empty slots by the one or more SKUs sorted in the first picking area.

11. The apparatus of claim 10, wherein the set of SKU data comprises a length measurement, a width measurement, and a height measurement associated with a numerical SKU identifier.

12. The apparatus of claim 10, wherein the set of order data comprises a time, numerical SKU identifier, and quantity identifier associated with an order.

13. The apparatus of claim 10, wherein the set of rack data comprises a width measurement, a depth measurement, and a height measurement associated with a shelf of a rack.

14. The apparatus of claim 10, wherein the set of facility data comprises a horizontal length measurement of the first picking area and a vertical length of the first picking area.

15. The apparatus of claim 10, further comprising code portions configured to cause the at least one processor to at least:

determine, based at least in part on the cost savings associated with the location of the case associated with the SKU within the warehouse, an optimized configuration of the first picking area, the optimized configuration comprising an identification of a rack type, an effective rack size, a size of the first picking area, and a slot type for an item associated with each SKU, wherein a slot is a physical storage location in the warehouse.

16. The apparatus of claim 15, wherein determining the optimized configuration of the first picking area further comprises applying an SKU grown factor and a volume growth factor.

17. The apparatus of claim 16, further comprising code portions configured to cause the at least processor to at least:

detect a depletion condition under a reorder point associated with a slot in the first picking area of the warehouse; and automatically triggering a replenishment process for each slot associated with the depletion condition.

18. The apparatus of claim 10, further comprising code portions configured to define a forecasting algorithm to determine one or more demand patterns based on at least the set of stock keeping unit (SKU) data, the set of order data, the set of rack data, and the set of facility data.

19. A computer program product for efficiently configuring a first picking area and a second picking area, wherein the first picking area is associated with a lower cost than the second picking area, comprising a non-transitory computer-readable storage medium having program code portions stored therein, the program code portions being configured to, upon execution, direct an apparatus to at least:

import, by at least one processor, one or more storage configurations from at least one memory, wherein the one or more storage configurations comprises a set of stock keeping unit (SKU) data, a set of order data, a set of rack data, and a set of facility data;

define, by the at least one processor, all possible the one or more configurations up to a maximum size of the first picking area;

identify, by the at least one processor, one or more slots in the first picking area in which a case associated with an SKU is fitted, wherein the identification is based at least in part on one or more of the storage configurations;

determine, by the at least one processor, for each of the one or more picking configurations, an optimal orientation for the case associated with the SKU; and determine, by the at least one processor, a cost savings associated with a location of the case in the one or more slots in the first picking area, wherein the cost savings is determined for each of the one or more of the storage configurations based on the optimal orientation of the case associated with the SKU;

determine, by the at least one processor, an optimized storage configuration of the first picking area from the one or more storage configurations based on the optimal orientation of the case and the cost savings;

sort one or more SKUs of the first picking area based on the optimized storage configuration of the first picking area;

dynamically update, by the at least one processor, the one or more storage configurations of the first picking area based on replenishment of one or more empty slots by the one or more SKUs sorted in the first picking area.

20. The computer program product of claim 19, further comprising a forecasting algorithm to determine one or more demand patterns based on at least the set of stock keeping unit (SKU) data, the set of order data, the set of rack data, and the set of facility data.

* * * * *